US012460456B2

(12) United States Patent
Yoshida et al.

(10) Patent No.: US 12,460,456 B2
(45) Date of Patent: Nov. 4, 2025

(54) LATCH MECHANISM AND DEVICE INCLUDING LATCH MECHANISM

(71) Applicant: FUJIFILM Business Innovation Corp., Tokyo (JP)

(72) Inventors: Michiaki Yoshida, Kanagawa (JP); Wataru Nakamura, Kanagawa (JP); Keigo Shinoto, Kanagawa (JP); Akira Ueshima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 338 days.

(21) Appl. No.: 17/715,966

(22) Filed: Apr. 8, 2022

(65) Prior Publication Data

US 2023/0203859 A1 Jun. 29, 2023

(30) Foreign Application Priority Data

Dec. 27, 2021 (JP) ................................ 2021-213124

(51) Int. Cl.
*E05C 1/08* (2006.01)
*E05C 1/00* (2006.01)
*G03G 21/16* (2006.01)

(52) U.S. Cl.
CPC ................ *E05C 1/08* (2013.01); *E05C 1/004* (2013.01); *G03G 21/1633* (2013.01)

(58) Field of Classification Search
CPC ........ E05C 19/028; E05C 19/06; E05C 1/004; E05C 1/006; E05C 1/08; E05C 9/04;
(Continued)

(56) References Cited

U.S. PATENT DOCUMENTS 1,137,863 A * 5/1915 Keough ................ E05C 19/026 292/18
2,948,560 A * 8/1960 Rop ........................ E05C 19/06 292/85
(Continued)

FOREIGN PATENT DOCUMENTS

CN 209899309 U * 1/2020 ......... A47L 15/4259
GB 2407116 A * 4/2005 ............. E05C 17/20
(Continued)

OTHER PUBLICATIONS

Espacenet machine translation of CN 209899309 U, generated May 2, 2024 (Year: 2024).*

*Primary Examiner* — Kristina R Fulton
*Assistant Examiner* — Emily G. Brown
(74) *Attorney, Agent, or Firm* — JCIPRNET

(57) ABSTRACT

A latch mechanism includes a main body engagement unit arranged in a main body having an opening or closing body that may open and close, an opening or closing body engagement unit arranged in the opening or closing body, the main body engagement unit includes a first engagement body having a pair of first top portions displaced in a direction orthogonal to a closing direction of the opening or closing body, a second engagement body, included in the opening and closing body engagement unit, having a pair of second top portions respectively contact with the pair of first top portions, and having a first slope that applies a force in a direction to open the opening or closing body to the second engagement body when the pair of first top portions is in contact with the pair the second top portion while closing the opening or closing body.

16 Claims, 31 Drawing Sheets

(58) Field of Classification Search
CPC .......... E05C 9/045; E05C 9/02; E05C 9/1808; E05C 9/042; E05C 19/022; E05C 19/024; G03G 21/1633; G03G 21/1647; G03G 21/1619; E05B 83/30; E05B 83/32
USPC .......................................................... 292/163
See application file for complete search history.

(56) References Cited

U.S. PATENT DOCUMENTS

| | | | | | |
|---|---|---|---|---|---|
| 3,160,431 | A * | 12/1964 | Anderson | A47K 5/02 | 292/42 |
| 3,314,705 | A * | 4/1967 | Lichtenberger | E05C 1/10 | 292/175 |
| 3,820,363 | A * | 6/1974 | Bako | E05B 37/02 | 70/312 |
| 4,500,120 | A * | 2/1985 | Ridgewell | E05B 65/0858 | 292/19 |
| 5,445,451 | A * | 8/1995 | Harmony | A47B 88/57 | 312/333 |
| 5,711,554 | A * | 1/1998 | Brown | E05C 19/06 | 292/87 |
| 8,214,000 | B2 * | 7/2012 | Hwang | H04M 1/0262 | 361/679.01 |
| 9,101,259 | B2 * | 8/2015 | Dirnberger | A47L 15/4259 | |
| 9,151,095 | B2 * | 10/2015 | Syring | E05B 17/0025 | |
| 2008/0306369 | A1 * | 12/2008 | Udupa | E05C 1/08 | 600/407 |
| 2011/0058825 | A1 * | 3/2011 | Tsukijima | G03G 21/1676 | 399/258 |
| 2015/0220050 | A1 * | 8/2015 | Fukase | G03G 21/1647 | 399/110 |
| 2015/0227109 | A1 * | 8/2015 | Hisano | G03G 21/1633 | 399/110 |
| 2016/0222573 | A1 * | 8/2016 | Dirnberger | D06F 39/14 | |
| 2020/0040625 | A1 * | 2/2020 | Zhang | E05B 65/0042 | |

FOREIGN PATENT DOCUMENTS

| | | |
|---|---|---|
| JP | 2006137110 | 6/2006 |
| JP | 3797408 | 7/2006 |
| JP | 2018077292 | 5/2018 |
| JP | 2018077972 | 5/2018 |

* cited by examiner

LATCH MECHANISM AND DEVICE INCLUDING LATCH MECHANISM

CROSS-REFERENCE TO RELATED APPLICATIONS

This application is based on and claims priority under 35 USC 119 from Japanese Patent Application No. 2021-213124 filed Dec. 27, 2021.

BACKGROUND

(i) Technical Field

The present invention relates to a latch mechanism, and a device including a latch mechanism.

(ii) Related Art

In JP2006-137110A, a technique is disclosed as follows. An opening/closing mechanism of a housing includes an opening/closing portion provided to be openable/closable with respect to a housing main body, and at least two engagement portions provided in each of the housing main body and the opening/closing portion and engaging with each other to hold the opening/closing portion and the housing main body in a closed state.

In addition, in JP2006-137110A, a first engagement portion of the two engagement portions is provided with equilibrium portions that come into contact with each other without a force acting to open/close the opening/closing portion from the housing main body. In a case where the housing main body and the opening/closing portion are in the equilibrium portions in the first engagement portion, an opening/closing behavior of the opening/closing portion follows a behavior of a second engagement portion of the two engagement portions.

Furthermore, in JP2006-137110A, the second engagement portion is provided with an extruding region for extruding the opening/closing portion from the housing main body, based on a positional relationship between the housing main body and the opening/closing portion, and a drawing portion provided via a boundary portion with respect to the extruding portion and drawing the opening/closing portion into the housing main body.

In JP2018-77292A, another technique is disclosed as follows. An opening/closing device includes an opening/closing unit that is openable/closable with respect to a main body unit, a first engagement portion that engages with the opening/closing unit in response to a predetermined reaction force when the opening/closing unit is closed, and a second engagement portion that engages with the opening/closing unit in response to a predetermined reaction force at a timing different from a timing of the first engagement portion when the opening/closing unit is closed.

In addition, in JP2018-77292A, the reaction force at an engaging position of one engagement portion whose engagement timing is earlier out of the first engagement portion and the second engagement portion is a pulling force by which the other engagement portion is directed toward a closing position of the opening/closing unit.

Furthermore, in JP2018-77292A, at the closing position of the opening/closing unit, the reaction force is a pulling force by which at least one of the first engagement portion or the second engagement portion is directed toward the closing position.

SUMMARY

Aspects of non-limiting embodiments of the present disclosure relate to a latch mechanism and a device including a latch mechanism. When an opening/closing body that opens/closes to cover and expose a portion of a main body is closed, the latch mechanism and the device including the latch mechanism can prevent the opening/closing body from being stopped before the opening/closing body reaches a normal closing position.

Aspects of certain non-limiting exemplary embodiments of the present disclosure overcome the above disadvantages and/or other disadvantages not described above. However, aspects of the non-limiting exemplary embodiments are not required to overcome the disadvantages described above, and aspects of the non-limiting exemplary embodiments of the present disclosure may not overcome any of the disadvantages described above.

According to an aspect of the present disclosure, there is provided a latch mechanism including a main body engagement unit arranged in a main body having an opening/closing body that opens/closes, and an opening/closing body engagement unit arranged in the opening/closing body to engage with the main body engagement unit when the opening/closing body is closed, in which the main body engagement unit is configured to include a first engagement body having a pair of first top portions displaceable in a direction orthogonal to a closing direction of the opening/closing body, the opening/closing body engagement unit is configured to include a second engagement body having a pair of second top portions respectively coming into contact with the pair of first top portions, and when one second top portion of the pair of second top portions comes into contact with one first top portion of the pair of first top portions while the opening/closing body is closed, the second engagement body is a latch mechanism having a first slope that applies a force in an opening direction of the opening/closing body to the second engagement body in a state where the other first top portion of the pair of first top portions is in contact with the second top portion.

BRIEF DESCRIPTION OF THE DRAWINGS

Exemplary embodiment(s) of the present invention will be described in detail based on the following figures, wherein.

Figure 8:
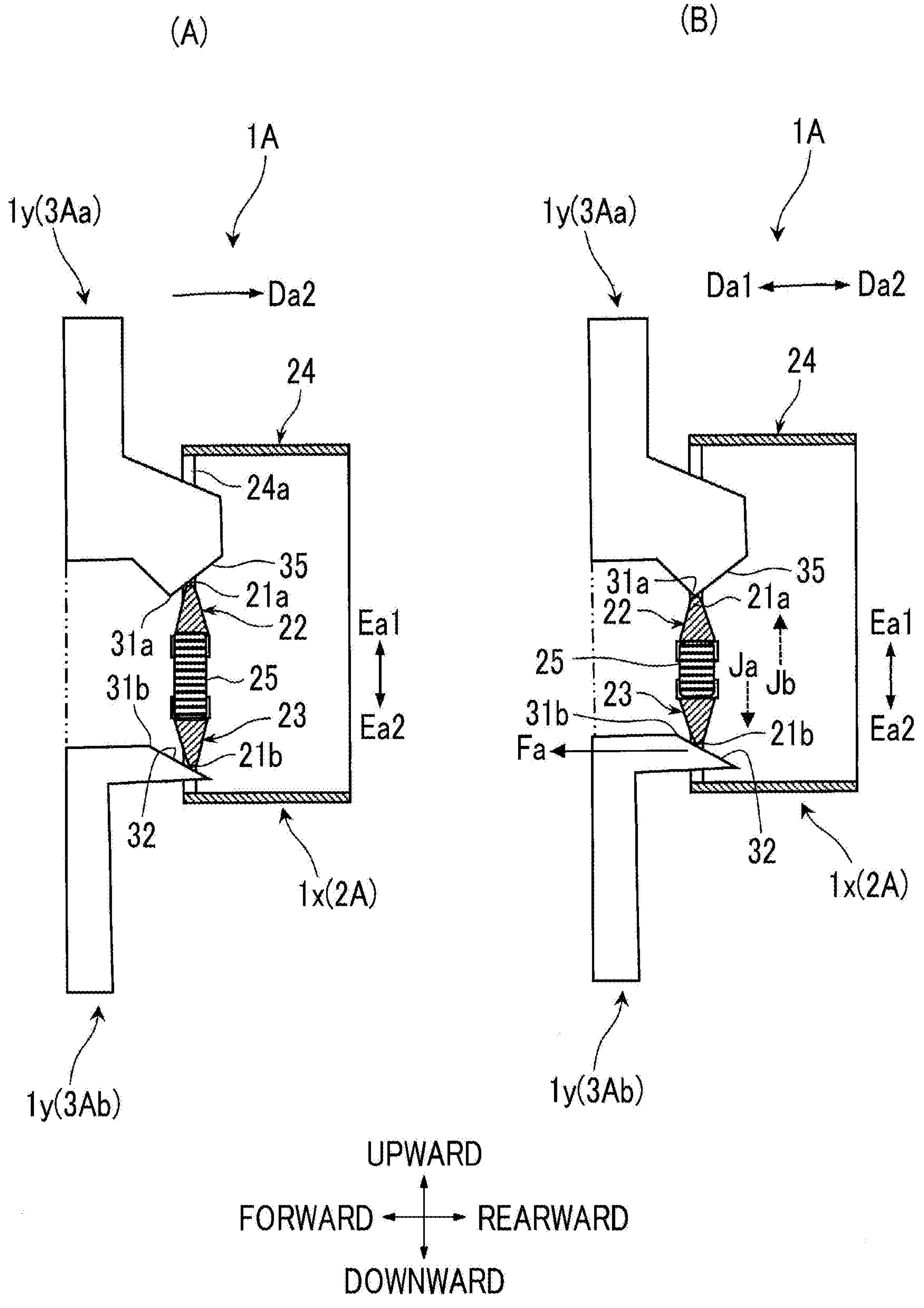
Figure 9:
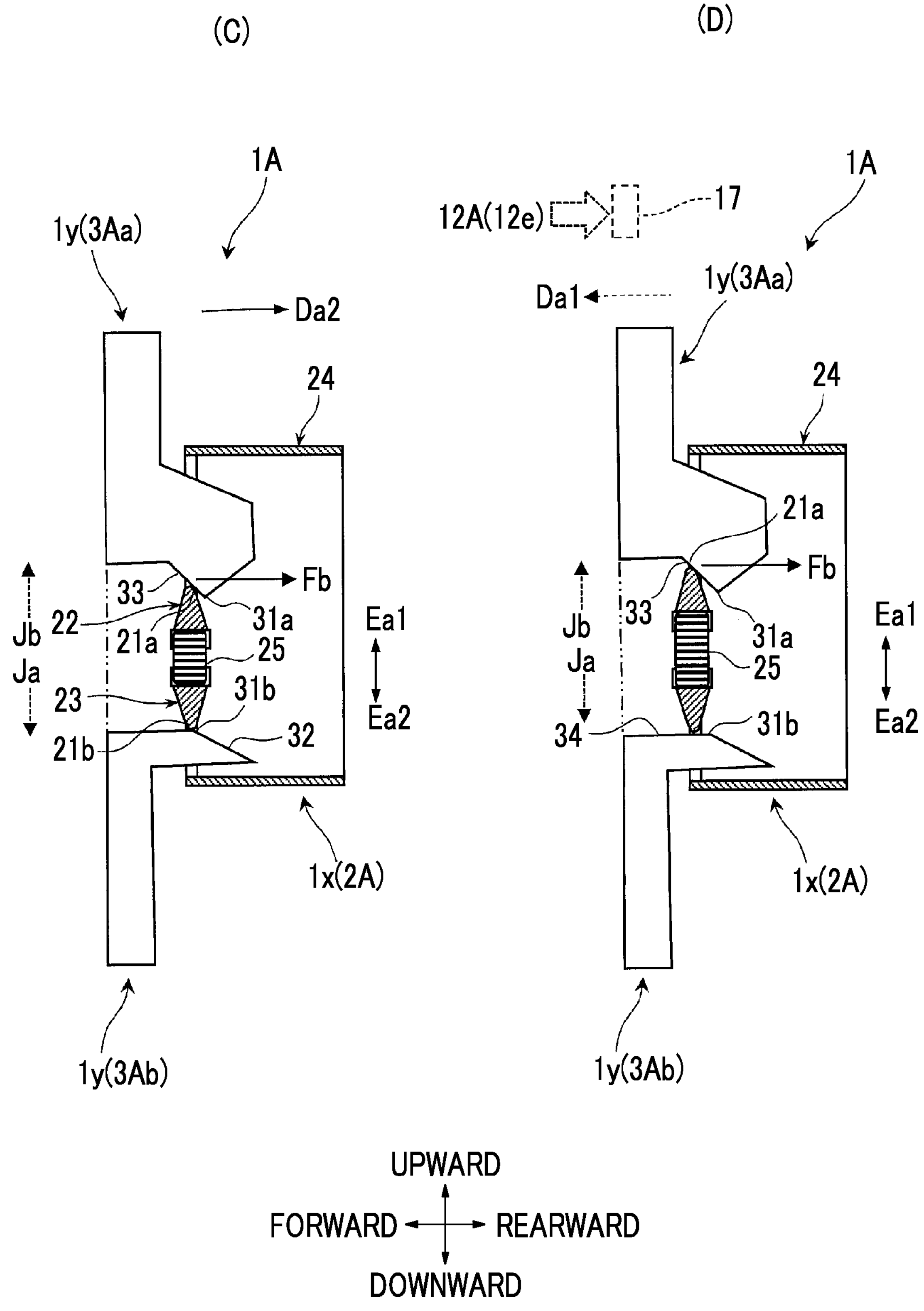
Figure 10:
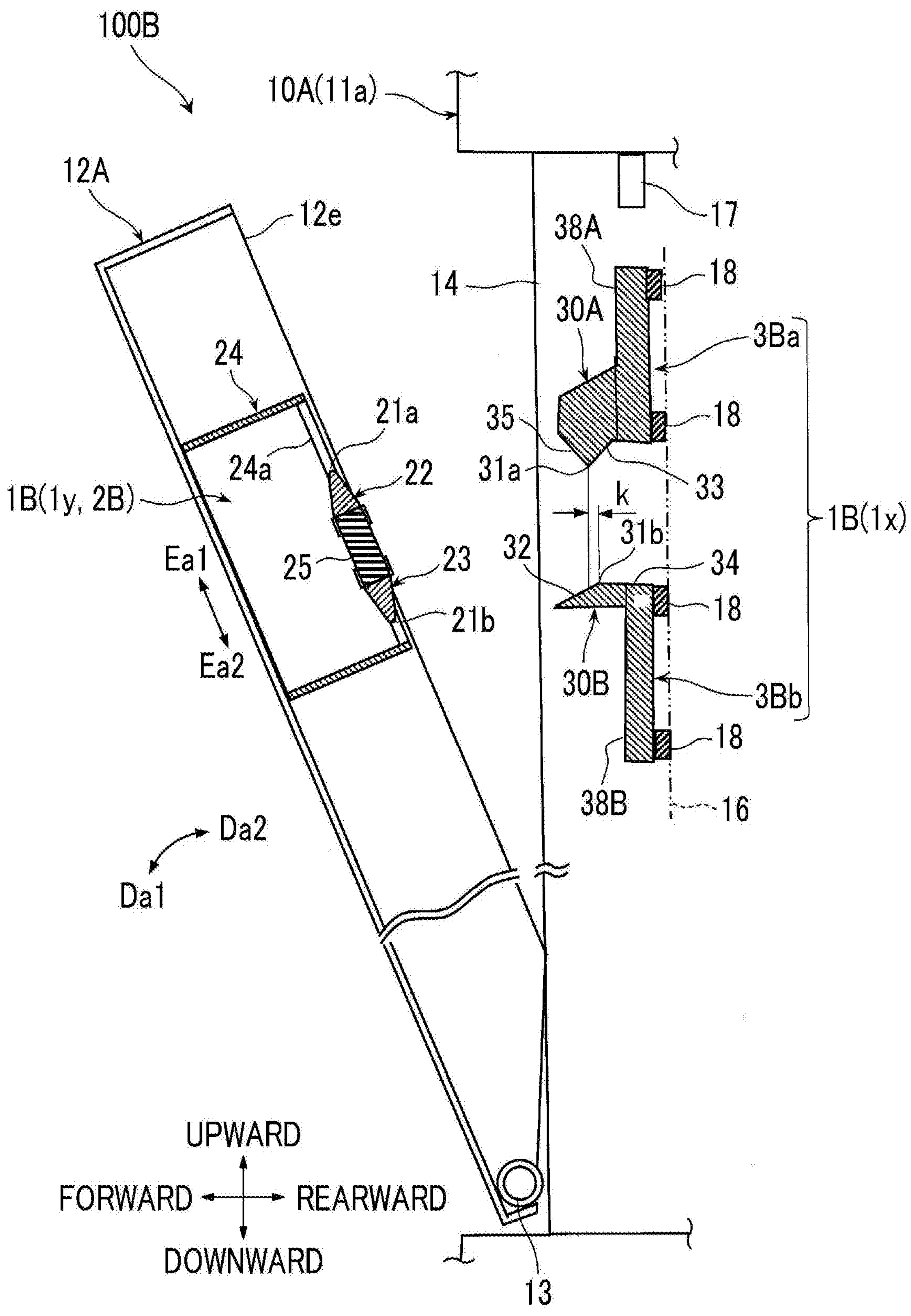
Figure 11:
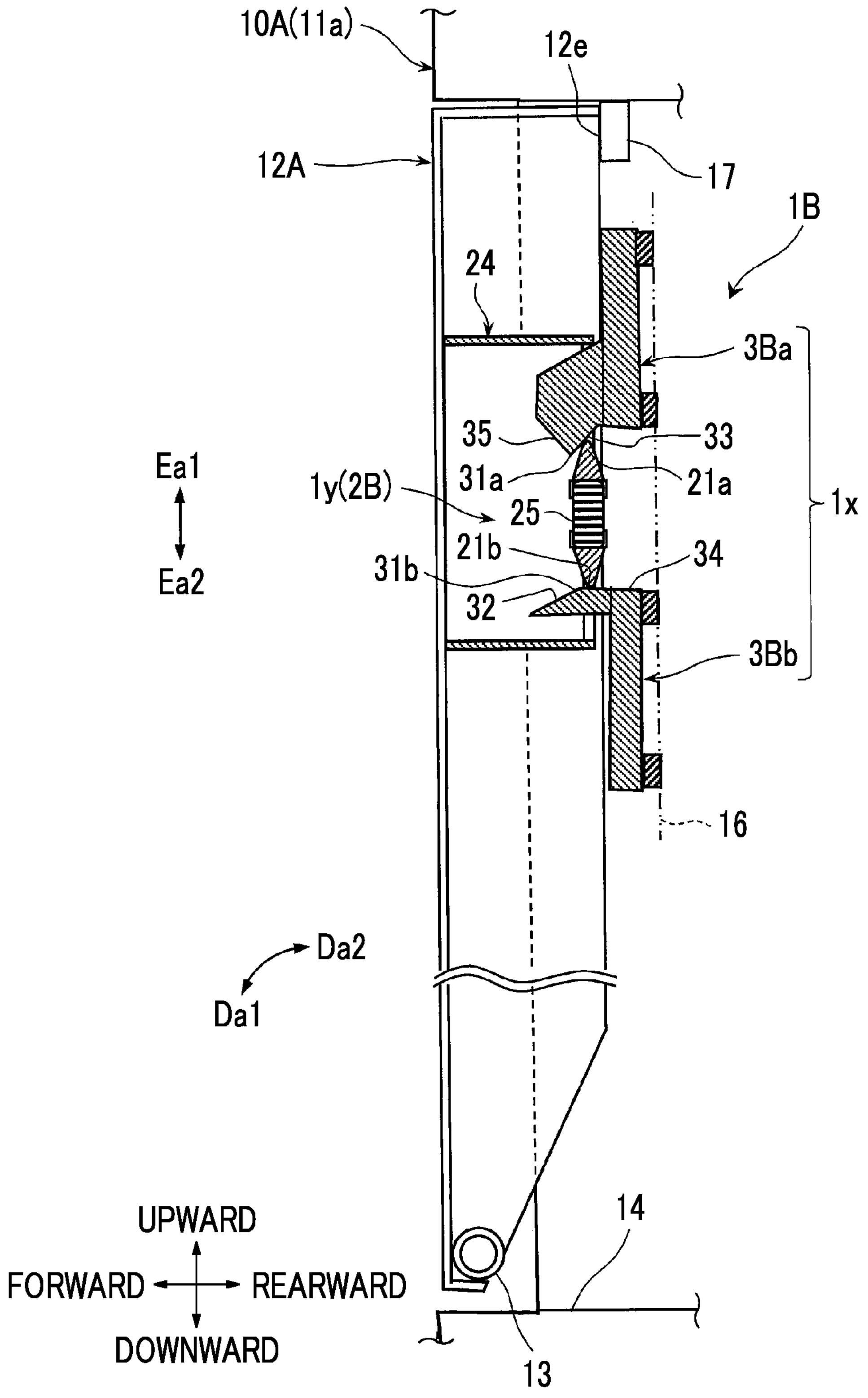
Figure 12:
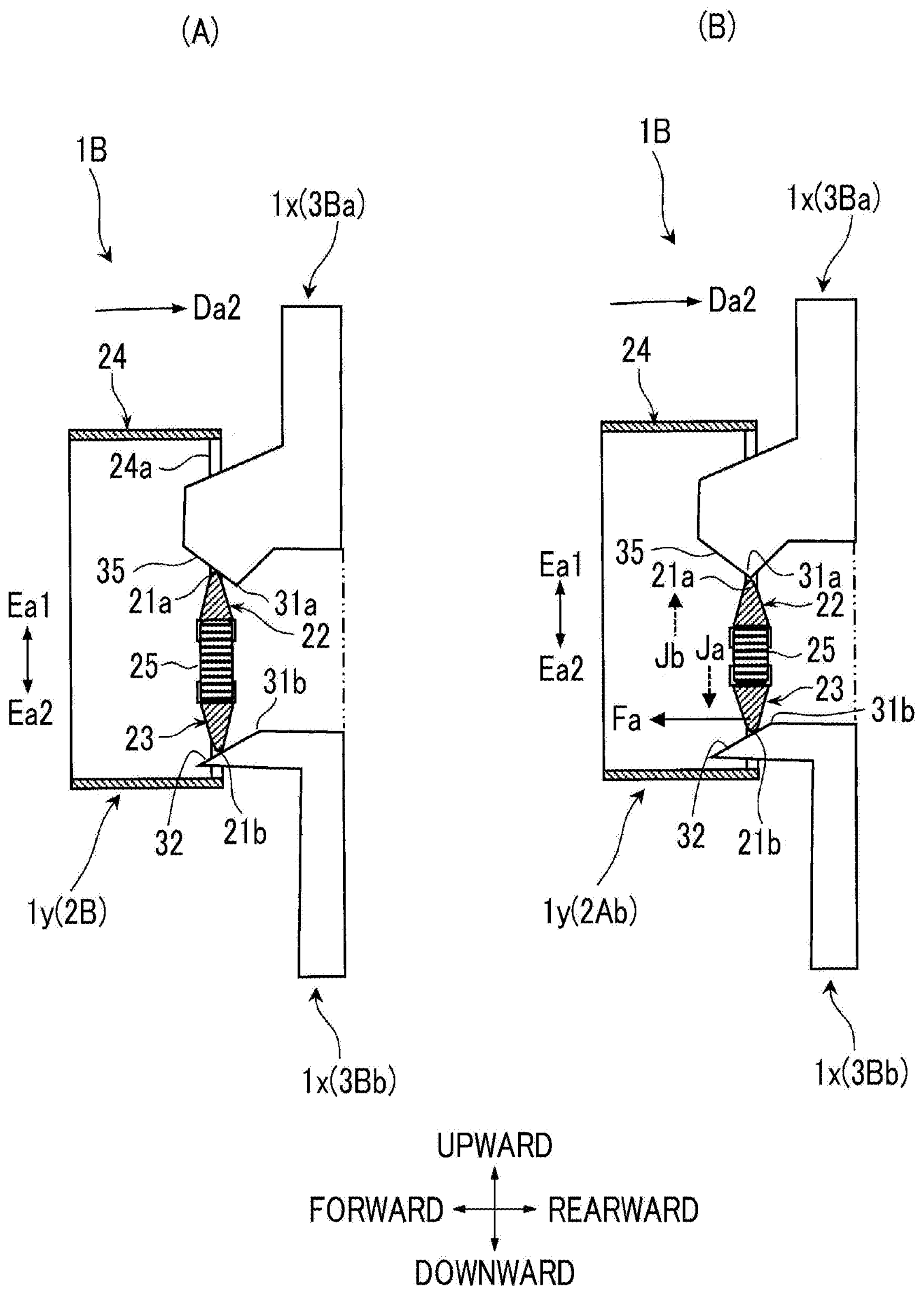
Figure 13:
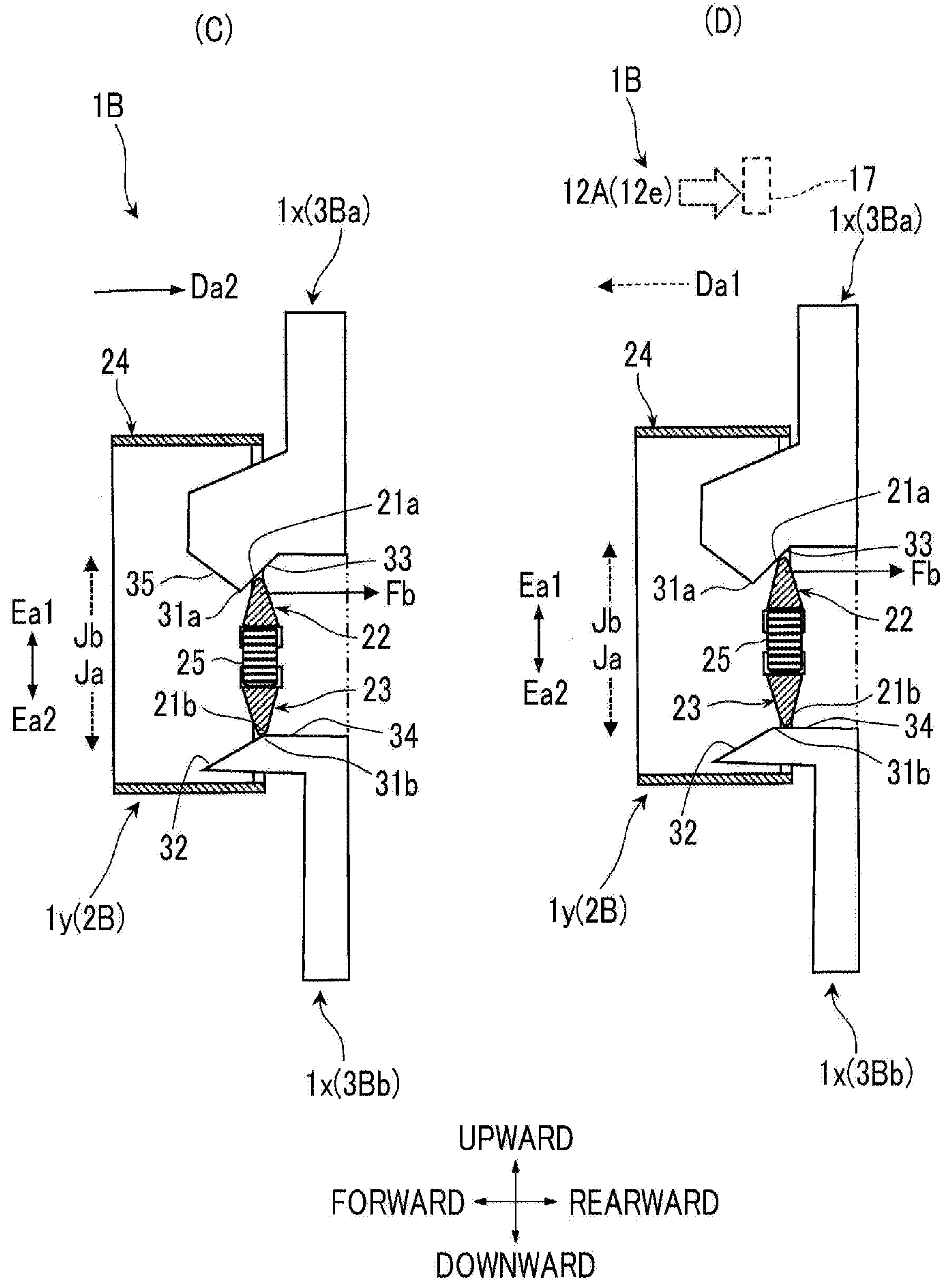
Figure 14:
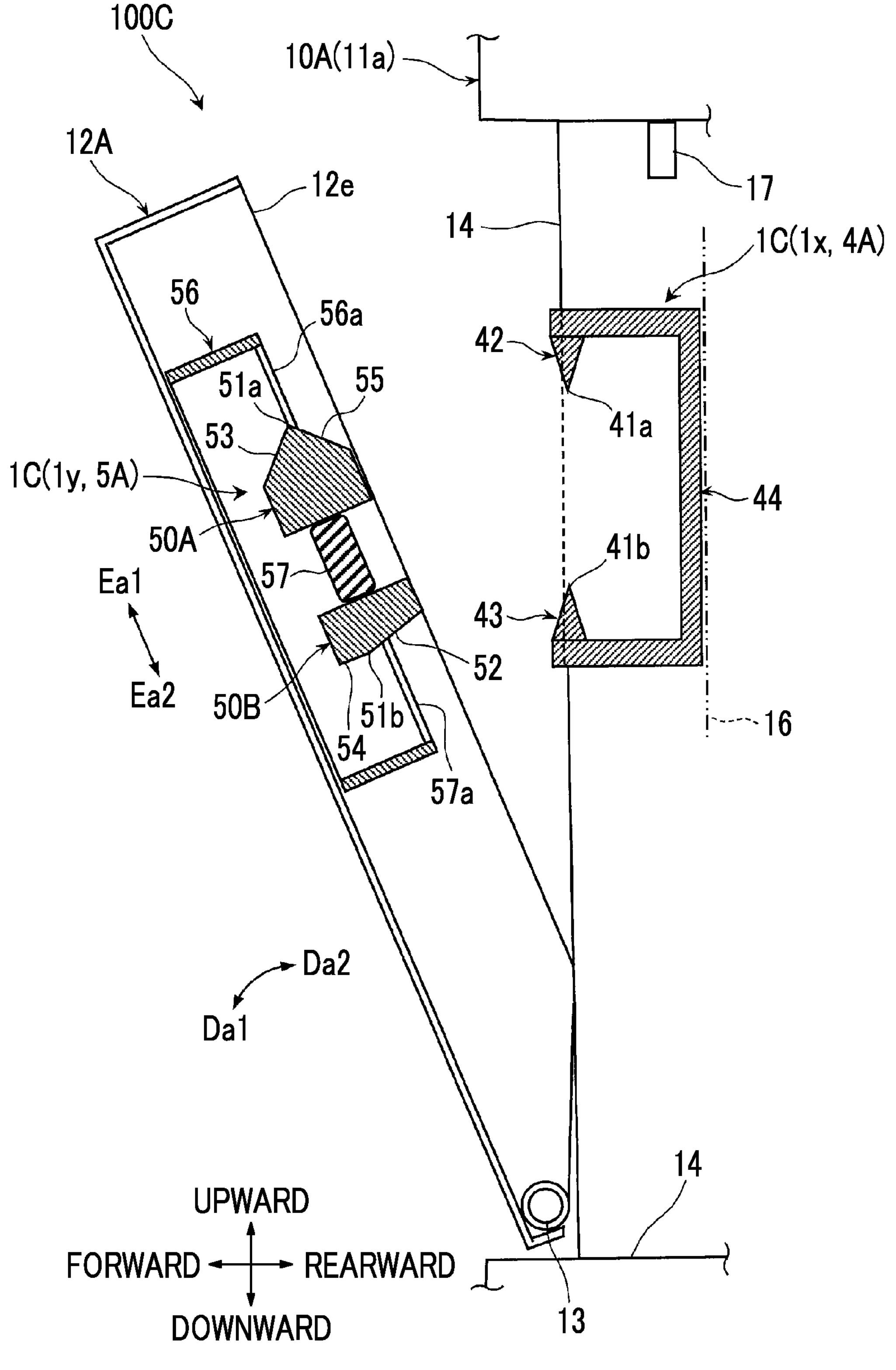
Figure 15:
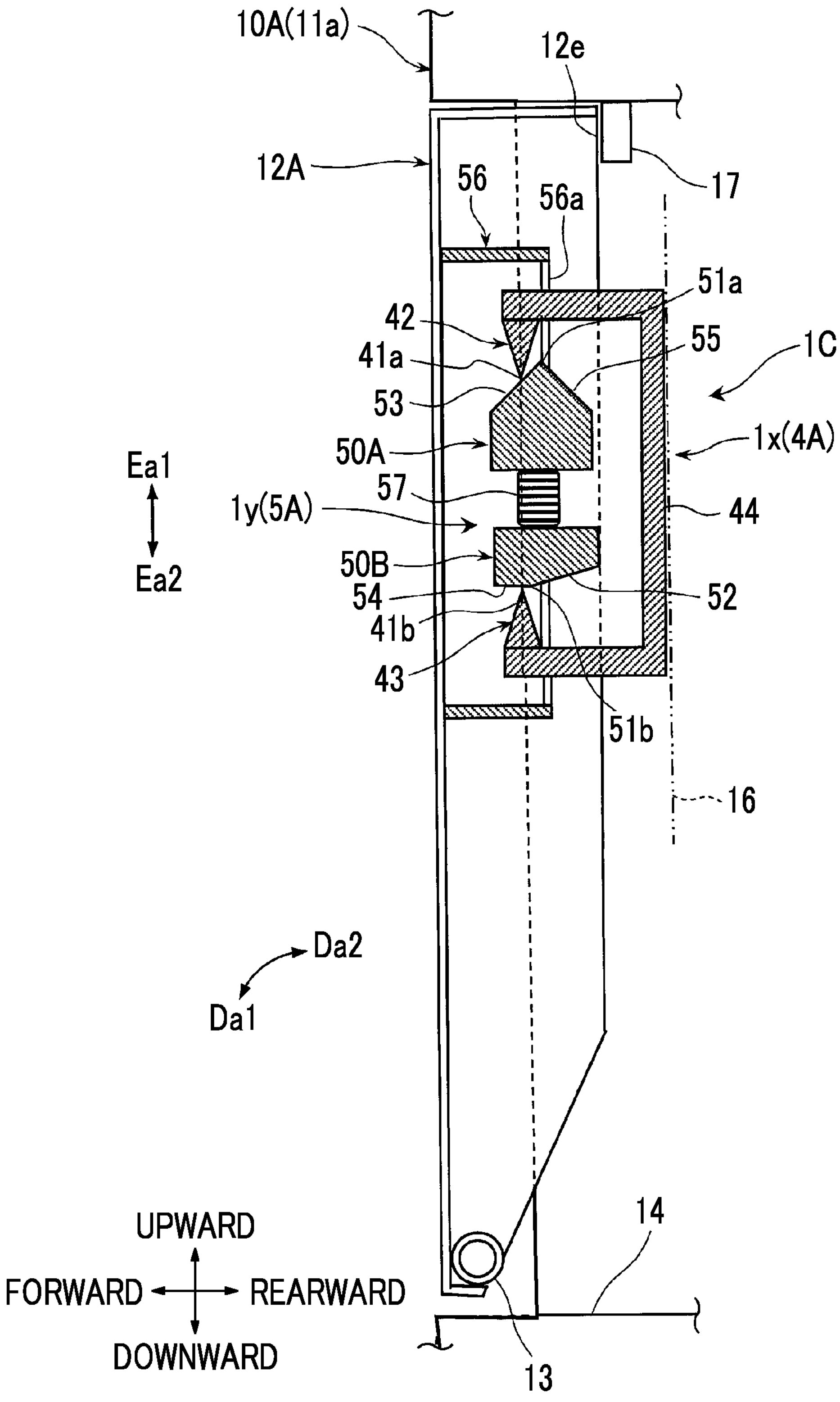
Figure 16:
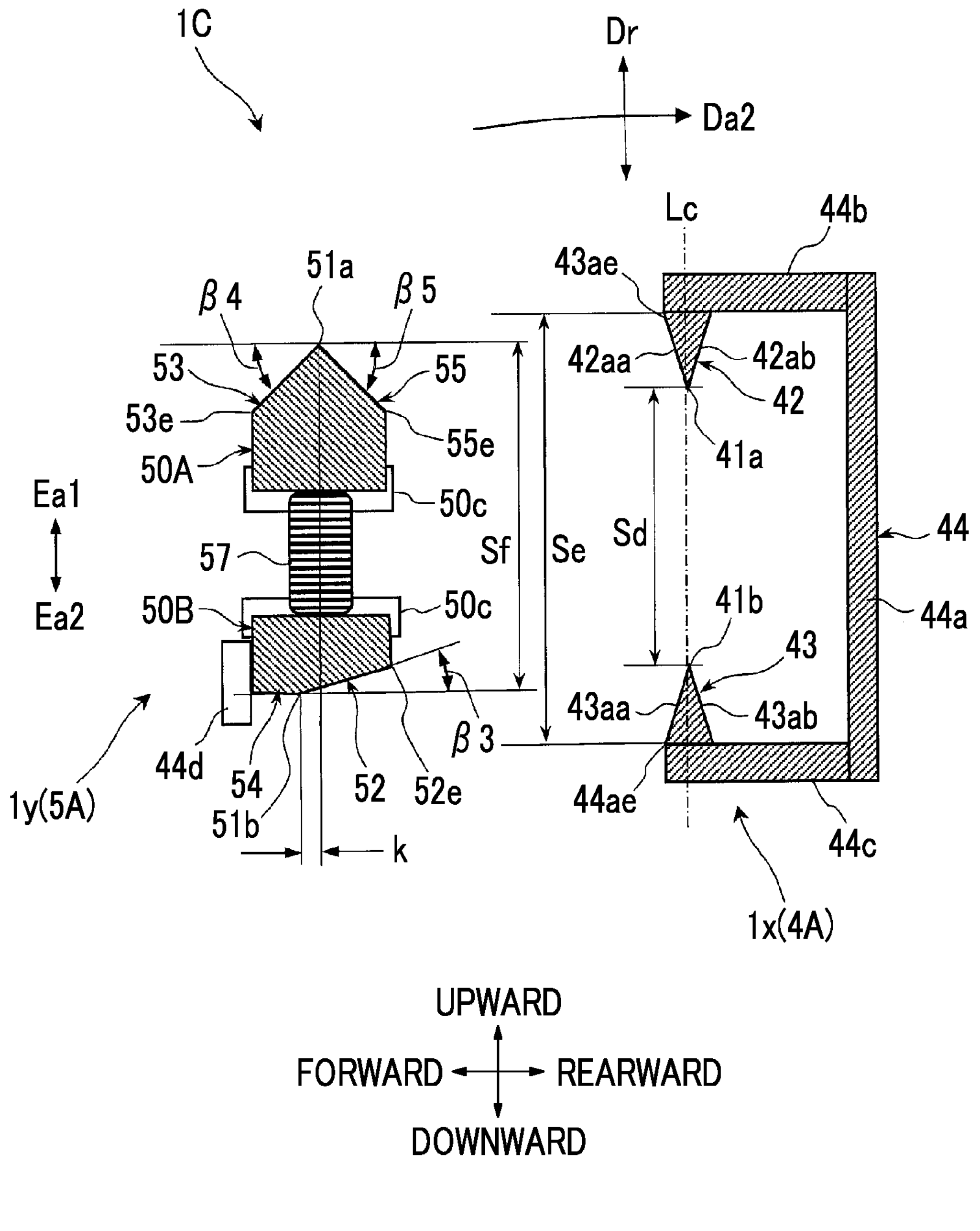
Figure 17:
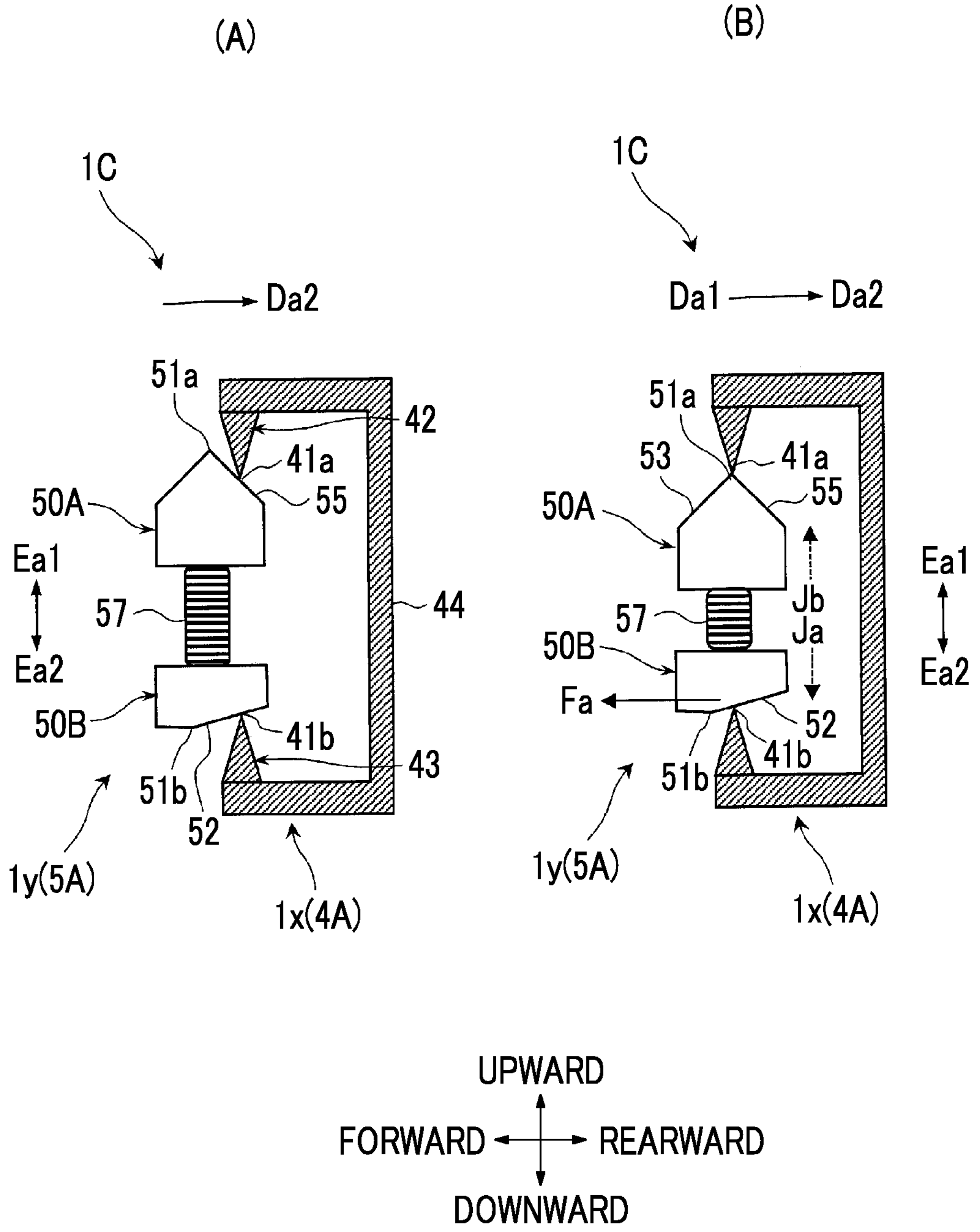
Figure 18:
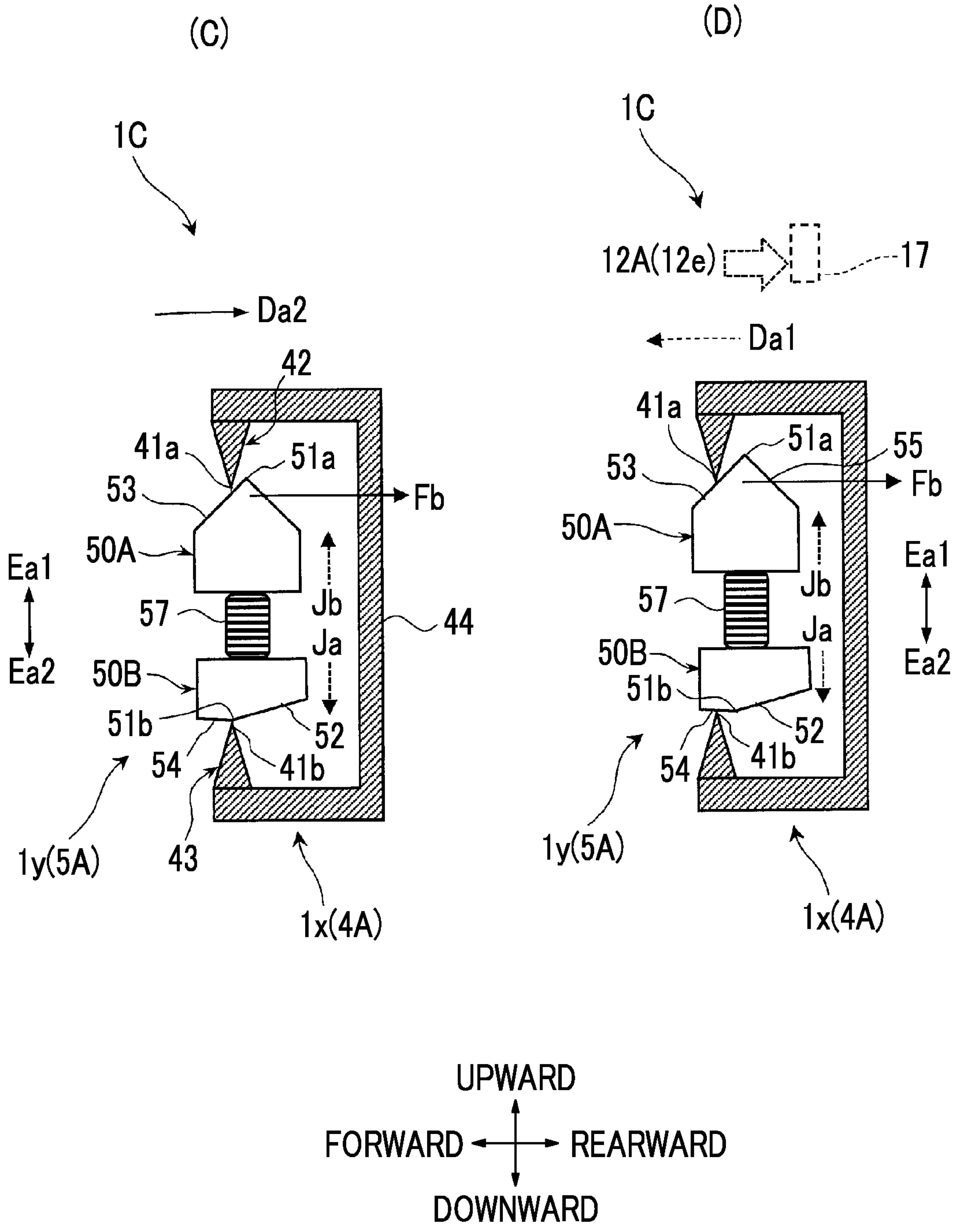
Figure 19:
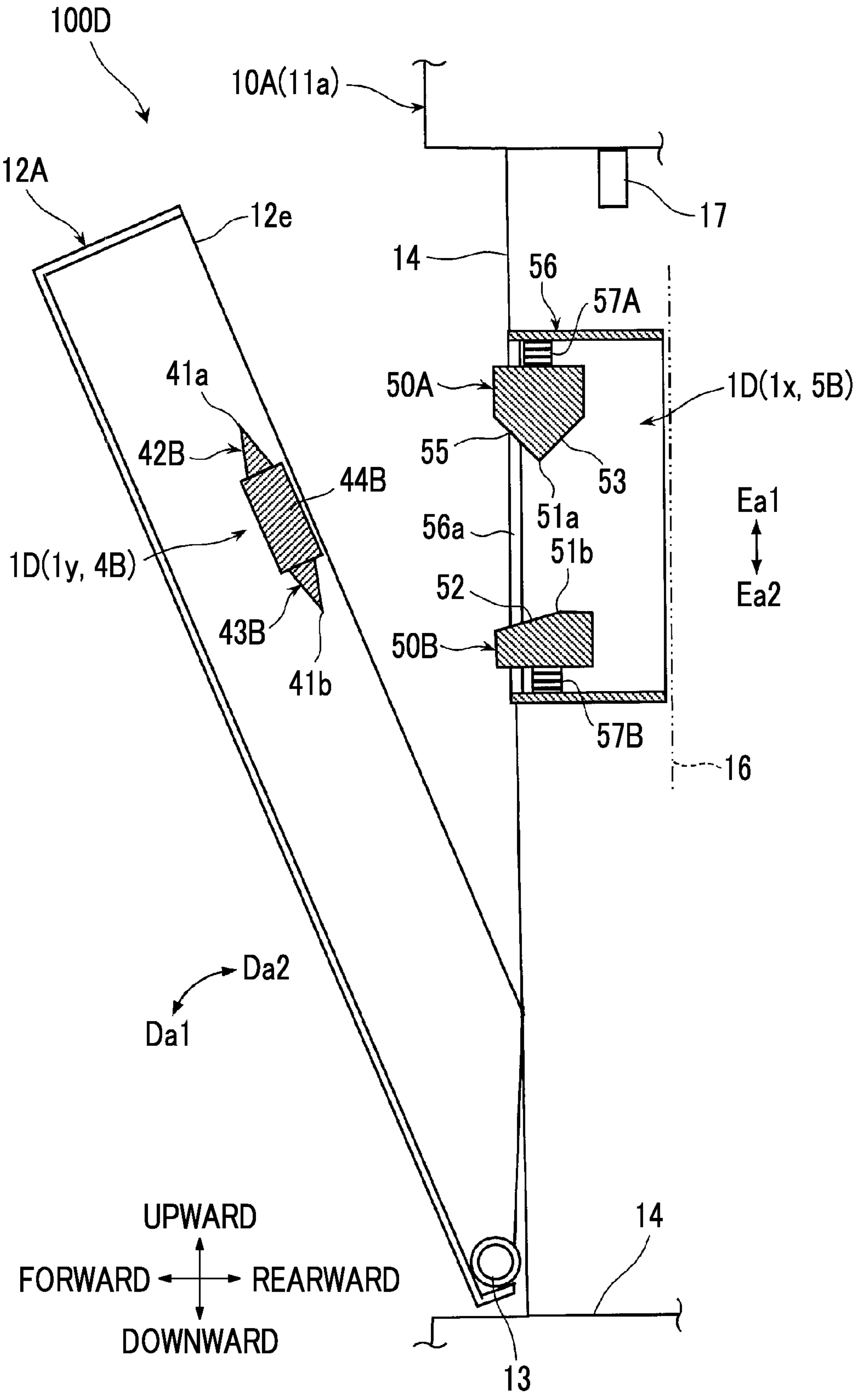
Figure 20:
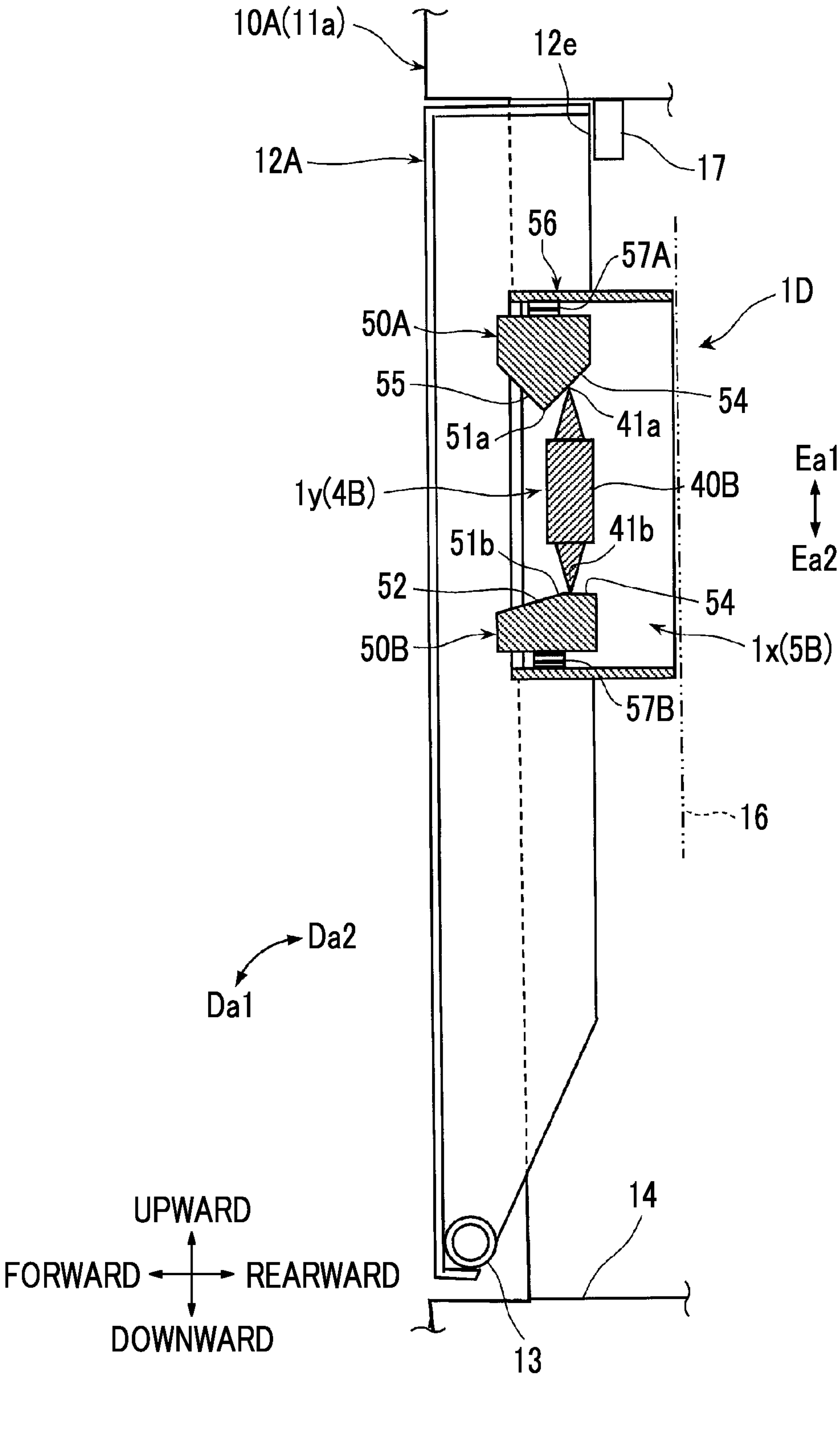
Figure 21:
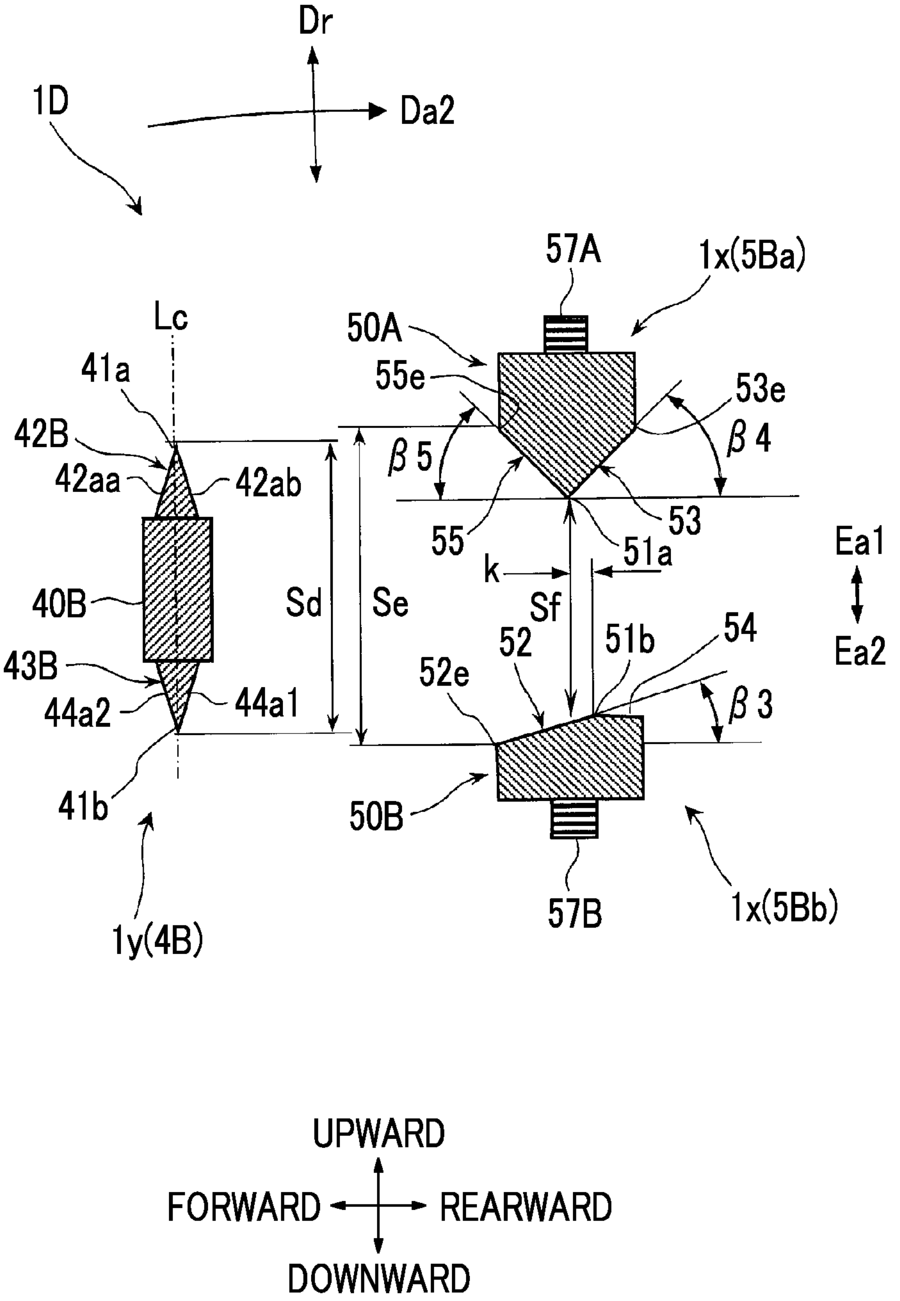
Figure 22:
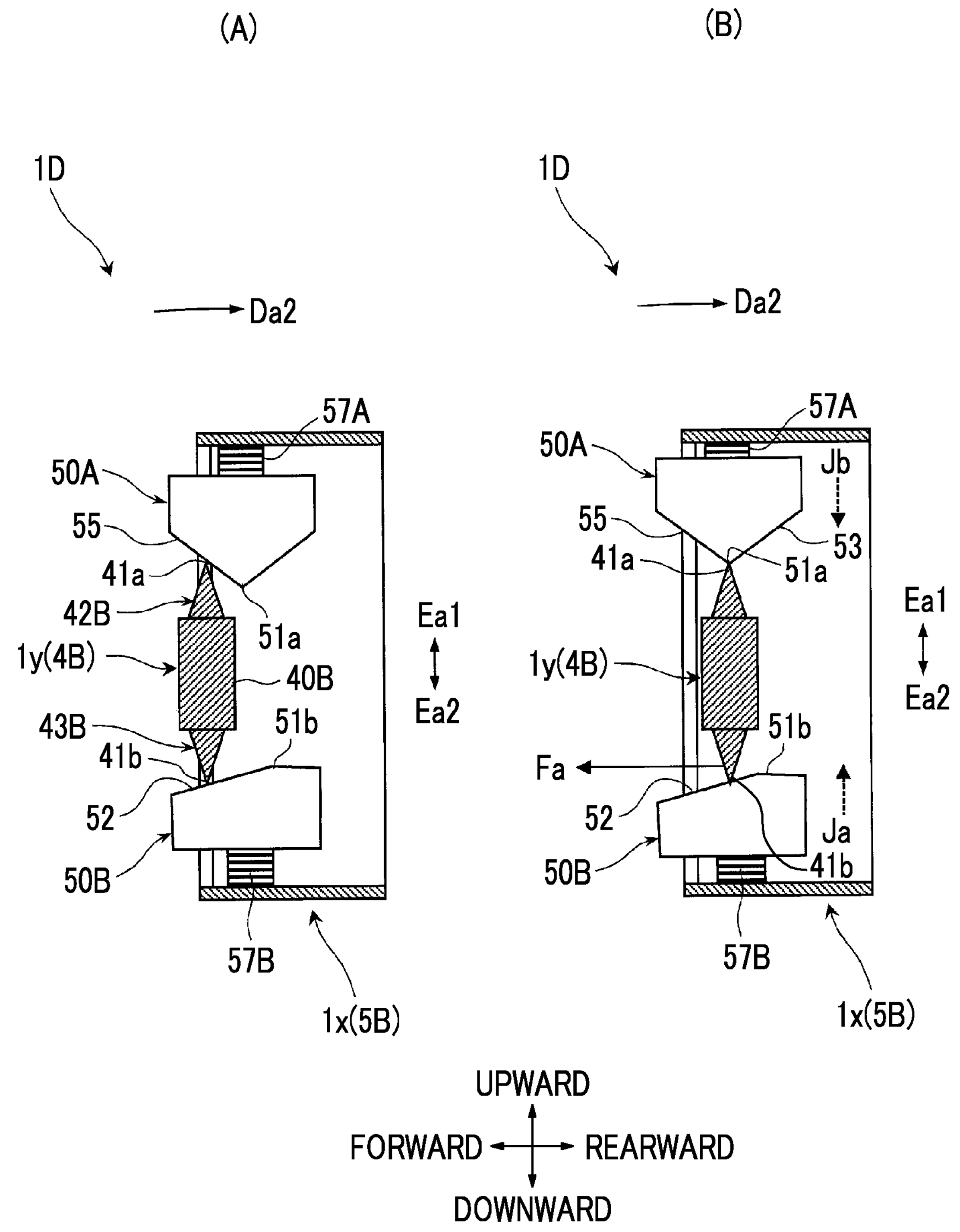
Figure 23:
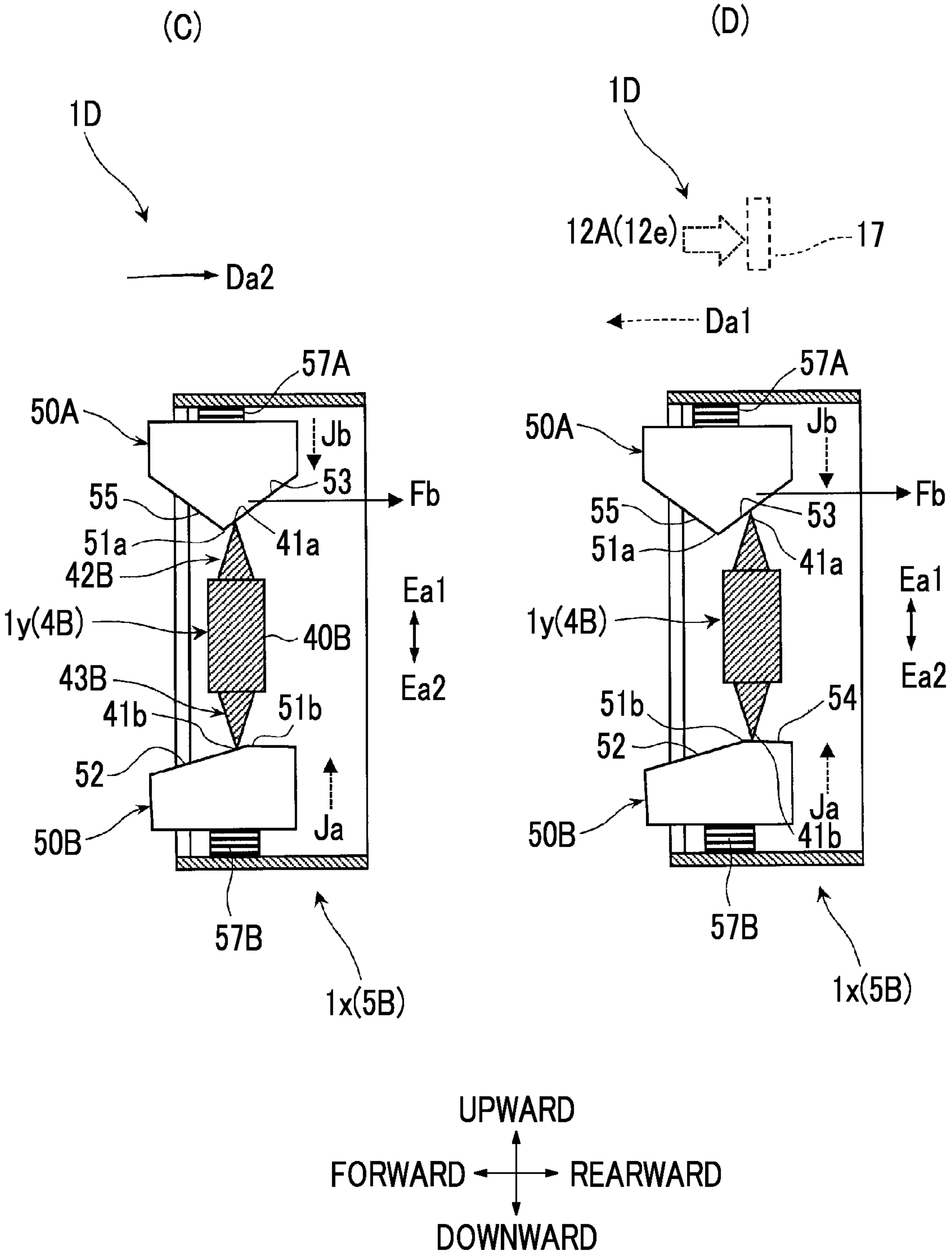
Figure 24A:
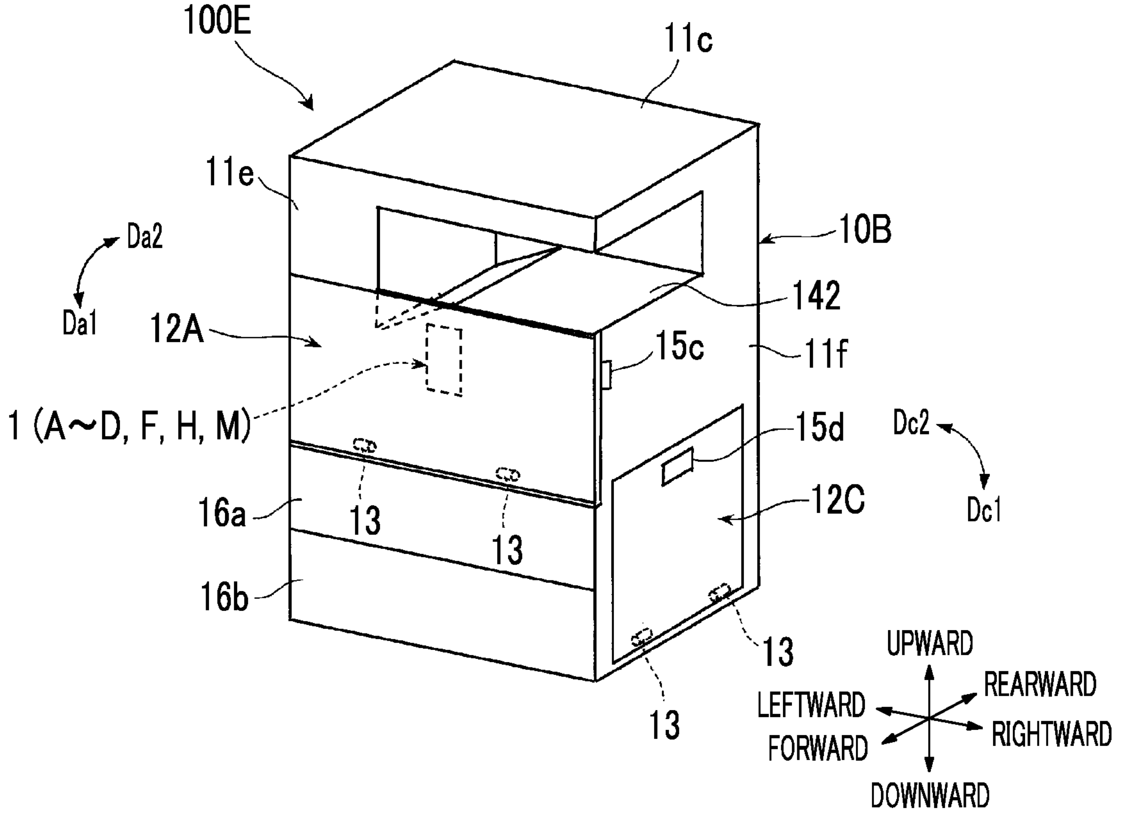
Figure 24B:
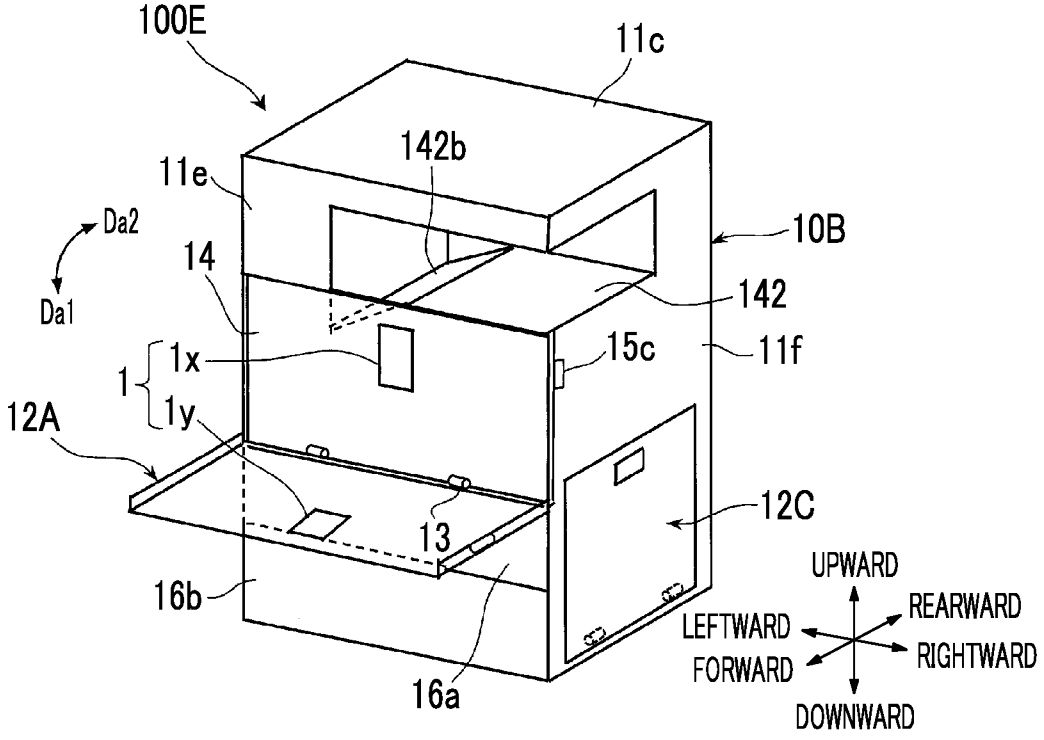
Figure 25:
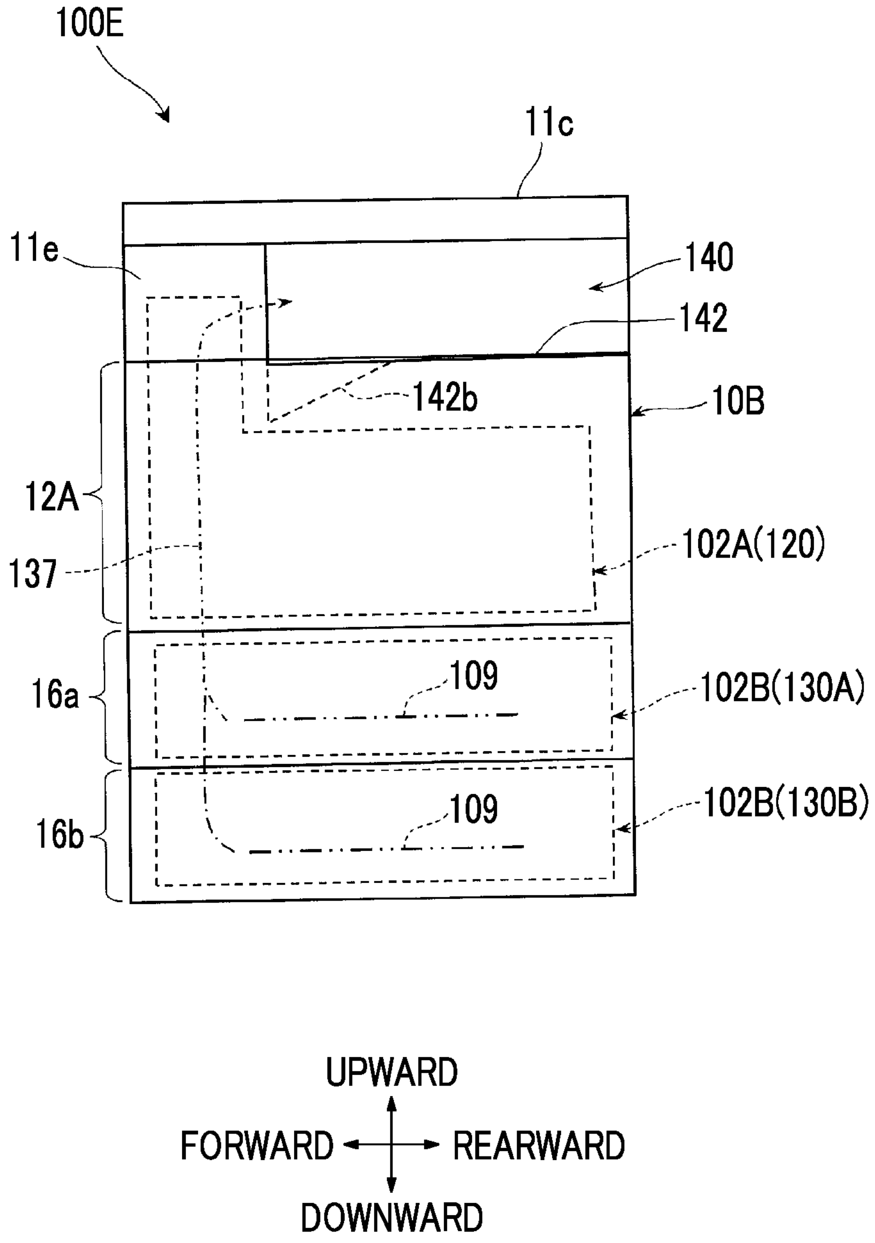
Figure 26:
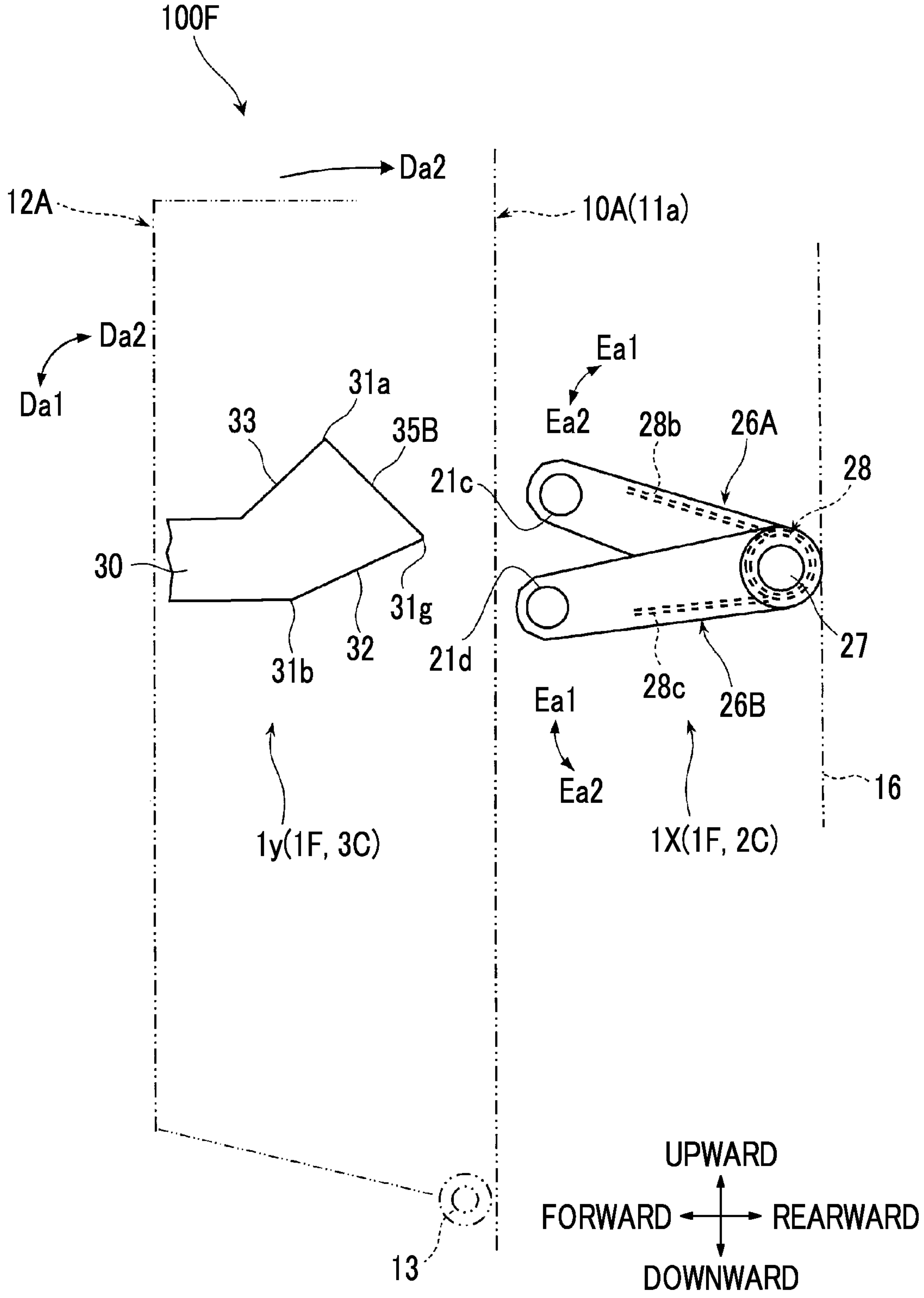
Figure 27A:
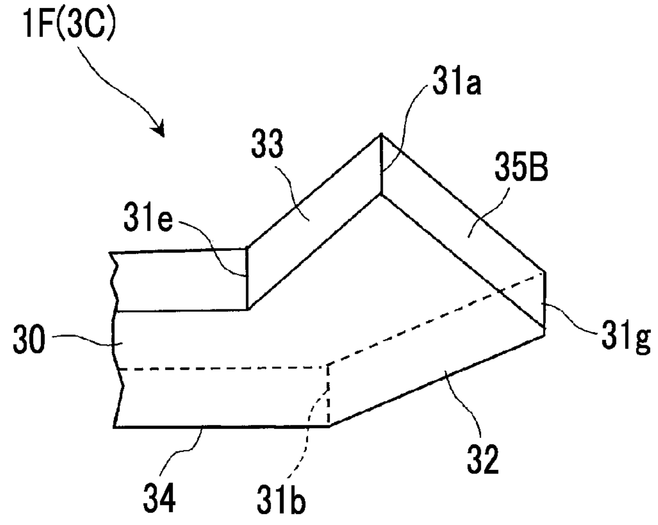
Figure 27B:
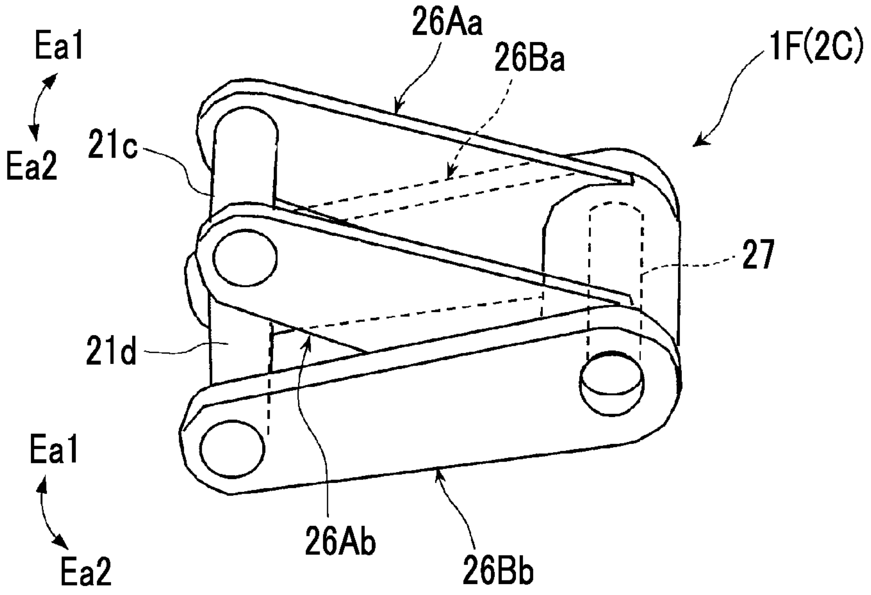
Figure 28:
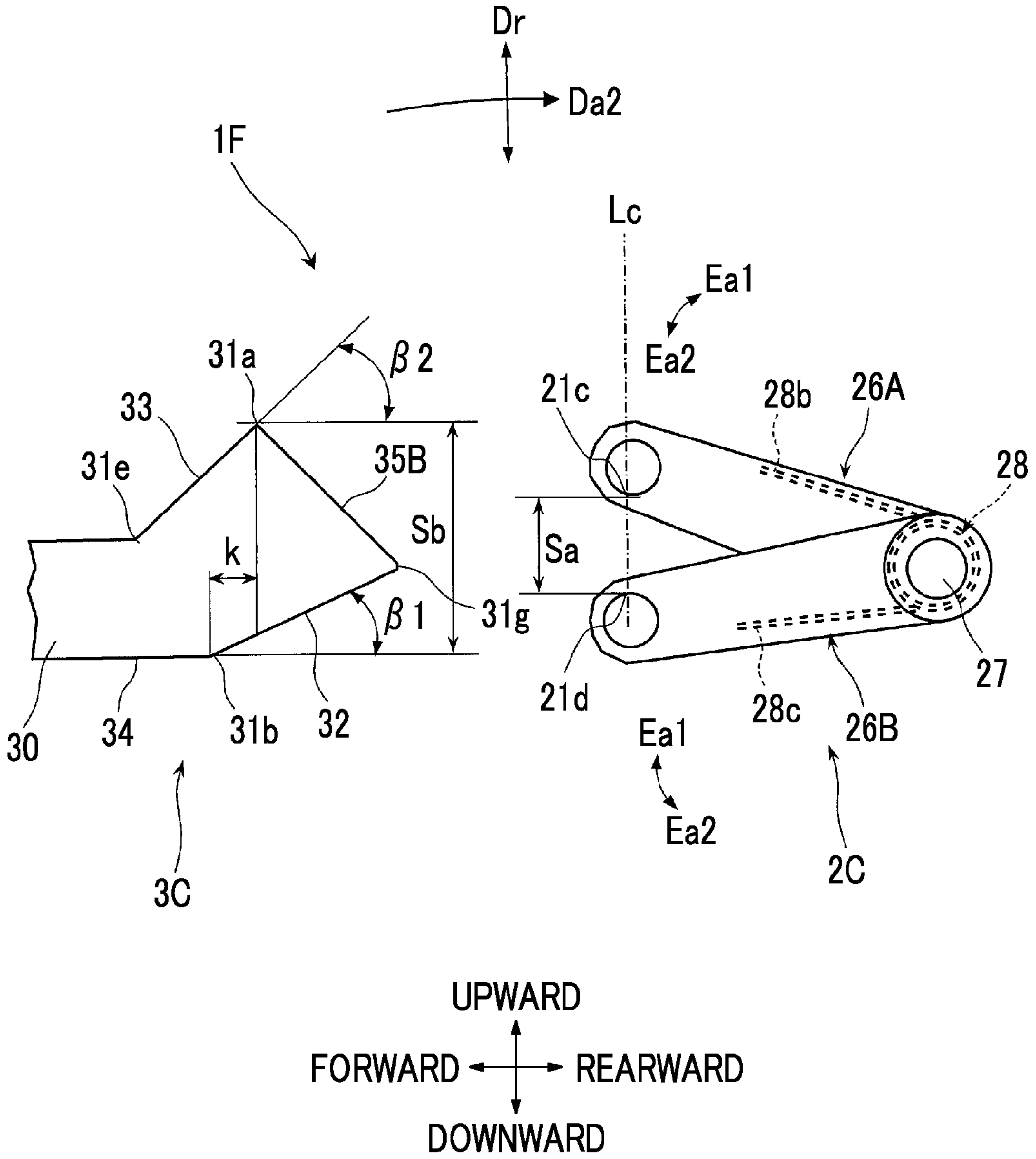
Figure 29A:
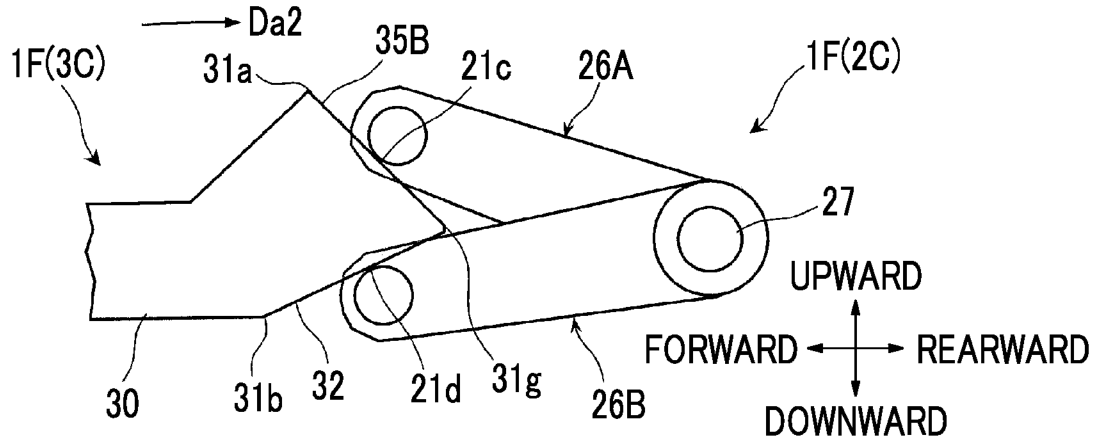
Figure 29B:
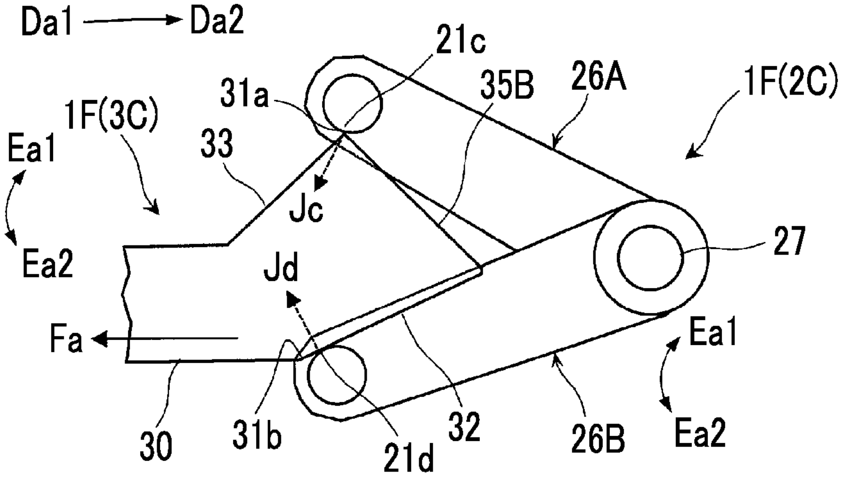
Figure 29C:
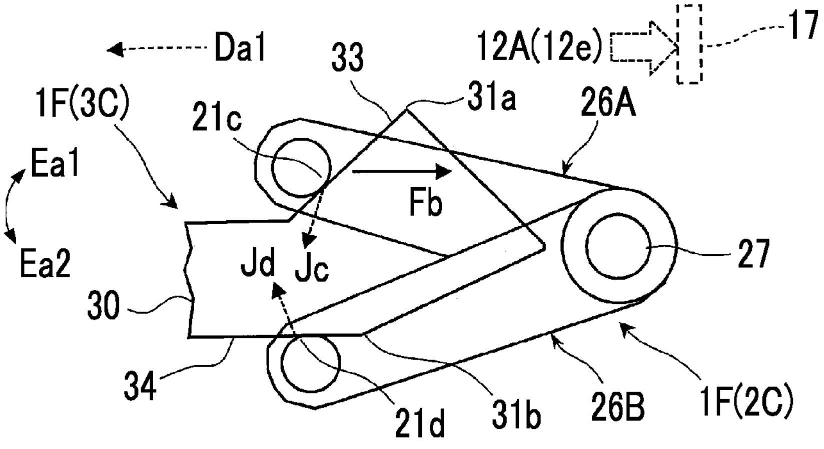
Figure 30A:
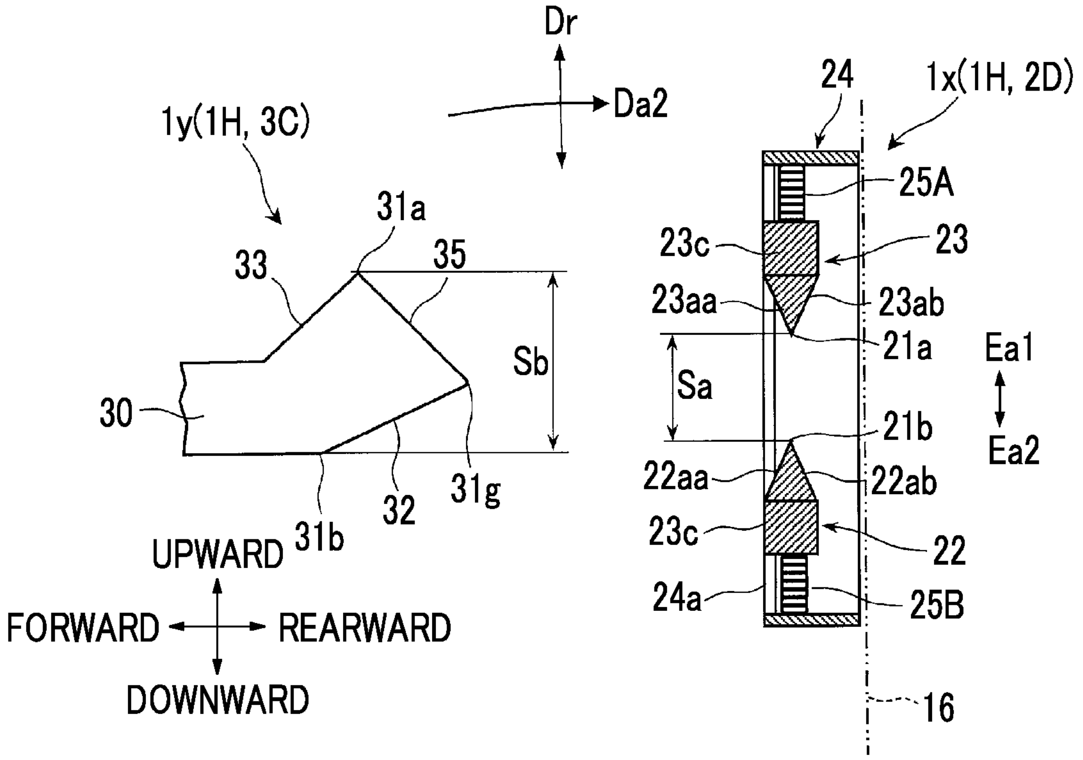
Figure 30B:
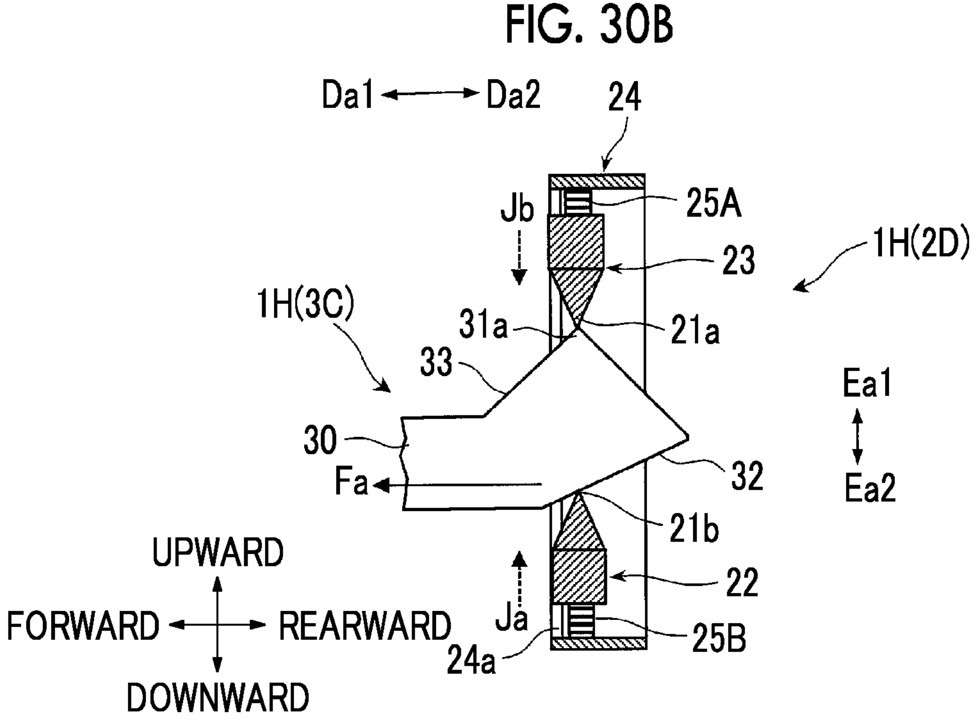
Figure 31A:
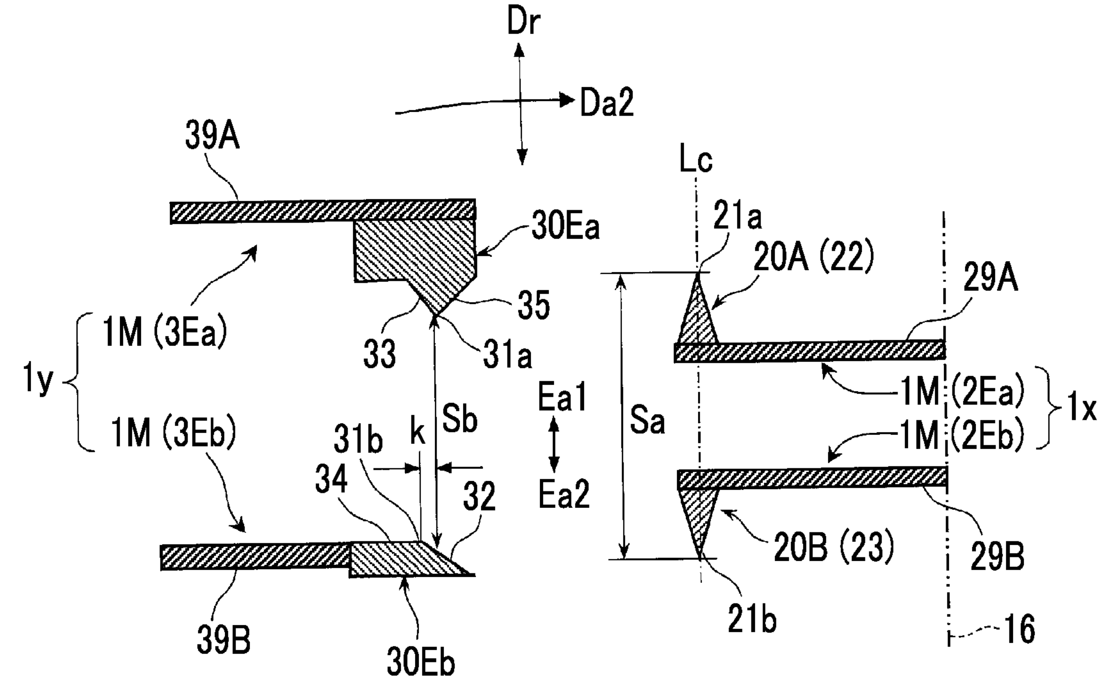
Figure 31B:
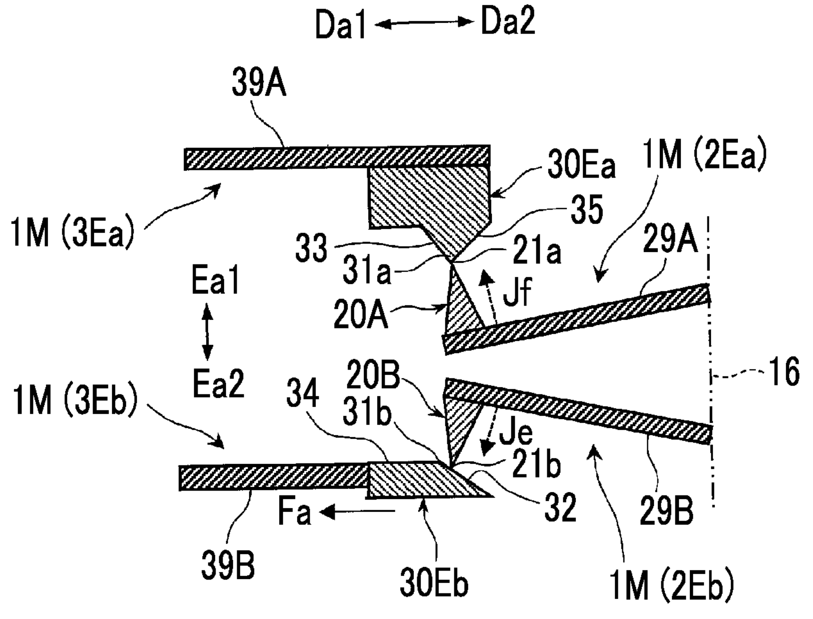

A part (A) in FIG. 8 is a schematic view when engagement of the latch mechanism starts, and a part (B) in FIG. 8 is a schematic view when one first top portion of the latch mechanism is in contact with one second top portion;

A part (C) in FIG. 9 is a schematic view when one first top portion of the latch mechanism passes through one second top portion, and A part (D) in FIG. 9 is a schematic view when engagement of the latch mechanism is completed;

FIG. 10 is a schematic sectional view of an opened portion of an opening/closing cover of a device including a latch mechanism according to a second exemplary embodiment;

FIG. 11 is a schematic sectional view of a closed portion of the opening/closing cover of the device shown in FIG. 10;

A part (A) in FIG. 12 is a schematic view when engagement of the latch mechanism starts, and a part (B) in FIG. 12 is a schematic view when one first top portion of the latch mechanism is in contact with a second top portion;

A part (C) in FIG. 13 is a schematic view when one first top portion of the latch mechanism shown in FIG. 10 passes through one second top portion, and a part (D) in FIG. 13 is a schematic view when engagement of the latch mechanism is completed;

FIG. 14 is a schematic sectional view of an opened portion of an opening/closing cover of a device including a latch mechanism according to a third exemplary embodiment;

FIG. 15 is a schematic sectional view of a closed portion of the opening/closing cover of the device shown in FIG. 14;

FIG. 16 is a schematic view of a main portion of the latch mechanism;

A part (A) in FIG. 17 is a schematic view when engagement of the latch mechanism shown in FIG. 16 starts, and a part (B) in FIG. 17 is a schematic view when one third top portion of the latch mechanism is in contact with one fourth top portion;

A part (C) in FIG. 18 is a schematic view when one third top portion of the latch mechanism passes through one fourth top portion, and a part (D) in FIG. 18 is a schematic view when engagement of the latch mechanism is completed;

FIG. 19 is a schematic sectional view of an opened portion of an opening/closing cover of a device including a latch mechanism according to a fourth exemplary embodiment;

FIG. 20 is a schematic sectional view of a closed portion of the opening/closing cover of the device shown in FIG. 19;

FIG. 21 is a schematic view of a main portion of the latch mechanism;

A part (A) in FIG. 22 is a schematic view when engagement of the latch mechanism shown in FIG. 19 starts, and a part (B) in FIG. 22 is a schematic view when one first top portion of the latch mechanism is in contact with one second top portion;

A part (C) in FIG. 23 is a schematic view when one first top portion of the latch mechanism passes through one second top portion, and a part (D) in FIG. 23 is a schematic view when engagement of the latch mechanism is completed;

FIG. 24A is a perspective view showing a closed state of an opening/closing cover of a device including a latch mechanism according to a fifth exemplary embodiment;

FIG. 24B is a perspective view illustrating an opened state of the opening/closing cover of the device shown in FIG. 24A;

FIG. 25 is a schematic front view of the device shown in FIGS. 24A and 24B;

FIG. 26 is a conceptual diagram of a latch mechanism according to Modification Example 1;

FIG. 27A is a perspective view of a second engagement body in the latch mechanism according to Modification Example 1;

FIG. 27B is a perspective view of a third engagement body in the latch mechanism;

FIG. 28 is a schematic view of a main portion of the latch mechanism according to Modification Example 1;

FIG. 29A is a schematic view when engagement of the latch mechanism according to Modification Example 1 starts;

FIG. 29B is a schematic view when one first top portion of the latch mechanism is in contact with one second top portion;

FIG. 29C is a schematic view when engagement of the latch mechanism is completed;

FIG. 30A is a schematic view of a main portion of a latch mechanism according to Modification Example 2;

FIG. 30B is a schematic view when one first top portion of the latch mechanism is in contact with one second top portion;

FIG. 31A is a schematic view of a main portion of a latch mechanism according to Modification Example 3; and FIG. 31B is a schematic view when one first top portion of the latch mechanism is in contact with one second top portion.

DETAILED DESCRIPTION

Hereinafter, exemplary embodiments for the present invention will be described with reference to the drawings.

First Exemplary Embodiment

Figure 1A:
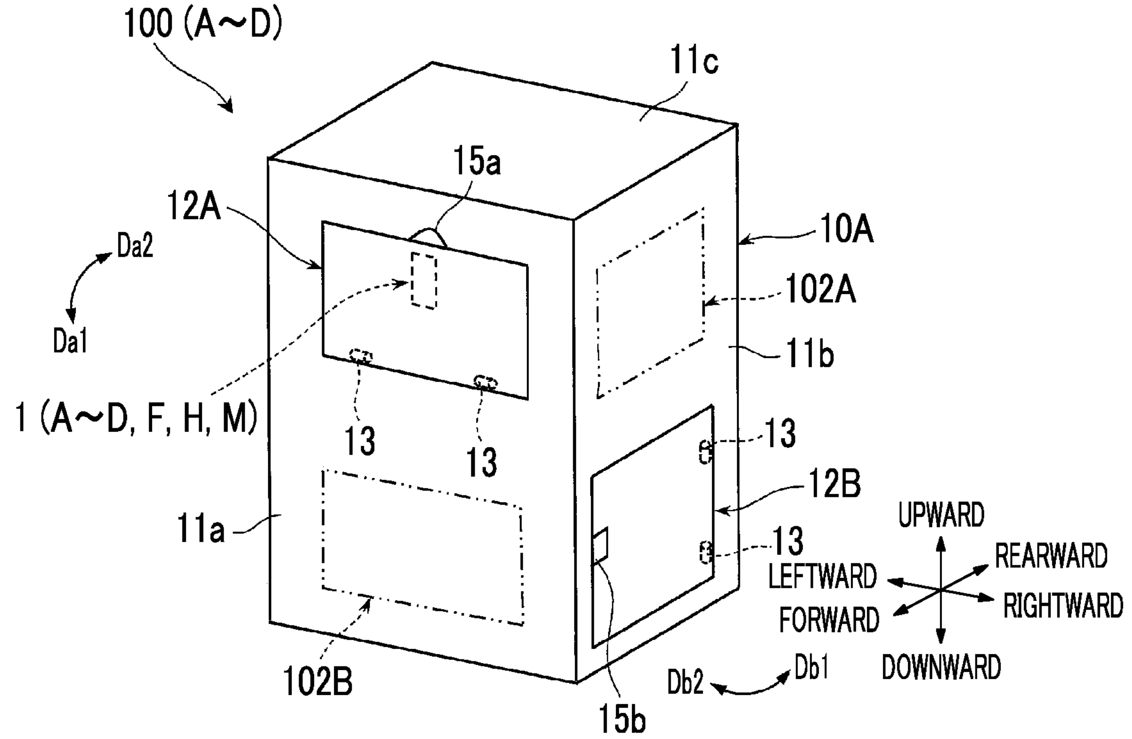
FIG. 1A is a perspective view showing a closed state of an opening/closing cover of a device including a latch mechanism according to a first exemplary embodiment.
Figure 1B:
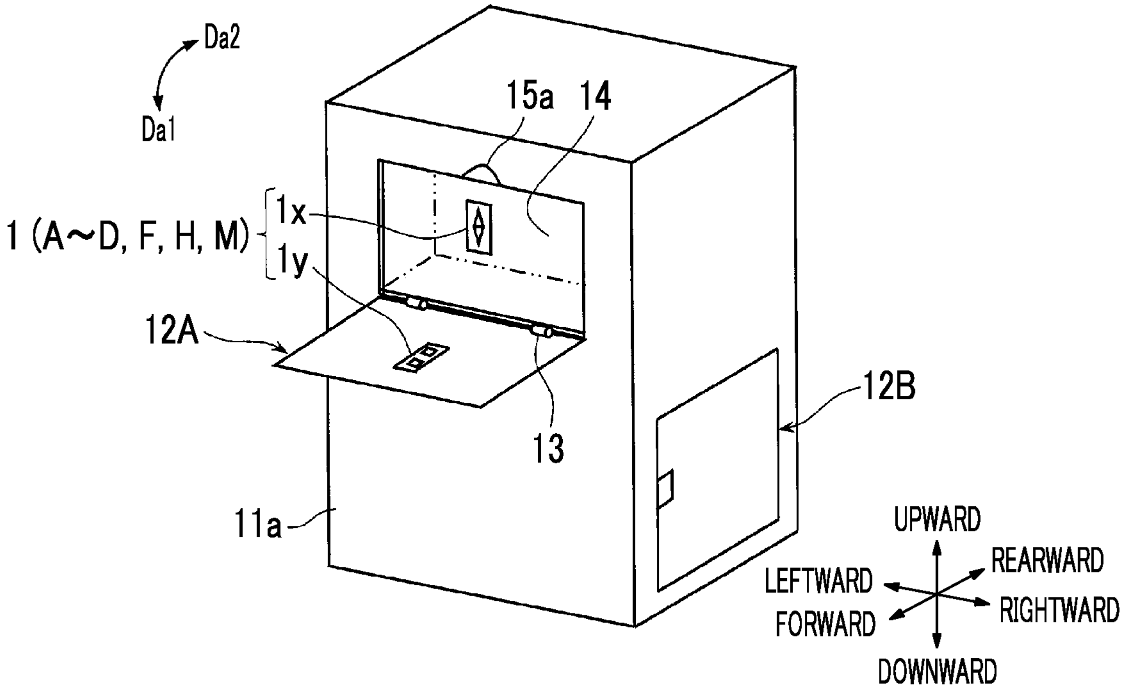
FIG. 1B is a perspective view showing an opened state of the opening/closing cover of the device shown in FIG. 1A.
Figure 2:
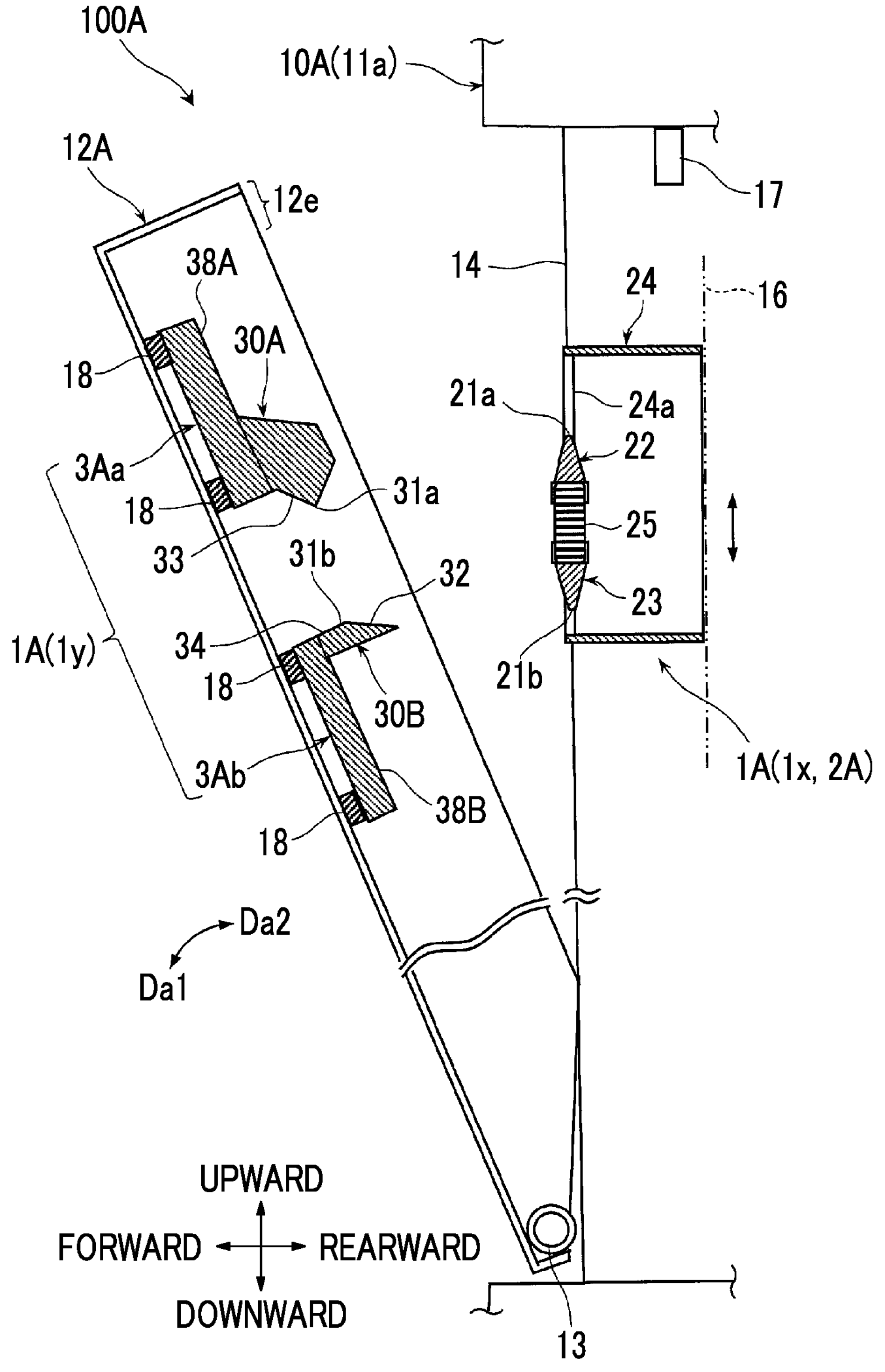
FIG. 2 is a schematic sectional view of an opened portion of the opening/closing cover of the device shown in FIGS. 1A and 1B.
Figure 3:
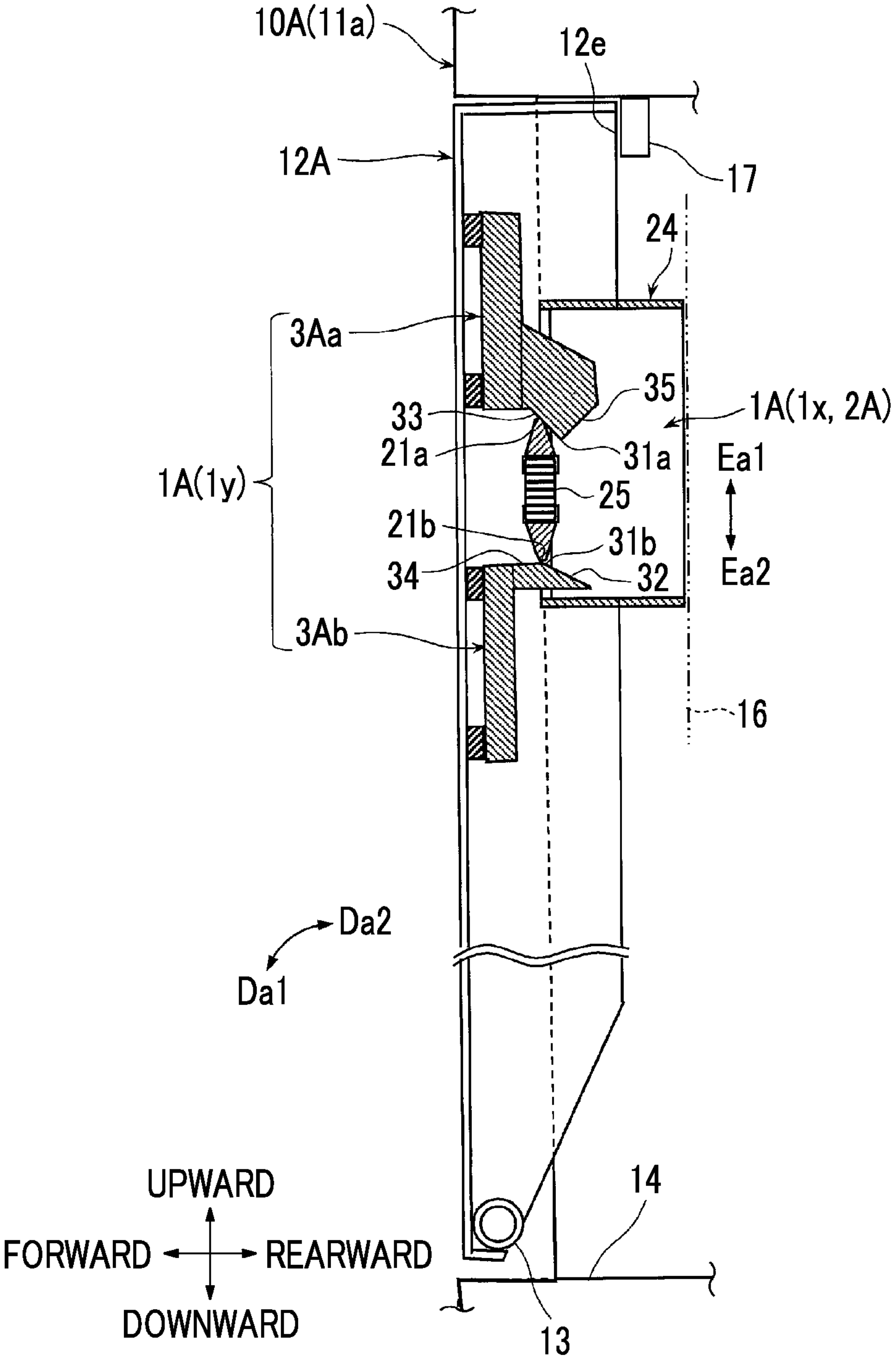
FIG. 3 is a schematic sectional view of a closed portion of the opening/closing cover of the device shown in FIGS. 1A and 1B.
Figure 4A:
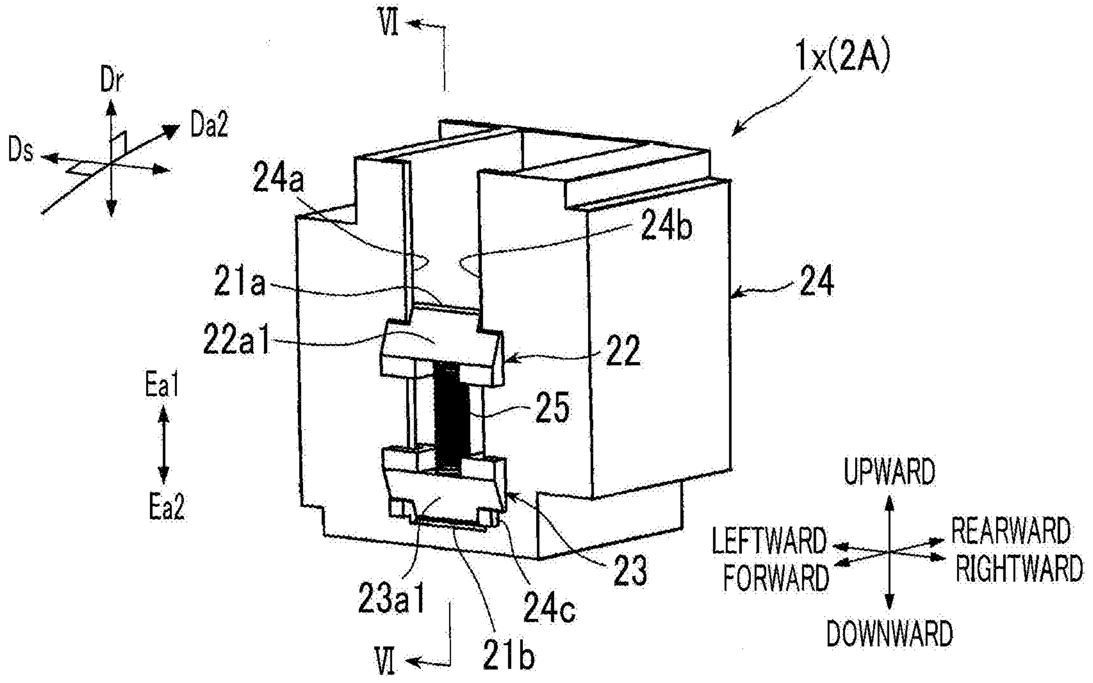
FIG. 4A is a perspective view of a portion of the latch mechanism arranged on a main body side of the device.
Figure 4B:
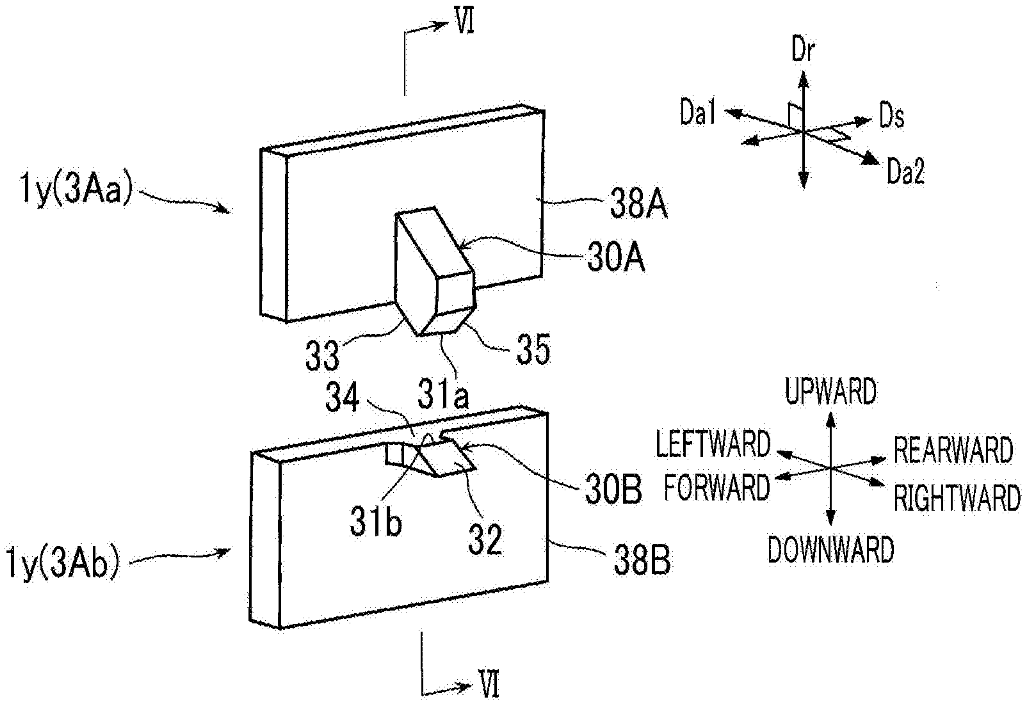
FIG. 4B is a perspective view of a remaining portion of the latch mechanism arranged on the opening/closing cover side of the device.

FIGS. 1A and 1B are perspective views conceptually showing a device 100A including a latch mechanism 1A according to a first exemplary embodiment of the present invention. FIG. 2 is a schematic sectional view of an opened portion of an opening/closing cover of the device 100A. FIG. 3 is a schematic sectional view of a closed portion of the opening/closing cover of the device 100A. FIGS. 4A and 4B are perspective views of the latch mechanism 1A.

Device Including Latch Mechanism

As shown in FIGS. 1A and 1B, the device 100A including the latch mechanism 1A includes a housing 10A which is an example of a main body.

The housing 10A is configured to have a required outer shape, and an outside thereof is covered with an exterior cover 11. In addition, a plurality of functional units 102A and 102B for achieving required functions of the device 100A are arranged inside the housing 10A. The functional units 102A and 102B are not limited to an image forming unit or a medium supply unit to be described later as an example, and include a portion having any function in other various fields. Therefore, the device 100A can be configured to serve as any type of the device.

In addition, as shown in FIGS. 1A and 1B, the device 100A is configured to serve as an opening/closing cover 12A and 12B which are examples of the opening/closing body in which a portion of the exterior cover 11 is opened/closed to cover and expose a portion of the device 100A. The device

100A may include an opening/closing cover other than the opening/closing covers 12A and 12B.

For example, the opening/closing cover 12A is a rectangular cover that constitutes a portion of the exterior cover 11*a* arranged on a front side of the device 100A. The opening/closing cover 12A is a vertical opening type of the opening/closing cover whose lower end portion of which is supported by a hinge 13 to be openable/closable, and which is opened/closed by rotating at a predetermined angle in directions indicated by arrows Da1 and Da2 while an axis of the hinge 13 functions as a fulcrum. A reference numeral 14 shown in FIG. 1B indicates an opening portion when opened/closed by the opening/closing cover 12A in the main body 10A.

For example, the opening/closing cover 12B is a rectangular cover that constitutes a portion of the exterior cover 11*b* arranged on a right side surface of the device 100A. The opening/closing cover 12B is a so-called horizontal opening type opening/closing cover whose front side end portion is supported by the hinge 13 to be openable/closable, and which is opened/closed by rotating around the axis of the hinge 13 at a predetermined angle in directions indicated by arrows Db1 and Db2. Reference numerals 15*a* and 15*b* shown in FIGS. 1A and 1B indicate recessed portions or handle portions for guiding an operator's hand in a case where the opening/closing cover 12A and the opening/closing cover 12B are respectively opened.

Furthermore, the device 100A is provided with a latch mechanism 1A (to be described later) engaging (latch for hooking) with one (single) opening/closing cover 12A when closed.

The remaining opening/closing cover 12B or other opening/closing covers (not shown) are provided with a latch mechanism or an opening/closing mechanism having a configuration different from a configuration of the latch mechanism 1A, but the latch mechanism 1A may be provided in the same manner.

Latch Mechanism

As shown in FIGS. 1A to 3, the latch mechanism 1A includes a main body engagement unit 1*x* arranged in the main body 10A and an opening/closing body engagement unit 1*y* arranged in the opening/closing cover 12A and engaging with the main body engagement unit 1*x* when the opening/closing cover 12A is closed.

For example, the main body engagement unit 1*x* is attached to an attachment frame 16 arranged at a required position of an opening portion 14 of the main body 10A. The main body engagement unit 1*x* in the first exemplary embodiment is arranged at a position substantially in a right and left center of the opening portion 14 and on an upper side thereof.

In addition, the opening/closing body engagement unit 1*y* is attached to a required position on a back surface (rear surface) of the opening/closing cover 12A. The opening/closing body engagement unit 1*y* in the first exemplary embodiment is arranged at a position where the opening/closing cover 12A can face and engage with the main body engagement unit 1*x* when the opening/closing cover 12A is closed.

Then, as shown in FIGS. 2 to 9, the main body engagement unit 1*x* is configured to include a first engagement body 2A having a pair of first top portions 21*a* and 21*b* which can displace the opening/closing cover 12A in a direction Dr (refer to FIGS. 4A and 4B) vertically orthogonal to a closing direction Da2. For example, the pair of first top portions 21*a* and 21*b* can be displaced against a biasing force of a biasing member 25 (to be described later).

In addition, as shown in FIGS. 2 to 9, the opening/closing body engagement unit 1*y* is configured to include a second engagement body 3A having a pair of second top portions 31*a* and 31*b* coming into contact with the pair of first top portions 21*a* and 21*b* in the main body engagement unit 1*x* at respectively different timings.

Here, all of the first top portions 21*a* and 21*b* and the second top portions 31*a* and 31*b* are recessed inflection point portions.

In addition, as shown in FIGS. 4A and 4B, the first top portions 21*a* and 21*b* and the second top portions 31*a* and 31*b* in the first exemplary embodiment are recessed end portions substantially linearly extending along a direction Ds laterally orthogonal to a closing directions Da2 of the opening/closing cover 12A with a required dimension. Furthermore, the first top portions 21*a* and 21*b* have a rounded tip shape instead of a sharp tip shape.

As shown in FIGS. 2 to 6, the first engagement body 2A in the first exemplary embodiment is a structural body including a first moving body 22, a second moving body 23, a support portion 24, and the biasing member 25.

The first moving body 22 is a structural portion in which one first top portion 21*a* is arranged.

The first moving body 22 in the first exemplary embodiment is a structure having a shape in which one first top portion 21*a* is provided in an upper end thereof in a state of protruding upward, and is arranged in a state where a whole body is separated upward with respect to the second moving body 23.

Figure 5A:
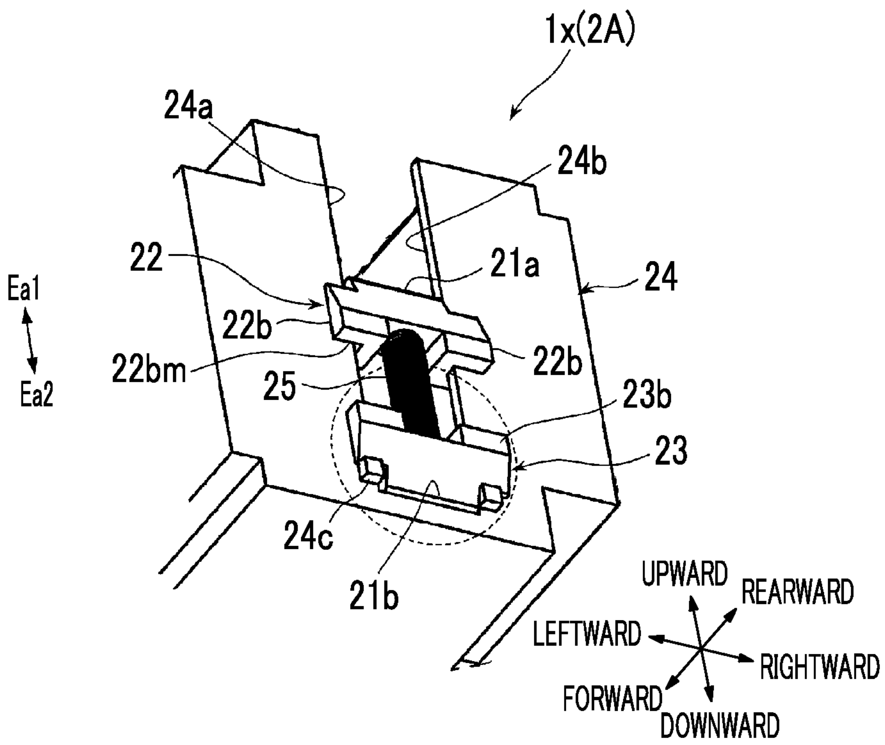
FIG. 5A is a perspective view in a case where a portion of the latch mechanism arranged on the main body side is viewed from obliquely below.
Figure 5B:
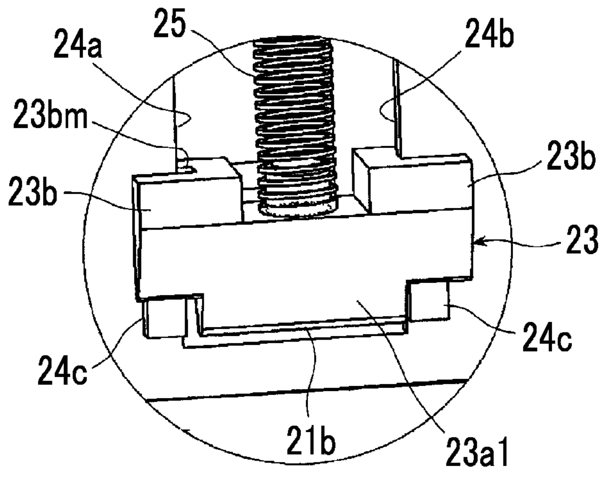
FIG. 5B is an enlarged view of a portion surrounded by a broken line frame in FIG. 5A.
Figure 6:
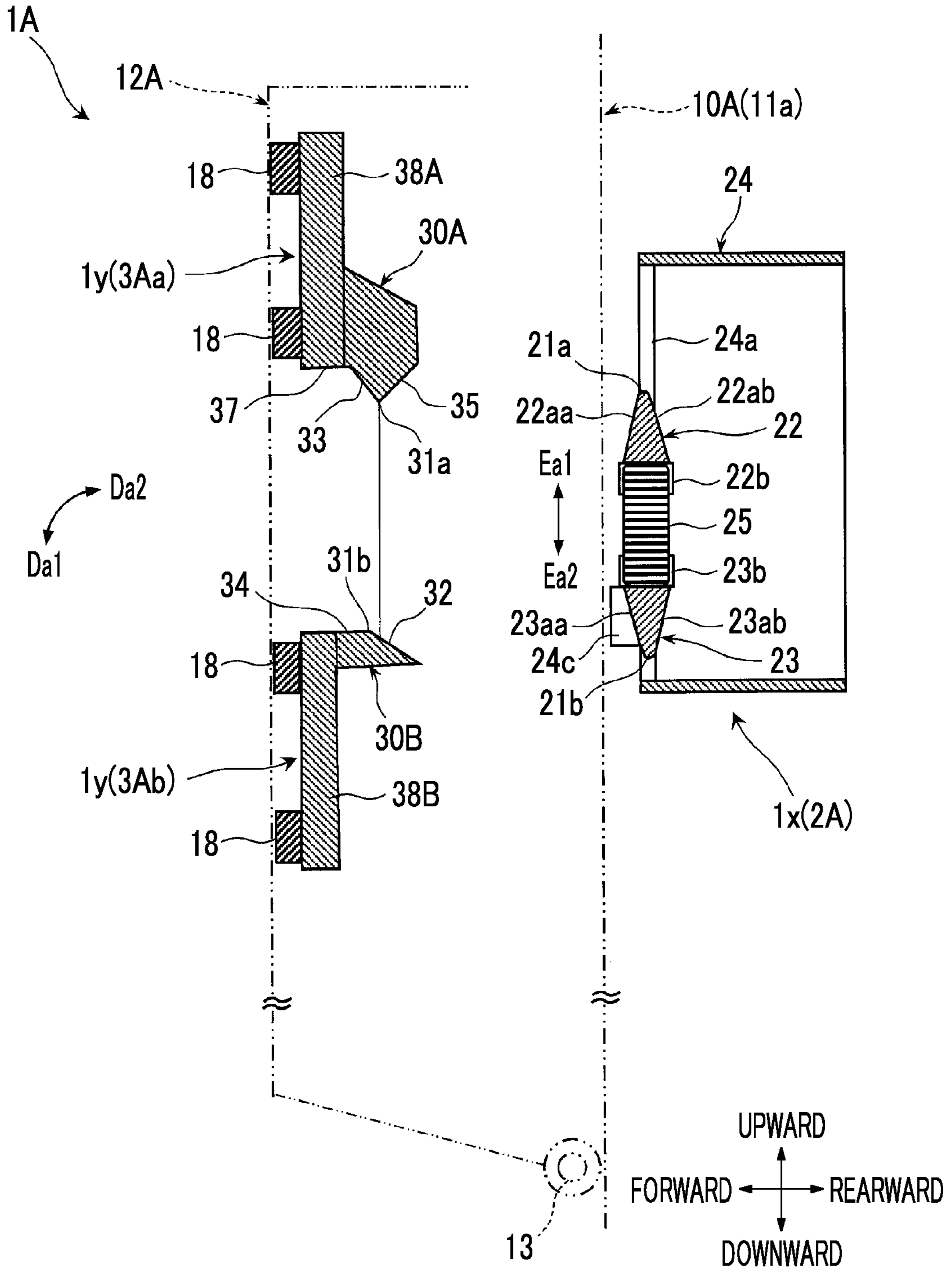
FIG. 6 is a conceptual diagram showing a cross section of the latch mechanism which is taken along line VI-VI in FIGS. 4A and 4B.

In addition, as shown in FIGS. 5A to 6, in the first moving body 22, an upstream side descending slope 22*aa* and a downstream side descending slope 22*ab* which are divided into the upstream side and the downstream side in the closing direction Da2 of the opening/closing cover 12A, and which are inclined to spread obliquely downward at predetermined inclination angles $\alpha 1$ and $\alpha 2$ are formed, while one first top portion 21*a* arranged in an upper end thereof serves as a boundary and a reference.

Furthermore, the first moving body 22 is provided with guided portions 22*b* having a guide groove 22*bm* which is open in a rightward-leftward direction in a state of being present in right and left side portions and each lower end of the upstream side descending slope 22*aa* and the downstream side descending slope 22*ab*.

The inclination angles $\alpha 1$ and $\alpha 2$ are angles formed with a center line Lc along the orthogonal direction Dr of the first engagement body 2A. The inclination angles $\alpha 1$ and $\alpha 2$ are the same as each other, but may be different angles. The first moving body 22 is configured to serve as a component which is less likely to be elastically deformed.

The second moving body 23 is a structural portion in which the other first top portion 21*b* is arranged.

The second moving body 23 in the first exemplary embodiment is a structure having a shape in which the other first top portion 21*b* is provided in a lower end thereof in a state of protruding downward, and is arranged in a state where a whole body is separated downward with respect to the first moving body 22.

In addition, as shown in FIGS. 5A to 6, in the second moving body 23, an upstream side ascending slope 23*aa* and a downstream side ascending slope 23*ab* which are divided into the upstream side and the downstream side in the closing direction Da2 of the opening/closing cover 12A, and which are inclined to spread obliquely upward at predetermined inclination angles $\alpha 3$ and $\alpha 4$ are formed, while the other first top portion 21*b* arranged in a lower end thereof serves as the boundary and the reference.

Furthermore, the second moving body 23 is provided with guided portions 23*b* having a guide groove 23*bm* which is open in the rightward-leftward direction in a state of being present in right and left side portions and each upper end of the upstream side ascending slope 23*aa* and the downstream side ascending slope 23*ab*.

The inclination angles α3 and α4 are angles formed by the center line Lc. The inclination angles α3 and α4 are the same as each other, but may be different angles. The second moving body 23 is configured to serve as a component which is less likely to be elastically deformed.

The support portion 24 is a structural portion that supports the moving bodies to be movable to a side closer to each other or separated from each other along the direction Ds vertically orthogonal to the closing direction Da2 of the opening/closing cover 12A.

For example, the support portion 24 is configured to serve as a structural body having guide plates 24*a* and 24*b* provided in a state of linearly extending in an upward-downward direction with a required interval in the rightward-leftward direction. The guide plates 24*a* and 24*b* are respectively fitted into the right and left guide grooves 22*bm* in the guided portion 22*b* of the first moving body 22 and the right and left guide grooves 23*bm* in the guided portion 23*b* of the second moving body 23. In this manner, the guide plates 24*a* and 24*b* support the first moving body 22 and the second moving body 23 while guiding the first moving body 22 and the second moving body 23 to respectively move in both an upward direction Ea1 and a downward direction Ea2.

In addition, the support portion 24 is provided to be fixed to the attachment frame 16 in the main body 10A. Furthermore, the support portion 24 is configured to serve as a component which is less likely to be elastically deformed. A reference numeral 24*c* shown in FIGS. 4A and 4B or FIG. 6 is a stop portion for stopping movement of the second moving body 23 in the downward direction Ea2 at a lower restriction position.

For example, the biasing member 25 is a member arranged between the first moving body 22 and the second moving body 23. Whereas the biasing member 25 holds the first moving body 22 and the second moving body 23 with a constant interval Sa (refer to FIG. 7), the biasing member 25 elastically biases the first moving body 22 and the second moving body 23 in a direction separated from each other when the first moving body 22 and the second moving body 23 move in a direction closer to each other.

For example, a coil spring is used as the biasing member 25. The coil spring is arranged in a state where an upper end portion thereof is in contact with the first moving body 22 and a lower end portion is in contact with the second moving body 23.

In addition, in a case where each position of the first moving body 22 and the second moving body 23 is a fixed position when the interval between the pair of first top portions 21*a* and 21*b* is the constant interval Sa, the biasing member 25 is set to apply the following biasing force That is, when one or both of the first moving body 22 and the second moving body 23 move in a direction of narrowing the interval Sa, the biasing member 25 is set to apply an elastic biasing force J (refer to FIGS. 7 and 8) that returns one or both of the first moving body 22 and the second moving body 23 which are moved, to the fixed position where the interval Sa is secured.

Figure 7:
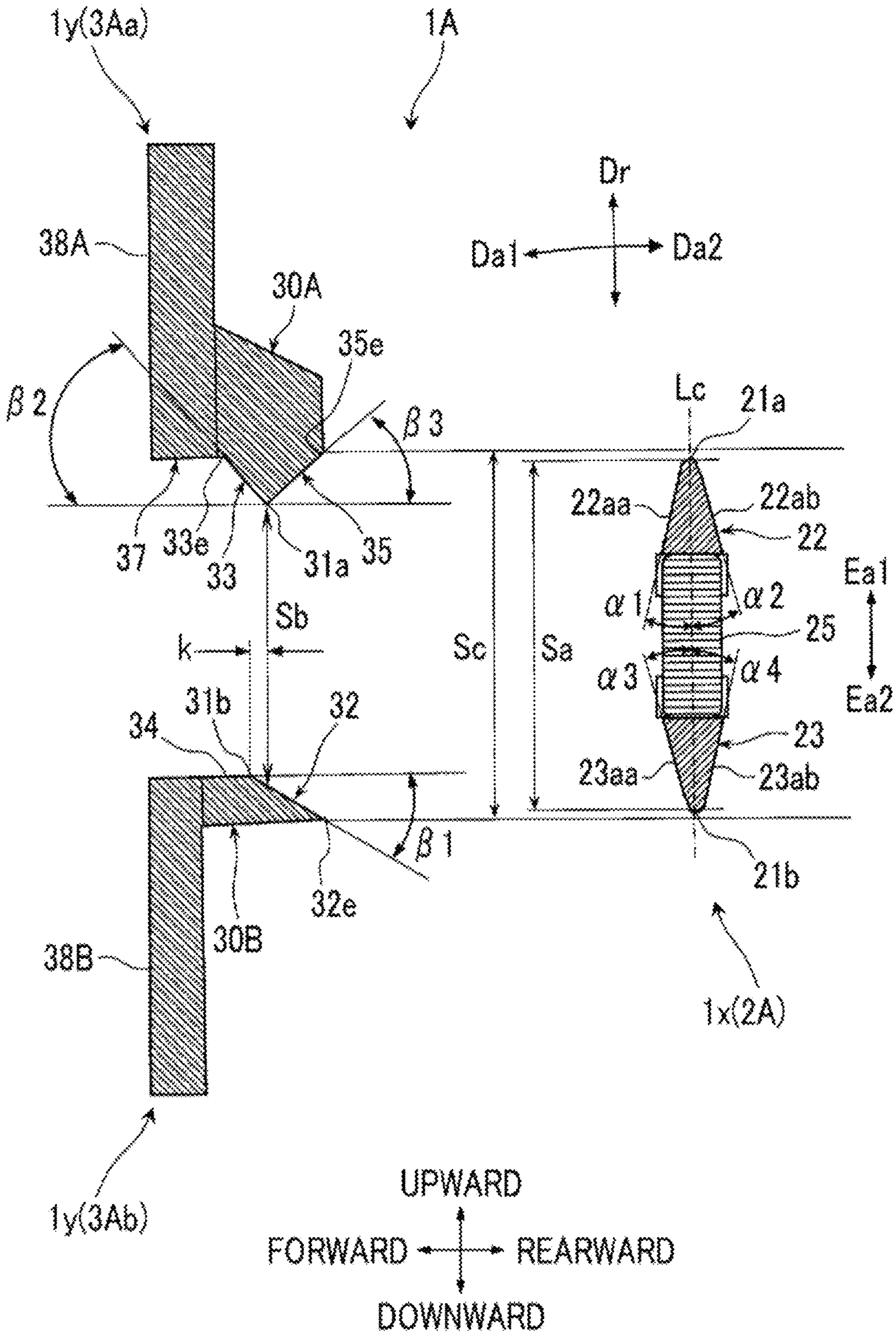
FIG. 7 is a schematic view of a main portion of the latch mechanism.

As shown in FIGS. 2, 6, and 7, the second engagement body 3A is configured to serve as a structural body including one second engagement body 3A*a* in which one second top portion 31*a* is arranged and the other second engagement body 3A*b* in which the other second top portion 31*b* is arranged.

One second engagement body 3A*a* has a first protruding portion 30A that protrudes from one surface of the support plate 38A along the closing direction Da2 of the opening/closing cover 12A.

The first protruding portion 30A is a plate-shaped portion that protrudes with a required thickness in a portion on the lower end side of the support plate 38A, and one second top portion 31*a* is provided in the lower end thereof. In addition, the first protruding portion 30A has a second slope 33 (to be described later) consisting of an upstream side ascending slope and a downstream side ascending slope 35 which are divided into the upstream side and the downstream side in the closing direction Da2 of the opening/closing cover 12A, and which are inclined to spread obliquely upward at predetermined inclination angles β2 and β3 (refer to FIG. 7), while one second top portion 31*a* in the lower end serves as the boundary and the reference.

One second engagement body 3Aa is arranged at a position separated upward from the other second engagement body 3Ab.

The other second engagement body 3Ab has a second protruding portion 30B that protrudes from one surface of the support plate 38B along the closing direction Da2 of the opening/closing cover 12A.

The second protruding portion 30B is a plate-shaped portion that protrudes with a required thickness in a portion on the upper end side of the support plate 38B, and the other second top portion 31*b* is provided in the upper end thereof. In addition, the second protruding portion 30B has a first slope 32 (to be described later) consisting of a downstream side descending slope facing the downstream side in the closing direction Da2 of the opening/closing cover 12A and inclined to spread obliquely downward at a predetermined inclination angles β1 (refer to FIG. 7), while the other second top portion 31*b* in the upper end serves as the boundary and the reference. In addition, the second protruding portion 30B is provided with a surface portion 34 extending from the other second top portion 31*b* to the upstream side in the closing direction Da2 of the opening/closing cover 12A.

The other second engagement body 3Ab is arranged at a position separated downward from one second engagement body 3Aa.

In addition, as shown in FIG. 2, the other second engagement body 3Ab is attached to the opening/closing cover 12A in such a manner that a support plate 38A in one second engagement body 3Aa and a support plate 38B in the other second engagement body 3Ab are fixed to an attachment portion 18 provided on a back surface of the opening/closing cover 12A.

In this case, as shown in FIG. 7, one second engagement body 3Aa and the other second engagement body 3Ab are arranged in a state where the pair of second top portions 31*a* and 31*b* are apart from each other with a predetermined interval Sb. In addition, as shown in FIG. 7, the second engagement bodies 3Aa and 3Ab are set so that a top portion 35*e* which is the upper end of the downstream side ascending slope 35 and a top portion 32*e* which is the lower end of the first slope 32 have a positional relationship with a required interval Sc.

In addition, as shown in FIG. 7, the interval Sb in the second engagement bodies 3Aa and 3Ab is set to be smaller than the interval Sa between the pair of first top portions 21*a* and 21*b* in the first engagement body 2A (Sb<Sa). In addition, the interval Sc in the second engagement bodies 3Aa and 3Ab is set to be larger than the interval Sa between the pair of first top portions 21*a* and 21*b* in the first engagement body 2A (Sc>Sa). Furthermore, the first engagement body 2A is arranged so that both one first top portion 21*a* and the other first top portion 21*b* exist inside the above-described interval Sc in the second engagement bodies 3Aa and 3Ab.

In this manner, as shown in FIG. 8, in the latch mechanism 1A, while the opening/closing cover 12A is closed, the first engagement body 2A is likely to be introduced into a portion between one second engagement body 3Aa and the other second engagement body 3Ab (into the interval Sc). Thereafter, the first engagement body 2A can individually come into contact with the second top portions 31*a* and 31*b* in the second engagement bodies 3Aa and 3Ab in a state where the first top portions 21*a* and 21*b* are displaced.

Then, as shown in the part (B) in FIG. 8, the latch mechanism 1A has the first slope 32 that applies a force Fa in an opening direction Da1 of the opening/closing cover 12A to the other second engagement body 3Ab in a state where the other first top portion 21*b* in the first engagement body 2A is in contact, when one second top portion 31*a* of one second engagement body 3Aa is in contact with one first top portion 21*a* in the first engagement body 2A, while the opening/closing cover 12A is closed.

In the first exemplary embodiment, the first slope 32 is formed in the other second engagement body 3Ab as the above-described downstream side descending slope. In addition, in a strict sense, the force Fa in the opening direction of the opening/closing cover 12A is applied to be transmitted to the other second engagement body 3Ab from the second moving body 23 biased downward by the downward biasing force Ja of the biasing member 25 in the first engagement body 2A.

In addition, as shown in FIG. 7, in the second engagement body 3A, the other second top portion 31*b* which is one end (upper end) of the first slope 32 of the pair of second top portions 31*a* and 31*b* is arranged at a position shifted to the upstream side from one second top portion 31*a* in the closing direction Da2 of the opening/closing cover 12A.

A distance k by which the other second top portion 31*b* is shifted to the upstream side from one second top portion 31*a* in the closing direction Da2 is set in view of a component tolerance or a play of a sliding portion, for example. Specifically, the dimension is approximately 2 to 5 mm, for example.

In addition, as shown in the part (C) in FIG. 9, the pair of second engagement bodies 3Aa and 3Ab has the second slope 33 with which one first top portion 21*a* in the first engagement body 2A comes into contact after passing through one second top portion 31*a* in the second engagement body 3A while the opening/closing cover 12A is closed, and one second engagement body 3Aa receives a force Fb in the closing direction Da2 of the opening/closing cover 12A.

In the first exemplary embodiment, the first slope 32 is formed in one second engagement bodies 3Aa as the above-described downstream side descending slope. The first slope 32 is formed as a slope inclined obliquely downward at the predetermined inclination angle β1 in a continuous form from one first top portions 21*a*. In a strict sense, the force Fb in the closing direction of the opening/closing cover 12A is applied to be transmitted to one second engagement body 3Aa from the first moving body 22 biased upward by an upward biasing force Jb by the biasing member 25 in the first engagement body 2A.

As shown in FIG. 7, the second slope 33 is set so that the inclination angle β2 is larger than the inclination angle β1 of the first slope 32 (β2>β1).

Both the inclination angles β1 and β2 are smaller angles formed by a reference line when a direction along the closing direction Da2 of the opening/closing cover 12A or a horizontal direction is used as the reference line.

The inclination angle β2 is set in view of a required magnitude of the force Fb in the closing direction of the opening/closing cover 12A. In addition, for example, the inclination angle β2 is an angle of 1.5 times to 4.0 times the inclination angle β1.

Furthermore, as shown in FIG. 4B, 6, or 7, the pair of second engagement bodies 3Aa and 3Ab has the surface portion 34 extending from the other second top portion 31*b* in the other second engagement body 3Ab to a side opposite to the first slope 32 along the opening direction Da1 of the opening/closing cover 12A.

The surface portion 34 is formed as a flat surface substantially extending along the opening direction Da1 from the other second top portion 31*b* in the other second engagement body 3Ab.

In addition, as shown in FIG. 3 or the part (D) in FIG. 9, the first engagement body 2A and the second engagement body 3A are set so that one first top portion 21*a* is continuously in contact with the second slope 33 to hold a closed state of the opening/closing cover 12A.

On the other hand, for example, the opening/closing cover 12A is set so that a portion 12*e* thereof abuts on a stop portion 17 provided in a corresponding portion in the opening portion 14 of the main body 10A to be in a closed state. For example, as an abutting portion, the portion 12*e* is provided in a portion separated from the hinge 13. In addition, the position of the opening/closing cover 12A when the portion 12*e* of the opening/closing cover 12A abuts on the stop portion 17 is a normal closing position.

In the first exemplary embodiment, in order that one first top portion 21*a* is in a state of being continuously in contact with the second slope 33 in a stage where the opening/closing cover 12A reaches the normal closing position, the length of the second slope 33 in the opening direction Da1 of the opening/closing cover 12A is set to a dimension in which the one first top portion 21*a* further continuously exists from a point with which the one first top portion 21*a* is in contact.

Incidentally, as shown in FIG. 6 or 7, in the second engagement body 3A, a portion 37 continuous from an upper end 33*e* of the second slope 33 in the opening direction Da1 of the opening/closing cover 12A is formed as a smooth surface portion substantially extending along the opening direction Da1. The portion 37 is actually a lower end surface of the support plate 38A.

Operation of Latch Mechanism When Closing Opening/Closing Cover

Next, an operation of the latch mechanism 1A when closing the opening/closing cover 12A will be described.

First, the opening/closing cover 12A in an opened state shown in FIG. 1B or 2 is caused to pivot around the hinge 13 in the closing direction Da2. In this manner, the opening/closing cover 12A starts to be closed to close the opening portion 14 of the main body 10A.

In a case where the closing operation of the opening/closing cover 12A is performed, in the latch mechanism 1A, as shown in the part (A) in FIG. 8, the second engagement body 3A (pair of second engagement bodies 3Aa and 3Ab) which is the opening/closing body engagement unit 1*y* starts to move close to the first engagement body 2A which is the main body engagement unit 1*x*.

In this case, in the latch mechanism 1A, a portion of the downstream side ascending slope 35 in one second engagement body 3Aa of the second engagement body 3A comes into contact with one first top portion 21*a* in the first engagement body 2A, and a portion of the first slope 32 in the other second engagement body 3Ab of the second engagement body 3A comes into contact with the other first top portion 21*b* in the first engagement body 2A.

In this manner, the engagement of the latch mechanism 1A starts.

Subsequently, the opening/closing cover 12A is further pushed in the closing direction Da2.

Then, in the first engagement body 2A in the latch mechanism 1A, one first top portion 21*a* receives a reaction force downward from the downstream side ascending slope 35 in one second engagement body 3Aa moved by a closing operation. In this manner, the first moving body 22 moves in the downward direction Ea2 from the fixed position to Ea2 against the biasing force of the biasing member 25. Moreover, in the first engagement body 2A, the other first top portion 21*b* receives the reaction force upward from the first slope 32 in the other second engagement body 3Ab moved by the closing operation. In this manner, the second moving body 23 moves in the upward direction Eat from the fixed position against the biasing force of the biasing member 25.

The fixed position of the first moving body 22 and the fixed position of the second moving body 23 are positions that respectively exist when the opening/closing cover 12A is opened.

In this manner, in the first engagement body 2A, the first moving body 22 and the second moving body 23 are continuously biased in directions separated from each other by receiving the biasing force of the spring force when the coil spring which is the biasing member 25 is contracted. On the other hand, the second engagement body 3A continuously receives a force in the opening direction Da1 of the opening/closing cover 12A, which is a portion of a component force of the biasing force in the downstream side ascending slope 35 and the first slope 32, from one first top portion 21*a* in the first moving body 22 and the other first top portion 21*b* in the second moving body 23 of the biased first engagement body 2A.

Therefore, the opening/closing cover 12A receives the force in the opening direction of the opening/closing cover 12A from the latch mechanism 1A in a stage where the engagement of the latch mechanism 1A starts.

Then, as shown in the part (B) in FIG. 8, in the latch mechanism 1A, when one first top portion 21*a* in the first engagement body 2A comes into contact with one second top portion 31*a* in the second engagement body 3A, the other first top portion 21*b* of the first engagement body 2A is in a state of being in contact with the first slope 32 of the second engagement body 3A.

In this case, as shown in the part (B) in FIG. 8, the first moving body 22 in the first engagement body 2A comes into contact with the one second top portion 31*a* in a state where one first top portion 21*a* is displaced in the downward direction Ea2. Therefore, the first moving body 22 in the first engagement body 2A is in a state of continuously receiving the upward biasing force Jb from the biasing member 25. In addition, at a moment when the first moving body 22 in this case comes into contact with one second top portion 31*a*, the force is in a state of being temporarily balanced with one second engagement body 3Aa.

Therefore, one second engagement body 3Aa is in a state where one second engagement body 3Aa is less likely to temporarily move, in other words, a state where the movement can be temporarily stopped.

On the other hand, as shown in the part (B) in FIG. 8, the second moving body 23 in the first engagement body 2A is in contact with the first slope 32 in a state where the other first top portion 21*b* is displaced in the upward direction Eat. Therefore, the second moving body 23 in the first engagement body 2A continuously receives the downward biasing force Ja from the biasing member 25.

Therefore, the other second engagement body 3Ab continuously receives the force Fa in the opening direction Da1 of the opening/closing cover 12A as a portion of the component force of the biasing force Ja via the first slope 32, from the other first top portion 21*b* in the second moving body 23 which is biased downward by the biasing force Ja of the biasing member 25. The length of a broken line arrow of the biasing force Ja and the length of a solid line arrow of the force Fa which are shown in the part (B) in FIG. 8 do not indicate a magnitude relationship between the forces. This point also applies to the lengths of the respective arrows of the biasing force J and the force F which are shown in other subsequent drawings.

In this manner, the latch mechanism 1A in this case is brought into a state where the other second engagement body 3Ab is likely to move in the opening direction Da1 of the opening/closing cover 12A.

Therefore, when one first top portion 21*a* comes into contact with the second top portion 31*a* in the latch mechanism 1A, for example, there is no possibility that the movement of the opening/closing cover 12A may be intermediately stopped in the closing direction Da2 due to a temporarily balanced state of the forces.

In this regard, for example, in a case where the latch mechanism 1A is configured as described below, the movement of the first engagement body 2A and the second engagement body 3Aa may be stopped in the closing direction Da2 due to a temporarily balanced state of the forces.

The configuration is adopted in a case where the other first top portion 21*b* is configured to come into contact with the other second top portion 31*b* in synchronization when one first top portion 21*a* comes into contact with one second top portion 31*a*, or in a case where the other first top portion 21*b* is configured to come into contact with the flat surface portion 34 in the other second engagement body 3Ab when one first top portion 21*a* comes into contact with one second top portion 31*a*.

Subsequently, in a case where the closing operation of the opening/closing cover 12A is continued, as shown in the part (C) in FIG. 9, in the latch mechanism 1A, one second top portion 31*a* in one second engagement body 3Aa passes through one first top portions 21*a* in the first engagement body 2A, and thereafter, the one first top portion 21*a* is in a state of being in contact with the second slope 33.

In this case, as shown in the part (C) in FIG. 9, the first moving body 22 is in a state of being moved in the upward direction Ea1 by continuously receiving the upward biasing force Jb from the biasing member 25. Therefore, one first top portion 21*a* is continuously in contact with the second slope 33.

In this manner, in the latch mechanism 1A, one second engagement body 3Aa starts to receive the force Fb in the closing direction Da2 of the opening/closing cover 12A as a portion of the component force of the biasing force Jb via the second slope 33, from one first top portion 21*a* in the first moving body 22 receiving the upward biasing force Jb from the biasing member 25. The force Fb in the closing direction Da2 becomes a pulling force with respect to the opening/closing cover 12A.

As a result, the opening/closing cover 12A starts to receive the force Fb in the closing direction Da2 via one second engagement body 3Aa in the latch mechanism 1A.

In addition, after one first top portion 21*a* passes through one second top portion 31*a*, the other first top portion 21*b* in the first engagement body 2A completely passes through the distance k (FIG. 7) by which the contact with the first slope 32 is shifted. Thereafter, the other first top portion 21*b* comes into contact with the other second top portion 31*b* in the other second engagement body 3Ab.

In addition, when the other first top portion 21*b* in this case passes through the other second top portion 31*b*, as shown in the part (C) in FIG. 9, the smooth surface portion 34 in the other second engagement body 3Ab starts to be in a state of being in contact with the other first top portion 21*b*.

In this manner, in the latch mechanism 1A, the other second engagement body 3Ab does not receive the force Fa (the part (B) in FIG. 8) in the opening direction Da1 of the opening/closing cover 12A via the first slope 32 from the second moving body 23 of the first engagement body 2A.

Therefore, when the opening/closing cover 12A receives the force Fb in the closing direction Da2 of the opening/closing cover 12A by the latch mechanism 1A, the force Fa in the opening direction Da1 of the opening/closing cover 12A which contradicts the force Fb is rarely received at the same time.

As a result, the closing operation of the opening/closing cover 12A is smoothly and continuously performed.

Moreover, the latch mechanism 1A has a relationship so that the inclination angle β2 of the second slope 33 is larger than the inclination angle β1 of the first slope 32.

In this manner, in the latch mechanism 1A, the first moving body 22 receiving the upward biasing force Jb from the biasing member 25 is likely to move in the second slope 33, and the force Fb in the closing direction Da2 of the opening/closing cover 12A is stronger than the force Fa in the opening direction Da1. Therefore, even in a case where the second moving body 23 temporarily receives the force Fa in the opening direction Da1 after one first top portion 21*a* passes through one second top portion 31*a*, the first moving body 22 receives the force Fb in the closing direction Da2 which is stronger than the force Fa.

In this manner, the closing operation of the opening/closing cover 12A is also smoothly and continuously performed.

Finally, as shown in FIG. 3, in a case where the abutting portion 12*e* of the opening/closing cover 12A abuts on the stop portion 17 in the opening portion 14 of the main body 10A, the opening/closing cover 12A reaches the normal closing position.

In this case, in the latch mechanism 1A, as shown in FIG. 3 or the part (D) in FIG. 9, one first top portion 21*a* in the first engagement body 2A is continuously in contact with the second slope 33 in the second engagement body 3A.

In this manner, in the latch mechanism 1A, one second engagement body 3Aa continuously receives the force Fb in the closing direction Da2 of the opening/closing cover 12A via the second slope 33 from the first moving body 22 in the first engagement body 2A. In this manner, one second engagement body 3Aa continuously receives the force Fb from the first engagement body 2A, and holds the opening/closing cover 12A in a closed state.

In the latch mechanism 1A, a state in this case is a state where the engagement when the opening/closing cover 12A is closed is completed.

In addition, compared to a case where one first top portion 21*a* in the latch mechanism 1A holds the opening/closing cover 12A in a closed state without coming into contact with the second slope 33, the opening/closing cover 12A in this case continuously receives the force Fb in the closing direction Da2. In this manner, the opening/closing cover 12A is held in a closed state where rattling is unlikely to occur in the opening portion 14 of the main body 10A.

As described above, in the device 100A including the latch mechanism 1A according to the first exemplary embodiment, when the opening/closing cover 12A is closed, the opening/closing cover 12A is normally closed at the normal closing position without being stopped before reaching the normal closing position.

Incidentally, the latch mechanism 1A does not require an overstroke, and does not require securing a gap corresponding to the overstroke. The same applies to the latch mechanism 1 in the subsequent exemplary embodiments or modification examples.

Operation of Latch Mechanism when Opening Opening/Closing Cover

Next, an operation of the latch mechanism 1A when opening the opening/closing cover 12A will be described.

First, the opening/closing cover 12A in a closed state shown in FIG. 1A or 3 is caused to pivot around the hinge 13 in the opening direction Da1. In this manner, the opening/closing cover 12A starts to be opened so that the opening portion 14 of the main body 10A is exposed outward.

When an opening operation of the opening/closing cover 12A is performed, as can be retroactively understood from the part (D) in FIG. 9 to the part (C) in FIG. 9, in the latch mechanism 1A, the second engagement body 3A which is the opening/closing body engagement unit 1*y* gradually starts to be separated from a completed state of the engagement with the first engagement body 2A which is the main body engagement unit 1*x*.

In this case, in the latch mechanism 1A, the second slope 33 in one second engagement body 3Aa moving in the opening direction Da1 of the opening/closing cover 12A starts to move the first moving body 22 in the first engagement body 2A via one second top portion 31*a* in the downward direction Ea2 against the upward biasing force Jb of the biasing member 25.

As shown in the part (C) in FIG. 9, one second engagement body 3Aa in this case continuously receives the force Fb in the closing direction Da2 of the opening/closing cover 12A from the first moving body 22. Therefore, the opening/closing cover 12A starting the opening operation continuously receives the force Fb in the closing direction Da2 by the latch mechanism 1A.

Incidentally, in a case where the opening operation is interrupted in this stage, the opening/closing cover 12A is moved in the closing direction Da2 by the latch mechanism 1A, and returns to the closed state.

Subsequently, when the opening operation of the opening/closing cover 12A is continued, as shown in the part (B) in FIG. 8, one second top portion 31*a* in one second engagement body 3Aa comes into contact with one first top portion 21*b* in the first engagement body 2A.

In this case, in the other second engagement body 3Ab, after the other second top portion 31*b* comes into contact with and passes through the other first top portion 21*b* in the first engagement body 2A, the first slope 32 is brought into a state of being in contact with the other first top portion 21*b*.

In this manner, in the latch mechanism 1A, as in the case of performing the closing operation of the opening/closing cover 12A, the other second engagement body 3Ab starts to receive the force Fa in the opening direction Da1 of the opening/closing cover 12A, which is a portion of the component force of the biasing force Ja, via the first slope 32 from the other first top portion 21*b* biased downward by the biasing force Ja of the biasing member 25.

In addition, the force Fa in the opening direction Da1 in this case is continuously received although the force Fa is gradually weakened as the other second engagement body 3Ab moves in the opening direction Da1 of the opening/closing cover 12A while the other first top portion 21*b* is in contact with the first slope 32.

In this case, the opening/closing cover 12A receives the force Fa in the opening direction Da1, instead of the force Fb in the closing direction Da2 by the latch mechanism 1A.

Therefore, the opening/closing cover 12A is not likely to be stopped while the opening/closing cover 12A is opened, and the opening operation is assisted and promoted by the latch mechanism 1A.

Finally, as shown in FIG. 2, the second engagement body 3A which is the opening/closing body engagement unit 1*y* in the latch mechanism 1A is brought into a state of being separated from the first engagement body 2A which is the main body engagement unit 1*x*. In this manner, the engagement by the latch mechanism 1A is completely released.

In addition, when the opening operation of the opening/closing cover 12A is further continued, the opening/closing cover 12A is brought into a completely opened state as shown in FIG. 1B.

Second Exemplary Embodiment

FIG. 10 is a view conceptually showing a portion of a device 100B including a latch mechanism 1B according to a second exemplary embodiment of the present invention, and is a perspective view of a portion in which an opening/closing cover of the device 100B is opened. FIG. 11 is a schematic sectional view of a portion in which the opening/closing cover of the device 100B is closed.

The device 100B is different from the device 100A according to the first exemplary embodiment in that the latch mechanism 1B is applied instead of the latch mechanism 1A according to the first exemplary embodiment. However, except for this point, the device 100B has the same configuration as the device 100A.

Therefore, hereinafter, the same reference numerals will be assigned to common elements, and description thereof will be omitted unless necessary.

The latch mechanism 1B is configured to include a first engagement body 2B having a pair of first top portions 21*a* and 21*b* in which the opening/closing body engagement unit 1*y* can be displaced in a direction Dr (refer to FIGS. 4A and 4B) vertically orthogonal to the closing direction Da2 of the opening/closing cover 12A.

In addition, the latch mechanism 1B is configured to include a second engagement body 3B having a pair of second top portions 31*a* and 31*b* in which the main body engagement unit 1*x* comes into contact with the pair of first top portions 21*a* and 21*b* in the first engagement body 2B at respectively different timings.

The first engagement body 2B has substantially the same configuration as the first engagement body 2A in the first exemplary embodiment, except that the first engagement body 2B is arranged in the opening/closing cover 12A.

Therefore, as in the case of the first engagement body 2A (refer to FIGS. 2 to 7), the first engagement body 2B is configured to serve as a structural body including the first moving body 22, the second moving body 23, and the support portion 24, and the biasing member 25.

In addition, the second engagement body 3B has substantially the same configuration as the second engagement body 3A in the first exemplary embodiment except that the second engagement body 3B is arranged in the opening portion 14 of the main body 10A, and orientations with respect to the upstream side and the downstream side in the closing direction Da2 of the opening/closing cover 12A are reversed in view of an arrangement relationship thereof.

Therefore, as in the case of the second engagement body 3A (refer to FIGS. 2, 6, and 7), the second engagement body 3B is configured to serve as a structural body including one second engagement body 3Ba having the first protruding portion 30A and the other second engagement body 3Bb having the second protruding portion 30B. The first protruding portion 30A and the second protruding portion 30B in the second exemplary embodiment are formed to protrude to the upstream side in the closing direction Da2 of the opening/closing cover 12A.

In a case where names of portions constituting the second engagement body 3B are assigned to the upstream side or the downstream side with reference to the upstream side and the downstream side in the closing direction Da2 of the opening/closing cover 12A, the names are in a reversed relationship. Accordingly, in a case of being assigned to the upstream side, the names are changed to the names assigned to the downstream side, and in a case of being assigned to the downstream side, the names are changed to the names assigned to the upstream side.

For example, in one second engagement body 3Ba, the name of the upstream side descending slope which is an example of the second slope 33 in one second engagement body 3Aa in the first exemplary embodiment is changed to the name of the downstream side descending slope. In addition, in the other second engagement body 3Bb, the name of the downstream side descending slope which is an example of the first slope 32 in the other second engagement body 3Ab in the first exemplary embodiment is changed to the name of the upstream side descending slope.

In addition, in the pair of second engagement bodies 3Ba and 3Bb, as shown in FIG. 10, the other second top portion 31*b* which is the upper end of the first slope 32 of the pair of second top portions 31*a* and 31*b* is arranged at a position shifted by the distance k to the downstream side in the closing direction Da2 from one second top portion 31*a*.

Operation of Latch Mechanism

As shown in FIGS. 12 and 13, the operation of closing the opening/closing cover 12A of the latch mechanism 1B and the operation of opening the opening/closing cover 12A of the latch mechanism 1B are slightly different in movements and actions in which the first engagement body 2B arranged on the opening/closing cover 12A side moves to be closer to or separated from the second engagement bodies 3B (pair of second engagement bodies 3Ba and 3Bb) arranged on the main body 10A side. However, contents except for this point are substantially the same as contents described with reference to FIGS. 8 and 9 as each operation of the latch mechanism 1A according to the first exemplary embodiment.

Incidentally, in the latch mechanism 1B, in a case where the opening/closing cover 12A is closed, after the engagement of the latch mechanism 1B shown in the part (A) in FIG. 12 starts, when one first top portion 21*a* in the first engagement body 2B comes into contact with one second top portion 31*a* in the second engagement body 3B as shown in the part (B) in FIG. 12, the other first top portion 21*b* in the first engagement body 2B is also brought into a state of being in contact with the first slope 32 in the second engagement body 3B.

In this case, the other first top portion 21*b* in a state of moving in the upward direction Eat is in contact with the first slope 32 in the other second engagement body 3Bb. Accordingly, the second moving body 23 of the first engagement body 2B continuously receives the downward biasing force Ja from the biasing member 25. Therefore, the second moving body 23 continuously receives the force Fa in the opening direction Da1 of the opening/closing cover 12A, which is a portion of the reaction force and the component force of the biasing force Ja, from the first slope 32.

In this manner, the latch mechanism 1B in this case is brought into a state where the first engagement body 2B is likely to move in the opening direction Da1 of the opening/closing cover 12A.

Therefore, when one first top portion 21*a* comes into contact with one second top portion 31*a* in the latch mechanism 1B, for example, there is no possibility that the movement of the opening/closing cover 12A may be intermediately stopped in the closing direction Da2 due to a temporarily balanced state of the forces.

In addition, in the latch mechanism 1B, as shown in the part (C) in FIG. 13, after one first top portion 21*a* of the first engagement body 2B passes through one second top portion 31*a* of the one second engagement body 3Ba, the one first top portion 21*a* is also brought into a state of being in contact with the second slope 33

In this manner, in the latch mechanism 1B, the first engagement body 2B starts to receive the force Fb in the closing direction Da2 of the opening/closing cover 12A, which is a portion of the component force of the biasing force Jb of the biasing member 25 via the second slope 33, from one first top portion 21*a* in the first moving body 22 receiving the upward biasing force Jb.

Therefore, the opening/closing cover 12A starts to receive the force Fb in the closing direction Da2 via the first engagement body 2B in the latch mechanism 1B.

Furthermore, in the latch mechanism 1B, as shown in the part (D) in FIG. 13, when the opening/closing cover 12A reaches the normal closing position, one first top portion 21*a* in the first engagement body 2B is also continuously in contact with the second slope 33 in the second engagement body 3B.

In this manner, in the latch mechanism 1B, the first moving body 22 of the first engagement body 2B receiving the upward biasing force Jb continuously receives the force Fb in the closing direction Da2 of the opening/closing cover 12A, which is a portion of the component force of the biasing force Jb, from the second slope 33 of one second engagement body 3Ba. In this manner, one first top portion 21*a* in the first moving body 22 holds the opening/closing cover 12A in a closed state.

Therefore, compared to a case where one first top portion 21*a* in the latch mechanism 1B holds the opening/closing cover 12A in the closed state without coming into contact with the second slope 33, the opening/closing cover 12A holds a closed state where rattling is unlikely to occur in the opening portion 14 of the main body 10A.

As described above, even in the device 100B including the latch mechanism 1B according to the second exemplary embodiment, when the opening/closing cover 12A is closed, the opening/closing cover 12A is normally closed at the normal closing position without being stopped before reaching the normal closing position.

Third Exemplary Embodiment

FIG. 14 is a view conceptually showing a portion of a device 100C including a latch mechanism 1C according to a third exemplary embodiment of the present invention, and specifically, is a perspective view of a portion of the device 100C in which the opening/closing cover is opened. FIG. 15 is a schematic sectional view of a portion of the device 100C in which the opening/closing cover is closed. FIG. 16 is a schematic view of a main portion of the latch mechanism 1C.

The device 100C is different from the device 100A according to the first exemplary embodiment in that the latch mechanism 1C is applied instead of the latch mechanism 1A according to the first exemplary embodiment. However, except for this point, the device 100C has the same configuration as the device 100A.

Latch Mechanism

The latch mechanism 1C is configured to include a third engagement body 4A having a pair of third top portions 41*a* and 41*b* in which the main body engagement unit 1*x* is arranged to be separated in the direction Dr vertically orthogonal to the closing direction Da2 of the opening/closing cover 12A.

In addition, the latch mechanism 1C is configured to include a fourth engagement body 5A having a pair of fourth top portions 51*a* and 51*b* in which the opening/closing body engagement unit 1*y* can be displaced in the orthogonal direction Dr by coming into contact with the pair of third top portions 41*a* and 41*b* in the third engagement body 4A at respectively different timings.

As shown in FIGS. 14 to 15, the third engagement body 4A in the third exemplary embodiment is a structural body including a first engagement portion 42, a second engagement portion 43, and a support body 44.

The first engagement portion 42 is a structural portion in which one third top portion 41*a* is arranged.

In the first engagement portion 42 in the third exemplary embodiment, one third top portion 41*a* is provided in a state of protruding downward in the lower end, and is arranged in a state where the whole body is separated upward with respect to the second engagement portion 43.

In addition, as shown in FIG. 16, in the first engagement portion 42, an upstream side ascending slope 42*aa* and a downstream side descending slope 42*ab* which are inclined to spread upward at a predetermined inclination angle are formed, while one third top portion 41*a* arranged in the lower end thereof serves as the boundary and the reference.

The predetermined inclination angle is an angle formed by the center line Lc along the orthogonal direction Dr, and for example, is the same as the inclination angles $\alpha 3$ and $\alpha 4$ (refer to FIG. 7) formed by the upstream side ascending slope 23*aa* and the downstream side ascending slope 23*ab* of the second moving body 23 in the first exemplary embodiment. The first engagement portion 42 is configured to serve as a component which is less likely to be elastically deformed.

The second engagement portion 43 is a structural portion in which the other third top portion 41*b* is arranged.

The second engagement portion 43 in the third exemplary embodiment is provided in a state where the other third top portion 41*b* protrudes upward in the upper end, and is arranged in a state where the whole body is separated downward with respect to the first engagement portion 42.

In addition, as shown in FIG. 16, in the second engagement portion 43, an upstream side descending slope 43*aa* and a downstream side descending slope 43*ab* which are inclined to spread downward at a predetermined inclination angle are formed, while the other third top portion 41*b* arranged in the upper end thereof serves as the boundary and the reference.

The predetermined inclination angle is an angle formed by the center line Lc along the orthogonal direction Dr, and for example, is the same as the inclination angles α1 and α2 (refer to FIG. 7) formed by the upstream side descending slope 22*aa* and the downstream side descending slope 22*ab* of the first moving body 22 in the first exemplary embodiment. The second engagement portion 43 is configured to serve as a component which is less likely to be elastically deformed.

The support body 44 is a structural portion that supports the first engagement portion 42 and the second engagement portion 43 in a state where an interval Sd between the pair of third top portions 41*a* and 41*b* is constant.

The support body 44 has a plate-shaped main body 44*a*, and a first support arm 44*b* and a second support arm 44*c* which protrude to the upstream side in the closing direction Da2 of the opening/closing cover 12A from a vertical position on one surface of the main body 44*a*.

The first support arm 44*b* supports the first engagement portion 42 by providing the first engagement portion 42 on a lower surface of a protruding tip portion of the first support arm 44*b*. The second support arm 44*c* supports the second engagement portion 43 by providing the second engagement portion 43 on an upper surface of a protruding tip portion of the second support arm 44*c*. The first support arm 44*b* and the second support arm 44*c* respectively support the first engagement portion 42 and the second engagement portion 43 so that the interval Sd between the pair of third top portions 41*a* and 41*b* is constant.

The support body 44 is configured to serve as a member which is less likely to be elastically deformed. The support body 44 is provided to be fixed to the attachment frame 16 in the main body 10A.

As shown in FIGS. 14 and 15, the fourth engagement body 5A in the third exemplary embodiment is a structural body including a third moving body 50A, a second moving body 50B, a fourth support portion 56, and a fourth biasing member 57.

The third moving body 50A is a structural portion in which one fourth top portion 51*a* is arranged.

The third moving body 50A is provided in a state where one fourth top portion 51*a* protrudes upward in the upper end, and is arranged in a state where the whole body is separated upward from the second moving body 50B.

In addition, as shown in FIGS. 14 and 16, in the third moving body 50A, a fourth slope 53 (to be described later) consisting of the upstream side descending slope and a downstream side descending slope 55 which are inclined to spread obliquely downward at predetermined inclination angles β4 and β5 are formed, while one fourth top portion 51*a* arranged in the upper end serves as the boundary and the reference.

Furthermore, the third moving body 50A is provided with guided portions 50*c* having a guide groove open in the rightward-leftward direction in a state of being present on the right and left side portions and each lower end of the fourth slope 53 and the downstream side descending slope 55.

The inclination angles β4 and β5 are smaller angles formed by a reference line consisting of the closing direction Da2 or the horizontal direction. The inclination angles β4 and β5 may be mutually the same angle, but may be different angles. The third moving body 50A is configured as a component which is less likely to be elastically deformed.

The second moving body 50B is a structural portion in which the other fourth top portion 51*b* is arranged.

The second moving body 50B is provided in a state where the other fourth top portion 51*b* protrudes downward in the lower end, and is arranged in a state where the whole body is separated downward with respect to the third moving body 50A.

In addition, as shown in FIGS. 14 and 16, in the second moving body 50B, a third slope 52 (to be described later) consisting of the downstream side ascending slope inclined obliquely upward at a predetermined inclination angle β3 are formed, while the other fourth top portion 51*b* in the lower end serves as the boundary and the reference. In addition, in the second moving body 50B, a surface portion 54 extending from the other fourth top portion 51*b* to the upstream side in the closing direction Da2 of the opening/closing cover 12A is formed.

An inclination angle α7 is an angle formed by the reference line consisting of the closing direction Da2 or the horizontal direction. The second moving body 50B is configured to serve as a component which is less likely to be elastically deformed.

The fourth support portion 56 is a structural portion that supports the moving bodies to be movable to a side closer to each other or separated from each other along the direction Dr vertically orthogonal to the closing direction Da2 of the opening/closing cover 12A.

The fourth support portion 56 has substantially the same configuration as the support portion 24 of the first engagement body 2A in the first exemplary embodiment except that a forward-rearward orientation is different.

That is, the fourth support portion 56 is configured to include a structural body having a pair of guide plates 56*a* provided in a state of linearly extending in the upward-downward direction with a required interval in the rightward-leftward direction. The pair of guide plates 56*a* are respectively fitted into guide grooves (not shown) in the guided portions 50*c* of the third moving body 50A and the second moving body 50B. In this manner, one guide plate 56*a* guides the third moving body 50A and the second moving body 50B to respectively move in both the upward direction Ea1 and the downward direction Ea2.

In addition, the fourth support portion 56 is attached to be fixed to the opening/closing cover 12A in the main body 10A. Furthermore, the fourth support portion 56 is configured to serve as a member which is less likely to be elastically deformed. A reference numeral 44*d* shown in FIG. 16 is a stop portion that stops the movement of the second moving body 50B in the downward direction Ea2 at a lower restriction position.

The fourth biasing member 57 is a member arranged between the third moving body 50A and the second moving body 50B, holds the pair of fourth top portions 51*a* and 51*b* with a constant interval Sf, and elastically biases the third moving body 50A and the second moving body 50B in directions separated from each other when both move in a direction closer to each other. For example, a coil spring is used as the fourth biasing member 57. The coil spring is arranged in a state where the upper end portion is brought into contact with the third moving body 50A and the lower end portion is brought into contact with the second moving body 50B.

In addition, the fourth biasing member 57 is set to apply the following biasing force in a case where each position of the third moving body 50A and the second moving body 50B is the fixed position when the interval between the pair of fourth top portions 51*a* and 51*b* is the constant interval Sf.

That is, when one or both of the third moving body 50A and the second moving body 50B move in the direction of narrowing the interval Sf, the fourth biasing member 57 is set to apply an elastic biasing force J (refer to FIGS. 17 and 18) that returns one or both of the moved third moving body 50A and the moved second moving body 50Bs to the fixed position where the interval Sf is secured.

In addition, as shown in FIG. 14, the fourth engagement body 5A is attached to the opening/closing cover 12A by fixing the fourth support portion 56 to the back surface of the opening/closing cover 12A.

As shown in FIG. 16, the interval Sf in the fourth engagement body 5A is set to be larger than the interval Sd between the pair of third top portions 41*a* and 41*b* in the third engagement body 4A (Sf>Sd). In addition, the interval Sf in the fourth engagement body 5A is set to be smaller than an interval Se between an upper end top portion 43*ae* which is the upper end of the upstream side ascending slope 42*aa* of the first engagement portion 42 and a lower end 44*ae* of the upstream side descending slope 43*aa* of the second engagement portion 43 (Sf<Se). Furthermore, the fourth engagement body 5A is arranged so that both the pair of fourth top portions 51*a* and 51*b* exist inside the interval Se in the third engagement body 4A.

In this manner, as shown in FIG. 17, in the latch mechanism 1C, while the opening/closing cover 12A is closed, the fourth engagement body 5A is likely to be introduced into a portion (interval Sd) between the pair of third top portions 41*a* and 41*b* in the third engagement body 4A. Thereafter, in a state where the fourth top portions 51*a* and 51*b* are displaced, the fourth engagement body 5A can come into contact with the third top portions 41*a* and 41*b* in the third engagement body 4A.

Then, as shown in the part (B) in FIG. 17, the latch mechanism 1C has the third slope 52 that applies the force Fa in the opening direction Da1 of the opening/closing cover 12A to the fourth engagement body 5A in a state where the other third top portion 41*b* in the third engagement body 4A is in contact, when one third top portion 41*a* in the third engagement body 4A is in contact with one fourth top portion 51*a* in the fourth engagement body 5A, while the opening/closing cover 12A is closed.

In the third exemplary embodiment, the third slope 52 is formed as the downstream side ascending slope in the second moving body 50B of the fourth engagement body 5A. In a strict sense, the force Fa in the opening direction of the opening/closing cover 12A is applied to be transmitted from the second moving body 50B biased by the fourth biasing member 57 to the second engagement portion 43 of the third engagement body 4A.

In addition, as shown in FIG. 16, in the fourth engagement body 5A, the other fourth top portion 51*b* which is one end (lower end) of the third slope 52 in the pair of fourth top portions 51*a* and 51*b* is arranged at a position shifted by the distance k to the upstream side in the closing direction Da2 of the opening/closing cover 12A from one fourth top portion 51*a*.

In addition, as shown in the part (C) in FIG. 18, the fourth engagement body 5A has the fourth slope 53 in which the fourth engagement body 5A receives the force Fb in the closing direction Da2 of the opening/closing cover 12A by coming into contact after one third top portion 41*a* in the third engagement body 4A passes through the fourth top portion 51*a* in the fourth engagement body 5A while the opening/closing cover 12A is closed.

In the third exemplary embodiment, the fourth slope 53 is formed as the upstream side ascending slope in the third moving body 50A in the fourth engagement body 5A. The fourth slope 53 is formed as a slope inclined obliquely upward at the predetermined inclination angle β3 in a continuous form from the fourth top portions 51*a*.

In addition, the force Fb in the closing direction of the opening/closing cover 12A is applied so that the biasing force Jb received from the fourth biasing member 57 by the third moving body 50A of the fourth engagement body 5A is transmitted to the third moving body 50A as a portion of the reaction force and the component force from the fourth slope 53.

As shown in FIG. 16, the fourth slope 53 is set to have a relationship in which the inclination angle β4 is larger than the inclination angle β3 of the third slope 52 (β4>β3).

The inclination angle β4 is set in the same manner as in a case of the inclination angle β2 of the second slope 33 in the first exemplary embodiment.

Furthermore, as shown in FIG. 14, the fourth engagement body 5A has the surface portion 54 extending from the other fourth top portion 51*b* to a side opposite to the third slope 52 along the opening direction Da1 of the opening/closing cover 12A.

The surface portion 54 is formed as a flat surface substantially extending along the opening direction Da1 from the other fourth top portion 51*b* in the second moving body 50B in the fourth engagement body 5A.

In addition, in the third engagement body 4A and the fourth engagement body 5A, as shown in FIG. 15 or the part (D) in FIG. 18, one third top portion 41*a* of the third engagement body 4A is continuously in contact with the fourth slope 53 of the fourth engagement body 5A so that the opening/closing cover 12A is set to hold a closed state.

In the third exemplary embodiment, in order that one third top portion 41*a* is in a state of being continuously in contact with the fourth slope 53 in a stage where the opening/closing cover 12A reaches the normal closing position, the length of the fourth slope 53 in the opening direction Da1 of the opening/closing cover 12A is set to a dimension in which the one third top portion 41*a* further exists from a point with which the one third top portion 41*a* is in contact.

Operation of Latch Mechanism when Closing Opening/Closing Cover

Next, an operation of the latch mechanism 1C when closing the opening/closing cover 12A will be described.

First, the opening/closing cover 12A in an opened state shown in FIG. 14 is caused to pivot around the hinge 13 in the closing direction Da2. In this manner, the opening/closing cover 12A starts to be closed to close the opening portion 14 of the main body 10A. When the closing operation of the opening/closing cover 12A is performed, in the latch mechanism 1C, the fourth engagement body 5A which is the opening/closing body engagement unit 1*y* starts to move close to the third engagement body 4A which is the main body engagement unit 1*x*.

In this case, in the latch mechanism 1C, as shown in the part (A) in FIG. 17, a portion of the downstream side descending slope 55 in the fourth engagement body 5A comes into contact with one third top portion 41*a* in the third engagement body 4A, and a portion of the third slope 52 in the fourth engagement body 5A comes into contact with the other third top portion 41*b* in the third engagement body 4A. In this manner, the engagement of the latch mechanism 1C starts.

Subsequently, the opening/closing cover 12A is further pushed in the closing direction Da2.

Then, in the latch mechanism 1C, the third moving body 50A and the second moving body 50B in the fourth engagement body 5A are continuously biased in directions separated from each other by respectively receiving the biasing force of the spring force when the coil spring serving as the fourth biasing member 57 is contracted.

In this manner, the third moving body 50A and the second moving body 50B respectively and continuously receive the force in the opening direction Da1 of the opening/closing cover 12A, which is a portion of the component force of the biasing force, from the first engagement portion 42 and the second engagement portion 43 of the third engagement body 4A.

Therefore, the opening/closing cover 12A receives the force in the opening direction of the opening/closing cover 12A from the latch mechanism 1C, in a stage where the engagement of the latch mechanism 1C starts.

Then, as shown in the part (B) in FIG. 17, when one fourth top portions 51*a* in the third moving body 50A of the fourth engagement body 5A comes into contact with one third top portion 41*a* of the third engagement body 4A, the latch mechanism 1C is brought into a state where the other third top portion 41*b* of the third engagement body 4A is in contact with the third slope 52 in the second moving body 50B of the fourth engagement body 5A.

In this case, as shown in the part (B) in FIG. 17, the third moving body 50A of the fourth engagement body 5A is in contact with one third top portion 41*a* in a state where one fourth top portion 51*a* is displaced in the downward direction Ea2. Therefore, the third moving body 50A of the fourth engagement body 5A is in a state of continuously receiving the upward biasing force Jb from the fourth biasing member 57. In addition, when in contact with one third top portion 41*a*, the third moving body 50A in this case is brought into a temporarily balanced state of the force with the first engagement portion 42.

Therefore, the third moving body 50A is brought into a state where the third moving body 50A is less likely to temporarily move, in other words, a state where the movement may be momentarily stopped.

On the other hand, as shown in the part (B) in FIG. 17, the second moving body 50B of the fourth engagement body 5A is in contact with the third slope 52 in a state where the other third top portion 41*b* is displaced in the upward direction Eat. Therefore, the second moving body 50B of the fourth engagement body 5A continuously receives the downward biasing force Ja from the fourth biasing member 57.

Therefore, in the second moving body 50B, the third slope 52 in the second moving body 50B biased downward by the biasing force Ja continuously receives the force Fa in the opening direction Da1 of the opening/closing cover 12A, as a portion of the reaction force and the component force of the biasing force of the fourth biasing member 57 from the other third top portion 41*b*.

In this manner, in the latch mechanism 1C, the second moving body 50B of the fourth engagement body 5A is brought into a state where the second moving body 50B of the fourth engagement body 5A is likely to move in the opening direction Da1 of the opening/closing cover 12A.

Therefore, when the opening/closing cover 12A comes into contact with one third top portion 41*a* and one fourth top portion 51*a* in the latch mechanism 1C, for example, there is no possibility that the movement of the opening/closing cover 12A may be intermediately stopped in the closing direction Da2 due to a temporarily balanced state of the forces.

Subsequently, when the closing operation of the opening/closing cover 12A is continued, in the latch mechanism 1C, as shown in the part (C) in FIG. 18, one fourth top portion 51*a* of the fourth engagement body 5A passes through one third top portion 41*a* of the third engagement body 4A. Thereafter, one fourth top portion 51*a* is brought into a state of being in contact with the fourth slope 53 in the fourth engagement body 5A.

In this case, as shown in the part (C) in FIG. 18, the third moving body 50A of the fourth engagement body 5A is in a moved state in the upward direction Ea1 by continuously receiving the upward biasing force Jb from the fourth biasing member 57. Therefore, one third top portion 41*a* is continuously in contact with the fourth slope 53.

In this manner, in the latch mechanism 1C, the third moving body 50A of the fourth engagement body 5A starts to receive the force Fb, a so-called pulling force, in the closing direction Da2 of the opening/closing cover 12A by using the upward biasing force Jb as a portion of the reaction force and the component force of the biasing force Jb of the fourth biasing member 57, from one third top portion 41*a* via the fourth slope 53

Therefore, the opening/closing cover 12A starts to receive the force Fb in the closing direction Da2 via the third moving body 50A of the fourth engagement body 5A in the latch mechanism 1C.

In addition, when the one fourth top portion 51*a* passes through one third top portion 41*a*, as shown in the part (C) in FIG. 18, the other third top portion 41*b* of the third engagement body 4A completely passes through the distance k by which the contact with the third slope 52 is shifted. Thereafter, the other third top portion 41*b* comes into contact with the other fourth top portion 51*b* and the smooth surface portion 54 in the second moving body 50B of the fourth engagement body 5A.

In this manner, the fourth engagement body 5A does not receive the force Fa (the part (B) in FIG. 17) in the opening direction Da1 of the opening/closing cover 12A. Therefore, the closing operation of the opening/closing cover 12A is smoothly and continuously performed.

Moreover, the latch mechanism 1C has a relationship so that the inclination angle β4 of the fourth slope 53 is larger than the inclination angle β3 of the third slope 52.

Therefore, in the latch mechanism 1C, the third moving body 50A of the fourth engagement body 5A receiving the upward biasing force Jb from the fourth biasing member 57 is also likely to move with respect to one third top portion 41*a* via the fourth slope 53, and the force Fb in the closing direction Da2 of the opening/closing cover 12A is stronger than the force Fa in the opening direction Da1.

In this manner, the closing operation of the opening/closing cover 12A is also smoothly and continuously performed.

Finally, as shown in FIG. 15, when the abutting portion 12*e* of the opening/closing cover 12A abuts on the stop portion 17 in the opening portion 14 of the main body 10A, the opening/closing cover 12A reaches the normal closing position.

In this case, in the latch mechanism 1C, as shown in FIG. 15 or the part (D) in FIG. 18, one third top portion 41*a* of the third engagement body 4A is continuously in contact with the fourth slope 53 of the fourth engagement body 5A.

In this manner, in the latch mechanism 1C, the third moving body 50A of the fourth engagement body 5A continuously receives the force Fb in the closing direction Da2 of the opening/closing cover 12A, as a portion of the reaction force and the component force of the biasing force Jb of the fourth biasing member 57 from one third top portion 41*a* via the fourth slope 53. In this manner, the third moving body 50A of the fourth engagement body 5A holds the opening/closing cover 12A in a closed state.

The state of the latch mechanism 1C in this case is a state where the engagement when the opening/closing cover 12A is closed is completed.

Therefore, compared to a case where the opening/closing cover 12A holds a closed state without one third top portion 41*a* in the latch mechanism 1C coming into contact with the fourth slope 53, the opening/closing cover 12A continuously receives the force Fb in the closing direction Da2. Therefore, the opening/closing cover 12A holds a closed state where rattling is unlikely to occur in the opening portion 14 of the main body 10A.

As described above, in the device 100C including the latch mechanism 1C according to the third exemplary embodiment, when the opening/closing cover 12A is closed, the opening/closing cover 12A is normally closed at the normal closing position without being stopped before reaching the normal closing position.

Incidentally, the operation of the latch mechanism 1C when the opening/closing cover 12A is opened has substantially the same contents as the operation of the latch mechanism 1A in the first exemplary embodiment.

Fourth Exemplary Embodiment

FIG. 19 is a view conceptually showing a portion of a device 100D including a latch mechanism 1D according to a fourth exemplary embodiment of the present invention, and is a perspective view of a portion in which the opening/closing cover of the device 100D is opened. FIG. 20 is a schematic sectional view of a portion in which the opening/closing cover of the device 100D is closed.

The device 100D is different from the device 100A according to the first exemplary embodiment in that a latch mechanism 1D is applied instead of the latch mechanism 1A according to the first exemplary embodiment. However, except for this point, the device 100D has the same configuration as the device 100A.

Therefore, hereinafter, the same reference numerals will be assigned to common elements, and description thereof will be omitted unless necessary.

The latch mechanism 1D is configured to include a third engagement body 4B having a pair of third top portions 41*a* and 41*b* in which the opening/closing body engagement unit 1*y* is arranged to be separated in the direction Dr (refer to FIG. 21) vertically orthogonal to the closing direction Da2 of the opening/closing cover 12A.

In addition, the latch mechanism 1D is configured to include a fourth engagement body 5B having a pair of fourth top portions 51*a* and 51*b* in which the main body engagement unit 1*x* can be displaced in the orthogonal direction Dr by coming into contact with the pair of third top portions 41*a* and 41*b* in the third engagement body 4B at respectively different timings.

The third engagement body 4B in the fourth exemplary embodiment has substantially the same configuration as the third engagement body 4A in the third exemplary embodiment, except that the third engagement body 4B is arranged in the opening/closing cover 12A and a portion of the structure is changed.

As shown in FIGS. 19 and 20, the third engagement body 4B is a structural body including a first engagement portion 42B, a second engagement portion 43B, and a support body 44B.

Out of these, the first engagement portion 42B is the same as the second engagement portion 43 in the third exemplary embodiment, except that one third top portion 41*a* is vertically changed to face upward. The second engagement portion 43B is the same as the second engagement portion 43 in the third exemplary embodiment, except that the other third top portion 41*b* is vertically changed to face downward.

The support body 44B is the same as the support body 44 in the third exemplary embodiment, except that the support body 44B has a plate-shaped structure without providing the first support arm 44*b* and the second support arm 44*c*, the first engagement portion 42B is directly provided in the upper end portion, and the second engagement portion 43B is directly provided in the lower end portion. In addition, the support body 44B is attached to be fixed to the attachment frame 16 in the main body 10A.

The fourth engagement body 5B in the fourth exemplary embodiment has substantially the same configuration as the fourth engagement body 5A in the third exemplary embodiment except that the fourth engagement body 5B is arranged in the opening portion 14 of the main body 10A and that a portion of the structure is changed.

As shown in FIGS. 19 and 21, the fourth engagement body 5B is a structural body including the third moving body 50A, the second moving body 50B, the fourth support portion 56, and the fourth biasing member 57.

Out of these, the third moving body 50A and the second moving body 50B are different from the third moving body 50A and the second moving body 50B in the third exemplary embodiment in that both are vertically reversed and are arranged by reversing the upstream side and the downstream side in the closing direction Da2 of the opening/closing cover 12A. Except for these points, the third moving body 50A and the second moving body 50B are the same as the third moving body 50A and the second moving body 50B in the third exemplary embodiment.

The fourth support portion 56 has substantially the same configuration as the support portion 24 in the first exemplary embodiment.

The fourth biasing member 57 is different in that the fourth biasing member 57 is divided into a fourth biasing member 57A which can bias the third moving body 50A downward from the upper end of the fourth support portion 56, and a fourth biasing member 57B which can bias the second moving body 50B upward from the lower end of the fourth support portion 56.

The fourth support portion 56 is attached to be fixed to the attachment frame 16 in the main body 10A.

In a case where names of portions constituting the third engagement body 4B and the fourth engagement body 5B are assigned to the upstream side or the downstream side with reference to the upstream side and the downstream side in the closing direction Da2 of the opening/closing cover 12A, the names are in a reversed relationship. Accordingly, in a case of being assigned to the upstream side, the names are changed to the names assigned to the downstream side, and in a case of being assigned to the downstream side, the names are changed to the names assigned to the upstream side.

In a case where both are vertically reversed, for example, the ascending slope is changed to the descending slope, and the descending slope is changed to the ascending slope. For example, in the third moving body 50A of the fourth engagement body 5B, the upstream side descending slope of the third moving body 50A in the third exemplary embodiment is changed to the upstream side ascending slope.

In addition, as shown in FIG. 21, in the second moving body 50B of the fourth engagement body 5B, the other fourth top portion 51*b* which is the upper end of the third slope 52 in the pair of fourth top portions 51*a* and 51*b* is arranged at a position shifted by the distance k to the downstream side in the closing direction Da2 from one fourth top portion 51*a*.

Operation of Latch Mechanism

As shown in FIGS. 22 and 23, the closing operation and the opening operation of the opening/closing cover 12A of the latch mechanism 1D are slightly different in the movement, the action, and the method in which the third engagement body 4B arranged on the opening/closing cover 12A side moves close to or separated from the fourth engagement body 5B arranged on the main body 10A side. However, except for this point, the configuration is substantially the same as the contents (refer to FIGS. 17 and 18) described as each operation of the latch mechanism 1C according to the third exemplary embodiment.

Incidentally, in the latch mechanism 1D, when the opening/closing cover 12A is closed, the engagement of the latch mechanism 1D shown in the part (A) in FIG. 22 starts. Thereafter, as shown in the part (B) in FIG. 22, when one third top portion 41*a* in the third engagement body 4B comes into contact with one fourth top portion 51*a* in the fourth engagement body 5B, the other third top portion 41*b* of the third engagement body 4B is also brought into a state of being in contact with the third slope 52 of the fourth engagement body 5B.

In this case, the second moving body 50B of the fourth engagement body 5B is in a state where the other third top portion 41*b* continuously pushes the third slope 52 downward. Therefore, the second moving body 50B continuously receives the upward biasing force Ja of the fourth biasing member 57B. Therefore, the second moving body 50B continuously receives the force Fa in the opening direction Da1 of the opening/closing cover 12A, as a portion of the reaction force and the component force of the biasing force Ja via the third slope 52 from the other third top portion 41*b*.

In this manner, the latch mechanism 1D in this case is brought into a state where the third engagement body 4B is likely to move in the opening direction Da1 of the opening/closing cover 12A.

Therefore, when one third top portion 41*a* comes into contact with one fourth top portion 51*a* in the latch mechanism 1D, for example, there is no possibility that the movement of the opening/closing cover 12A may be intermediately stopped in the closing direction Da2 due to a temporarily balanced state of the forces.

In addition, in the latch mechanism 1D, as shown in the part (C) in FIG. 23, after one third top portion 41*a* of the third engagement body 4B passes through one fourth top portion 51*a* of the fourth engagement body 5B, the one third top portion 41*a* is also brought into a state of being in contact with the fourth slope 53 of the fourth engagement body 5B.

In this manner, in the latch mechanism 1D, the second moving body 50B of the third engagement body 4B starts to receive the force Fb in the closing direction Da2 of the opening/closing cover 12A, as a portion of the component force of the biasing force Jb of the fourth biasing member 57A, via the fourth slope 53 from one third top portions 41*a*.

Therefore, the opening/closing cover 12A starts to receive the force Fb in the closing direction Da2 via the third engagement body 4B in the latch mechanism 1D.

Furthermore, in the latch mechanism 1D, as shown in the part (D) in FIG. 23, when the opening/closing cover 12A reaches the normal closing position, one third top portions 41*a* of the third engagement body 4B is also continuously in contact with the fourth slope 53 of the fourth engagement body 5B.

In this manner, in the latch mechanism 1D, the third moving body 50A of the third engagement body 4B receiving the downward biasing force Jb continuously receives the force Fb in the closing direction Da2 of the opening/closing cover 12A as a portion of the reaction force and component force of the biasing force Jb via the fourth slope 53 from one third top portions 41*a*. In this manner, one fourth top portion 51*a* in the fourth engagement body 5B holds the opening/closing cover 12A in a closed state.

Therefore, compared to a case where one third top portion 41*a* in the latch mechanism 1D holds the opening/closing cover 12A in a closed state without coming into contact with the fourth slope 53, the opening/closing cover 12A is held in a closed state where rattling is unlikely to occur in the opening portion 14 of the main body 10A.

As described above, in the device 100D including the latch mechanism 1D according to the fourth exemplary embodiment, when the opening/closing cover 12A is closed, the opening/closing cover 12A is also normally closed at the normal closing position without being stopped before reaching the normal closing position.

Fifth Exemplary Embodiment

FIGS. 24A and 24B are perspective views of a device 100E including a latch mechanism 1 according to a fifth exemplary embodiment of the present invention. FIG. 25 is a schematic front view of the device 100E.

Device Including Latch Mechanism

The device 100E including the latch mechanism 1 is an example of an image forming device, and includes a housing 10B which is another example of the main body.

The housing 10B is configured to have a required outer shape, and the outside is covered with an exterior cover 11.

In addition, as shown in FIG. 25, the housing 10B internally has an image forming unit 120 is arranged as a functional unit 102A, and a medium supply unit 130 is arranged as a functional unit 102B.

The image forming unit 120 is a structural portion that forms an image on a recording medium 109. For example, the image forming unit 120 is configured to include an image forming device using an electrophotographic method.

The image forming unit 120 using the above-described method includes an image holding body such as a photoconductor having a surface for holding an image, equipment such as a charging device, an exposure device, a developing device, and a transfer device which are arranged around the image holding body, and a fixing device arranged at a position separated from the image holding body (all are not shown). In addition, the image forming unit 120 using the above-described method also includes related equipment such as a developer replenishing device, an image processing device, and a control device (all are not shown).

The medium supply unit 130 is a structural portion that supplies the recording medium 109 to the image forming unit 120.

For example, the medium supply unit 130 is configured to include two vertically arranged stages of medium supply units 130A and 130B. The medium supply units 130A and 130B can be pulled out to the front surface side of the main body 10B. In addition, the medium supply units 130A and 130B are respectively covered with front surface covers 16*a* and 16*b* on the front surface side of the main body 10B.

As the recording medium 109, a sheet-shaped medium which can be conveyed inside the housing 10B and can form an image by the image forming unit 120 is used. A one dot chain line with an arrow in FIG. 25 indicates a main transport path of the recording medium 109.

In addition, the housing 10B includes the image forming unit 120 and the medium supply unit 130. Therefore, a medium discharge unit 140 for discharging and accommodating the recording medium 109 on which the image is formed is provided.

For example, the medium discharge unit 140 in the fifth exemplary embodiment is provided as a unit, a so-called in-body discharge unit having an open discharge space in which a portion of the front surface and the right side surface is open in a portion biased to the right side in the upper portion of the housing 10B. A reference numeral 142 in FIG. 25 indicates a medium accommodating surface, and a reference numeral 142*b* indicates a slope portion of the medium accommodating surface 142.

Furthermore, as shown in FIGS. 24A and 24B, the device 100E is configured to serve as opening/closing covers 12A and 12C in which a portion of the exterior cover 11 is an example of the opening/closing body. The device 100E may include the opening/closing cover other than the opening/closing covers 12A and 12C.

The opening/closing cover 12A is a rectangular cover that constitutes a portion of an exterior cover 11*e* arranged on the front surface side of the device 100E. In addition, the opening/closing cover 12A is a vertical opening type opening/closing cover that covers and exposes the image forming unit 120. Furthermore, the opening/closing cover 12A is configured to serve as a cover that covers a slope portion 142*b* of the medium accommodating surface 142 in the medium supply unit 130.

The vertical opening type opening/closing cover 12A has substantially the same configuration as the opening/closing cover 12A in the first exemplary embodiment.

For example, the opening/closing cover 12C is a rectangular cover that constitutes a portion of an exterior cover 11*f* arranged on the right side surface of the device 100E. In addition, the opening/closing cover 12C is a vertical opening type opening/closing cover having the same type as the opening/closing cover 12A.

A reference numeral 14 shown in FIGS. 24A and 24B indicates an opening portion when the main body 10B is opened/closed by the opening/closing cover 12A, and reference numerals 15*c* and 15*d* indicate respective handle portions of the opening/closing covers 12A and 12C.

Latch Mechanism

As the latch mechanism 1 that engages with the opening/closing cover 12A when closing the opening/closing cover 12A, the device 100E is provided with any one of the latch mechanisms 1A to 1D according to the first to fourth exemplary embodiments.

On the other hand, the opening/closing cover 12C is provided with the latch mechanism or the opening/closing mechanism having a configuration different from a configuration of the latch mechanism 1 in the opening/closing cover 12A, but the same latch mechanism 1 may be provided.

Therefore, in the device 100E consisting of the image forming device including any one of the latch mechanisms 1A to 1D, when the opening/closing cover 12A is closed, the opening/closing cover 12A is also normally closed at the normal closing position without being stopped before reaching the normal closing position.

Therefore, the device 100E is provided with a detection switch that detects that the opening/closing cover 12A is physically pressed. In a case where the image forming unit 120 is configured to be operable when the detection switch detects the pressing, for example, the following problem can be avoided.

That is, in the device 100E adopting the configuration relating to the detection switch, the detection switch may detect that the opening/closing cover 12A is closed even though the opening/closing cover 12A is stopped before reaching the normal closing position. In this case, when an image forming operation in the device 100E starts, there is a possibility that the opening/closing cover 12A may vibrate to generate an abnormal noise, or the opening/closing cover 12A may be unexpectedly opened in some cases.

In this regard, in the device 100E provided with any one of the latch mechanisms 1A to 1D, the opening/closing cover 12A is normally closed at the normal closing position without being stopped before reaching the normal closing position. Therefore, the above-described problem can be avoided.

Modification Examples

The present invention is not limited to the contents described as examples in the first to fifth exemplary embodiments. For example, the present invention also includes modification examples as described below.

Modification Example 1

In the first exemplary embodiment, as shown in FIG. 26, a latch mechanism 1F may be adopted as follows. A first engagement body 2C may be applied as the main body engagement unit 1*x* instead of the first engagement body 2A, and a second engagement body 3C may be applied as the opening/closing body engagement unit 1*y* instead of the second engagement body 3A.

As shown in FIGS. 26, 27A, 27B, and 28, the first engagement body 2C is a structural body including a first arm 26A having one first top portion 21*c* arranged on one end portion side, a second arm 26B having the other first top portion 21*d* arranged in one end portion, a shaft 27 that supports the other end portion of the first arm 26A and the other end portion of the second arm 26B to be pivotable, and a biasing member 28 that biases the first arm 26A and the second arm 26B in a direction in which both returns to a fixed position when one first top portion 21*c* and the other first top portion 21*d* are held with the constant interval Sa.

As shown in FIG. 27B, the first arm 26A and the second arm 26B are configured to include a pair of right and left arms 26Aa and 26Ab and a pair of right and left arms 26Ba and 26Bb which have the same length. In addition, the first arm 26A and the second arm 26B respectively pivot around the shaft 27 in the upward direction Ea1 and the downward direction Ea2. The first arm 26A and the second arm 26B are configured to serve as which are less likely to be elastically deformed.

For example, the shaft 27 is attached to be fixed to the attachment frame 16 in the main body 10A (10B).

For example, as shown in FIG. 27B, one first top portion 21*c* and the other first top portion 21*d* are formed of round bar members. One first top portion 21*c* is arranged to exist between one end portion sides of the pair of right and left arms 26Aa and 26Ab. The other first top portion 21*d* is arranged to exist between one end portion sides of the pair of right and left arms 26Ba and 26Bb.

As shown in FIG. 26 or 28, for example, a helical spring is applied to the biasing member 28. In addition, in the biasing member 28, one free end 28*b* is attached to the first arm 26A, and the other free end 28*c* is attached to the second arm 26B. The biasing member 28 biases and supports the first arm 26A and the second arm 26B to hold one first top portion 21*c* and the other first top portion 21*d* at the constant intervals Sa.

For example, one first top portion 21*c* and the other first top portion 21*d* are held with the constant intervals Sa by adopting a configuration in which pivoting of the first arm 26A and the second arm 26B in the shaft 27 is restricted.

On the other hand, as shown in FIGS. 26, 27A and 28, the second engagement body 3C is an entry body 30 that enters between one end portion of the first arm 26A and one end portion of the second arm 26B, and is a structural body having a pair of second top portions 31*a* and 31*b* which come into contact with the pair of first top portions 21*c* and 21*d* in the first engagement body 2C at respectively different timings.

In the second engagement body 3C, one second top portion 31*a* is arranged to protrude upward in one end portion on a side facing one first top portion 21*c* in one end portion where the entry body 30 faces the first engagement body 2C. In addition, the second engagement body 3C is configured to serve as a structural body having a shape in which the other second top portion 31*b* is arranged to protrude downward in an end portion on a side facing the other first top portion 21*d* in the one end portion of the entry body 30. As shown in FIG. 28, one second top portion 31*a* and the other second top portion 31*b* are provided with the predetermined interval Sb.

The entry body 30 which is the second engagement body 3C is attached to be fixed to the back surface side of the opening/closing cover 12A.

In addition, the second engagement body 3C is provided with the first slope 32 extending to be inclined from the other second top portion 31*b* in the entry body 30. The first slope 32 is provided as a slope inclined obliquely upward at the predetermined inclination angle $\beta 1$ from the other second top portion 31*b* on the downstream side in the closing direction Da2 of the opening/closing cover 12A.

Furthermore, the second engagement body 3C is provided with the second slope 33 extending to be inclined from one second top portion 31*a* in the entry body 30. The second slope 33 is provided as a slope inclined obliquely downward at the predetermined inclination angle $\beta 2$ ($>\beta 1$) from one second top portion 31*a* on the upstream side in the closing direction Da2 of the opening/closing cover 12A.

In addition, the second engagement body 3C is provided with a downstream side descending slope 35B inclined obliquely downward from one second top portions 31*a* on the downstream side in the closing direction Da2 of the opening/closing cover 12A and intersecting with the upper end of the first slope 32. A portion in which the upper end of the first slope 32 and the lower end of the downstream side descending slope 35B intersect with each other is a tip top portion 31g.

In addition, the second engagement body 3C is provided with a flat surface portion 34 extending from the other second top portion 31*b* to the upstream side in the closing direction Da2 of the opening/closing cover 12A. In addition, in the second engagement body 3C, a portion extending from a lower end 31*e* of the second slope 33 to the upstream side in the closing direction Da2 of the opening/closing cover 12A is a flat surface.

Then, when the closing operation of the opening/closing cover 12A is performed, as shown in FIG. 29A, in the latch mechanism 1F, the tip top portion 31*g* moves ahead, and the second engagement body 3C enters between the first arm 26A and the second arm 26B in the first engagement body 2C.

In this case, a portion of the downstream side descending slope 35B in the second engagement body 3C comes into contact with one first top portion 21*c*, and a portion of the first slope 32 in the second engagement body 3C comes into contact with the other first top portion 21*d*. In this manner, the latch mechanism 1F is brought into a state where the engagement starts.

Subsequently, when the opening/closing cover 12A is further moved in the closing direction Da2, in the latch mechanism 1F, as shown in FIG. 29B, when one second top portion 31*a* of the second engagement body 3C comes into contact with one first top portion 21*c* of the first engagement body 2C, the other first top portion 21*d* of the first engagement body 2C is brought into a state of being in contact with the first slope 32 of the second engagement body 3C.

In this case, the second arm 26B receives a biasing force Jd acting obliquely upward from the biasing member 28, and the biasing force Jd is turned into the force Fa in the opening direction Da1 of the opening/closing cover 12A to be applied to the entry body 30 which is the second engagement body 3C as a portion of the reaction force and the component force via the first slope 32. In addition, the first arm 26A in this case receives a biasing force Jc acting obliquely downward from the biasing member 28. However, one first top portion 21*c* and one second top portion 31*a* come into contact with each other to be brought into a temporarily balanced state of the forces with the entry body 30 which is the second engagement body 3C.

In this manner, the latch mechanism 1F in this case is brought into a state where the second engagement body 3C is likely to move in the opening direction Da1 of the opening/closing cover 12A.

Therefore, when one first top portion 21*c* and one second top portion 31*a* come into contact with each other in the latch mechanism 1F, for example, there is no possibility that the movement of the opening/closing cover 12A may be intermediately stopped in the closing direction Da2 due to a temporarily balanced state of the forces.

Finally, in the latch mechanism 1F, as shown in FIG. 29C, when the opening/closing cover 12A reaches the normal closing position, one first top portions 21*c* of the first engagement body 2C is also continuously in contact with the second slope 33 of the second engagement body 3C. In this case, the other first top portion 21*d* is in contact with the flat surface portion 34 along the upstream side in the closing direction Da2 of the second engagement body 3C.

In this manner, in the latch mechanism 1F, the second engagement body 3C continuously receives the force Fb in the closing direction Da2 of the opening/closing cover 12A as a portion of the reaction force and component force of the biasing force Jc via the second slope 33 from one first top portion 21*c* in the first arm 26A receiving the downward biasing force Jc. In this manner, one first top portion 21*c* in the first engagement body 2C holds the opening/closing cover 12A in a closed state.

Therefore, in the opening/closing cover 12A adopting the latch mechanism 1F, compared to a case where one first top portion 21*c* in the latch mechanism 1F holds the opening/closing cover 12A in a closed state without coming into contact with the second slope 33, the opening/closing cover 12A is held in a closed state where rattling is unlikely to occur in the opening portion 14 of the main body 10A.

Modification Example 2

In the first exemplary embodiment, as shown in FIGS. 30A and 30B, a latch mechanism 1H may be adopted as follows. A first engagement body 2D may be applied as the main body engagement unit 1*x* instead of the first engagement body 2A, and a second engagement body 3C may be applied as the opening/closing body engagement unit 1*y* instead of the second engagement body 3A.

The first engagement body 2D has the same configuration as the first engagement body 2A except that the first engagement body 2D is different in the following points.

A different point is that the first moving body 22 and the second moving body 23 in the first engagement body 2A are vertically switched to be arranged in the support portion 24, one first top portion 21*a* protruding downward is provided in the lower end of the second moving body 23, the other first top portion 21*b* protruding upward is provided in the upper end of the first moving body 22, and the biasing member 25 is configured to be divided into a first biasing member 25A for biasing the second moving body 23 and a second biasing member 25B for biasing the first moving body 22.

In the first engagement body 2D, as shown in FIG. 30A, the first moving body 22 and the second moving body 23 are held with the predetermined interval Sa, and a position when both are held at the interval Sa is a fixed position.

As shown in FIG. 30B, when the second moving body 23 is moved in the upward direction Ea1, the first biasing member 25A biases the second moving body 23 to return to the fixed position by using the biasing force Jb directed in the downward direction. In addition, when the first moving body 22 is moved in the downward direction Ea2, the second biasing member 25B biases the first moving body 22 to return to the fixed position by using the biasing force Ja directed in the upward direction.

On the other hand, the second engagement body 3C is the same as the second engagement body 3C (refer to FIG. 28) described in Modification Example 1.

Then, in the latch mechanism 1H, when the opening/closing cover 12A is moved in the closing direction Da2, as shown in FIG. 30B, when one second top portion 31*a* in the second engagement body 3C comes into contact with one first top portion 21*a* of the first engagement body 2D, the other first top portion 21*b* of the first engagement body 2D is brought into a state of being in contact with the first slope 32 of the second engagement body 3C.

In this case, the first moving body 22 receives the upward biasing force Ja from the first biasing member 25A, and the biasing force Ja is turned into the force Fa in the opening direction Da1 of the opening/closing cover 12A to be applied to the main body via the first slope 32 as a portion of the reaction force and the component force of the biasing force Ja.

In this manner, the latch mechanism 1H in this case is brought into a state where the second engagement body 3C is likely to move in the opening direction Da1 of the opening/closing cover 12A.

Therefore, in the opening/closing cover 12A adopting the latch mechanism 1H, when one first top portion 21*a* and one second top portion 31*a* come into contact with each other in the latch mechanism 1H, for example, there is no possibility that the movement of the opening/closing cover 12A may be intermediately stopped in the closing direction Da2 due to a temporarily balanced state of the forces.

Modification Example 3

In the first exemplary embodiment, as shown in FIGS. 31A and 31B, a latch mechanism 1M may be adopted as follows. A first engagement body 2E may be applied as the main body engagement unit 1*x* instead of the first engagement body 2A, and a second engagement body 3E may be applied as the opening/closing body engagement unit 1*y* instead of the second engagement body 3A.

The first engagement body 2E is a structural body including one first engagement body 2Ea in which one first top portion 21*a* is arranged in one end portion of a flexible third arm 29A, and the other first top portion 21*b* in which the other first engagement body 2Eb is arranged in one end portion of a flexible fourth arm 29B.

In one first engagement body 2Ea, a first protruding portion 20A consisting of the first moving body 22 (refer to FIG. 6) excluding the guided portion 22*b* in the first exemplary embodiment is provided on the upper surface of one end portion of the third arm 29A. In the other first engagement body 2Eb, a second protruding portion 20B consisting of the second moving body 23 (refer to FIG. 6) excluding the guided portion 23*b* in the first exemplary embodiment is provided on the lower surface of one end portion of the fourth arm 29B.

The third arm 29A and the fourth arm 29B have a physical property in which both are bent in a bow shape by being elastically deformed when receiving an external force. The other end portion of the third arm 29A and the other end portion of the fourth arm 29B are attached to be fixed to the attachment frame 16 of the main body 10A (10B).

The second engagement body 3E is a structural body including one second engagement body 3Ea in which one second top portion 31*a* is arranged to face one first top portion 21*a* in one end portion of a fifth arm 39A, and the other second engagement body 3Eb in which the other second top portion 31*b* is arranged to face the other first top portion 21*b* in one end portion of a sixth arm 39B.

In one second engagement body 3Ea, a first protruding portion 30Ea consisting of a main portion of the first protruding portion 30A (refer to FIG. 6) in the first exemplary embodiment is provided on the lower surface of one end portion of the fifth arm 39A. In the other second engagement body 3Eb, a second protruding portion 30Eb consisting of the second protruding portion 30B (refer to FIG. 6) in the first exemplary embodiment is provided in the tip of one end portion of the sixth arm 39B.

The fifth arm 39A and the sixth arm 39B are configured to serve as members which are less likely to be elastically deformed. The other end portion of the fifth arm 39A and the other end portion of the sixth arm 39B are attached to be fixed to the back surface side of the opening/closing cover 12A.

Then, in the latch mechanism 1M, when the opening/closing cover 12A is moved in the closing direction Da2, as shown in FIG. 31B, when one second top portion 31*a* of one second engagement body 3Ea comes into contact with one first top portion 21*a* of one first engagement body 2Ea, the other second top portion 31*b* of the other first engagement body 2Eb is brought into a state of being in contact with the first slope 32 of the other second engagement body 3Eb.

In this case, one second top portion 31$a$ receives an upward biasing force Jf via the supported first protruding portion 20A from the third arm 29A in a state of being elastically deformed and bent.

In this case, the second protruding portion 20B of the other second engagement body 3Eb receives a downward biasing force Je via the second protruding portion 20B from the fourth arm 29B in a state of being elastically deformed and bent. In addition, the biasing force Je in this case turns into the force Fa in the opening direction Da1 of the opening/closing cover 12A as a portion of the reaction force and the component force via the first slope 32, and the force Fa is applied to the second protruding portion 30Eb of the other second engagement body 3Eb.

In this manner, the latch mechanism 1M in this case is brought into a state where the other second engagement body 3Eb is likely to move in the opening direction Da1 of the opening/closing cover 12A.

Therefore, in the opening/closing cover 12A adopting the latch mechanism 1M, when one first top portion 21$a$ and one second top portion 31$a$ come into contact with each other in the latch mechanism 1M, for example, there is no possibility that the movement of the opening/closing cover 12A may be intermediately stopped in the closing direction Da2 due to a temporarily balanced state of the forces.

Other Modification Examples

Alternatively, in the third exemplary embodiment, the latch mechanism 1C may be changed to the latch mechanism configured as follows. The third engagement body 4B (refer to FIG. 19) in the fourth exemplary embodiment may be applied as the main body engagement unit 1$x$ instead of the third engagement body 4A. In addition, the fourth engagement body 5B (refer to FIG. 19) in the fourth exemplary embodiment may be applied as the opening/closing body engagement unit 1$y$ instead of the second engagement body 3A.

In the first exemplary embodiment, the second engagement body 3A in the latch mechanism 1A may be configured as follows. The support plate 38A of one second engagement body 3Aa and the support plate 38B of the other second engagement body 3Ab which are shown in FIG. 6 may be integrated to form one support plate, or both the first protruding portion 30A and the second protruding portion 30B may be provided in the one support plate.

In the second exemplary embodiment, the second engagement body 3B in the latch mechanism 1B may also be configured as follows. The support plate 38A of one second engagement body 3Ba and the support plate 38B of the other second engagement body 3Bb which are shown in FIG. 10 may be integrated to form one support plate, or both the first protruding portion 30A and the second protruding portion 30B may be provided in the one support plate.

In the first engagement body 22A in the first exemplary embodiment, the first engagement body 22B in the second exemplary embodiment, the fourth engagement body 5A in the third exemplary embodiment, the fourth engagement body 5B in the fourth exemplary embodiment, and the first engagement body 2D in Modification Example 2, a case where the compression coil spring acting by receiving a compression load is applied as the biasing members 25 and 57 has been described as an example.

However, each of the engagement bodies 22A, 22B, 5A, 5B, and 2D may be configured so that a tension coil spring acting by receiving a tensile load is applied as the biasing members 25 and 57.

In Modification Example 1, the latch mechanism 1F (refer to FIG. 26) may be changed to the latch mechanism as follows. The second engagement body 3C may be applied as the main body engagement unit 1$x$, and the first engagement body 2C may be applied as the opening/closing body engagement unit 1$y$.

In addition, in Modification Example 3, in a case where the helical spring is applied as the biasing member 28 in the first engagement body 2C (refer to FIG. 26), the length of the free end 28$b$ and the length of the free end 28$c$ may be different from each other. In this manner, the biasing forces applied to the first arm 26A and the second arm 26B from the biasing member 28 can be adjusted to be different from each other.

In Modification Example 3, the latch mechanism 1M (refer to FIGS. 31A and 31B) may be changed to the latch mechanism as follows. The second engagement body 3E may be applied as the main body engagement unit 1$x$, and the first engagement body 2E may be applied as the opening/closing body engagement unit 1$y$.

In addition, in Modification Example 3, the latch mechanism 1M may be changed to the latch mechanism configured as follows. The third arm 29A and the fourth arm 29B in the first engagement body 2E may be used as arms which are not elastically deformed, and the fifth arm 39A and the fifth arm 39A in the second engagement body 3E may be flexible arms.

Each of the latch mechanisms in each modification example described above may be applied to a device 100F according to the fifth exemplary embodiment.

The device 100F according to the fifth exemplary embodiment is not limited to a case where the image forming unit using the electrophotographic method is adopted as the image forming unit 20, and the image forming unit using other image forming methods may be adopted as the image forming unit 20. For example, other image forming methods include a droplet ejection method (ink ejection method or the like) and a wet development method.

In addition, the latch mechanisms 1A to 1D according to the first to fourth exemplary embodiments and the latch mechanisms 1F and 1M of the respective modification examples are not limited to cases applied to the vertical opening type opening/closing cover, and can also be applied to a horizontal opening type opening/closing cover or an oblique opening type opening/closing cover.

In addition, in addition to the opening/closing cover, the latch mechanisms 1A to 1D, 1F, and 1M can also be applied to an opening/closing body, for example, such as an opening/closing door and an opening/closing box, or a drawer body that opens/closes a portion of the main body.

Furthermore, in the first to fifth exemplary embodiments and Modification Examples 1 to 3 described above, a case where one latch mechanism 1 (one set consisting of the main body engagement unit 1$x$ and the opening/closing body engagement unit 1$y$) is provided in one opening/closing cover 12A and the main bodies 10A and 10B has been described as an example. However, a plurality (set) of latch mechanisms can also be provided in one opening/closing cover 12A and the main bodies 10A and 10B.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A latch mechanism comprising:

a main body engagement unit arranged in a main body having an opening or closing body that may open and close; and an opening or closing body engagement unit arranged in the opening or closing body to engage with the main body engagement unit when the opening or closing body is closing, wherein the main body engagement unit is configured to include a first engagement body having a pair of first top portions displaceable in a direction orthogonal to a closing direction of the opening or closing body, the opening or closing body engagement unit is configured to include a pair of second engagement bodies, the pair of second engagement bodies having a pair of second top portions, wherein the pair of second top portions respectively coming into contact with the pair of first top portions, and when one of the pair of second top portions comes into contact with one of the pair of first top portions while the opening or closing body is closing, the other of the pair of the first top portions applies a force in an opening direction of the opening or closing body to a first slope of the pair of second engagement bodies in a state where the other of the pair of first top portions is in contact with the other of the pair of second top portions, wherein one of the pair of second engagement bodies has a second slope that receives a force in a direction in which one of the pair of second engagement bodies close the opening or closing body by coming into contact with the one first top portion after the one first top portion passes through the one second top portion while the opening or closing body is closed, and the pair of second engagement bodies have a surface portion extending from the other second top portion to a side opposite to the first slope along the opening direction of the opening or closing body, wherein one of the pair of second top portions comprises an ascending slope and the second slope which is an descending slope in reference to a closing direction of the opening or closing body, and the other one of the pair of the second top portions comprises the first slope which is ascending in reference to the closing direction of the opening or closing body and does not comprise a descending slope.

2. The latch mechanism according to claim 1, wherein the at least two second engagement bodies are arranged at a position where the other second top portion, which is one end of the first slope of the pair of second top portions, is positioned on an upstream side in the closing direction from the one second top portion.

3. The latch mechanism according to claim 1, wherein an inclination angle of the second slope is larger than an inclination angle of the first slope.

4. The latch mechanism according to claim 1, wherein the one first top portion is held in a state where the opening or closing body is closing by being continuously in contact with the second slope.

5. The latch mechanism according to claim 1, wherein a distance between the second engagement bodies, in the direction orthogonal to the closing direction, is greater than a distance between the pair of the first engagement bodies.

6. The latch mechanism according to claim 1, wherein while the one first top portion of the pair of first top portions is in contact with the ascending slope and subsequently the second slope which is a descending slope of the one of the pair of second top portions as the opening or closing body is closing, the other first top portion of the pair of first top portions is in contact with the ascending first slope of the other one of the pair of second top portions.

7. A device comprising:

a main body;

one or a plurality of opening or closing bodies attached to the main body to be openable and closable; and the latch mechanism according to claim 1, which is provided in the main body and at least one opening or closing body of the opening or closing bodies.

8. The device according to claim 7, wherein the main body is provided with an image forming unit that forms an image on a recording medium.

9. A latch mechanism comprising:

a main body engagement unit arranged in a main body having an opening or closing body that may open and close; and an opening or closing body engagement unit arranged in the opening or closing body to engage with the main body engagement unit when the opening or closing body is closing, wherein the opening or closing body engagement unit is configured to include a first engagement body having a pair of first top portions displaced in a direction orthogonal to a closing direction of the opening or closing body, the main body engagement unit is configured to include a pair of second engagement bodies, each of the pair of second engagement bodies having one of a pair of second top portions, wherein the pair of second top portions respectively coming into contact with the pair of first top portions, and when one of the pair of first top portions comes into contact with one of the pair of second top portions while the opening or closing body is closing, the pair of second engagement bodies have a first slope that applies a force in a direction to open the opening or closing body to the other first top portion in a state where the other of the pair of first top portions is in contact with the other of the pair of second top portions, wherein one of the pair of second engagement bodies have a second slope that receives a force in a direction in which the one first top portion closes the opening or closing body by coming into contact with the one first top portion after the one first top portion passes through the one second top portion while the opening or closing body is closed, and the pair of second engagement bodies have a surface portion extending from the other second top portion to a side opposite to the first slope along the opening direction of the opening or closing body, wherein one of the pair of second top portions comprises an ascending slope and the second slope which is an descending slope in reference to a closing direction of the opening or closing body, and the other one of the pair of the second top portions comprises the first slope which is ascending in reference to the closing direction of the opening or closing body and does not comprise a descending slope.

10. The latch mechanism according to claim 9, wherein the at least two second engagement bodies are arranged at a position where the other second top portion, which is one end of the first slope of the pair of second top portions, is positioned on a downstream side in the closing direction from the one second top portion.

11. The latch mechanism according to claim 9, wherein an inclination angle of the second slope is larger than an inclination angle of the first slope.

12. The latch mechanism according to claim 9, wherein the one first top portion is held in a state where the opening or closing body is closing by being continuously in contact with the second slope.

13. A device comprising:

a main body;

one or a plurality of opening or closing bodies attached to the main body to be openable or closable; and the latch mechanism according to claim 9, which is provided in the main body and at least one opening or closing body of the opening or closing bodies.

14. A latch mechanism comprising:

a main body engagement unit arranged in a main body having an opening or closing body that may open and close; and an opening or closing body engagement unit arranged in the opening or closing body to engage with the main body engagement unit when the opening or closing body is closing, wherein the main body engagement unit is configured to include a pair of third engagement bodies having a pair of third top portions arranged apart from each other in a direction orthogonal to a closing direction of the opening or closing body, the opening or closing body engagement unit is configured to include a pair of fourth engagement bodies having two moving bodies, each of the two moving bodies includes a fourth top portion displaced in the orthogonal direction by respectively coming into contact with the pair of third top portions, and one of the pair of third top portions applies a force in a closing direction of the opening or closing body to a third slope of the fourth engagement body in a state where the one of the pair of third top portions is in contact with one of the pair of fourth top portions, when the other of the pair of fourth top portions comes into contact with the other of the pair of third top portions while the opening or closing body is closing, wherein one of the pair of fourth engagement bodies have a fourth slope that receives a force in a direction in which the one of the pair of the fourth engagement bodies close the opening or closing body by coming into contact with the other third top portion after the other third top portion passes through the other fourth top portion while the opening or closing body is closed, and the pair of fourth engagement bodies have a surface portion extending from the one fourth top portion to a side opposite to the third slope along the opening direction of the opening or closing body, wherein one of the pair of fourth top portions comprises an descending slope of an upstream side and the fourth slope which is an descending slope of a downstream side in reference to a closing direction of the opening or closing body, and the other one of the pair of the fourth top portions comprises the third slope which is ascending of the downstream side in reference to the closing direction of the opening or closing body and does not comprise a descending slope.

15. The latch mechanism according to claim 14, wherein the at least two fourth engagement bodies are arranged at a position where the one fourth top portion which is one end of the third slope of the pair of fourth top portion is positioned on an upstream side in the closing direction from the other fourth top portion.

16. The latch mechanism according to claim 14, wherein the one third top portion is held in a state where the opening or closing body is closing by being continuously in contact with the fourth slope.

* * * * *